(12) United States Patent
Iwane

(10) Patent No.: US 7,031,554 B2
(45) Date of Patent: Apr. 18, 2006

(54) INFORMATION CONVERTING SYSTEM

(75) Inventor: Waro Iwane, Sapporo (JP)

(73) Assignee: Iwane Laboratories, Ltd., Sapporo (JP)

( * ) Notice: Subject to any disclaimer, the term of this patent is extended or adjusted under 35 U.S.C. 154(b) by 907 days.

(21) Appl. No.: 10/049,045

(22) PCT Filed: Jun. 25, 2001

(86) PCT No.: PCT/JP01/05387

§ 371 (c)(1),
(2), (4) Date: Feb. 7, 2002

(87) PCT Pub. No.: WO02/01505

PCT Pub. Date: Jan. 3, 2002

(65) Prior Publication Data

US 2002/0106135 A1    Aug. 8, 2002

(30) Foreign Application Priority Data

Jun. 26, 2000    (JP) .................... 2000-190725

(51) Int. Cl.
*G06K 9/54* (2006.01)
(52) U.S. Cl. ................ 382/305; 382/218; 358/403; 707/104.1
(58) Field of Classification Search ................ 382/165, 382/181, 203, 209, 218, 224, 305; 358/403; 707/6, 104.1
See application file for complete search history.

(56) References Cited

U.S. PATENT DOCUMENTS 3,757,037 A * 9/1973 Bialek ................. 348/107
5,499,306 A    3/1996 Sasaki et al.
6,236,988 B1 * 5/2001 Aldred ................ 707/3
6,665,442 B1 * 12/2003 Sekiguchi et al. ......... 382/224
6,801,641 B1 * 10/2004 Eraslan ................ 382/118

FOREIGN PATENT DOCUMENTS

| | | |
|---|---|---|
| JP | 61-177583 | 8/1986 |
| JP | 64-37676 | 2/1989 |
| JP | 1-214986 | 8/1989 |

(Continued)

OTHER PUBLICATIONS

Hideya Ichihara et al, "Model-Based Motion Extraction of 3-dimensional Object", Denshi Joho Tsuushin Gakkai Gijutsu Kenkyu Houkoku, vol. 88, No. 452, (1989), pp. 41 to 46 (english abstract).

(Continued)

*Primary Examiner*—Daniel Miriam
(74) *Attorney, Agent, or Firm*—Manabu Kanesaka

(57) ABSTRACT

An information converting system includes: a database (300) in which attribute data including three-dimensional shape data of parts modeled on various objects and identification codes are registered; a comparison part generating unit (400) for generating part information for comparison from the attribute data for each of the parts; an input unit (100) for obtaining an input image including an object image; a comparison information generating unit (200) for performing an imaging process on the input image to thereby generate image information for comparison in which information of the object image is not clipped; and a specifying unit (500) for retrieving a part corresponding to the part information for comparison from the image information for comparison, recognizing the corresponding portion in the image information for comparison as an object image, and specifying a part having the part information for comparison as a part corresponding to the object image.

24 Claims, 43 Drawing Sheets

FOREIGN PATENT DOCUMENTS

| | | |
|---|---|---|
| JP | 2-51775 | 2/1990 |
| JP | 3-110685 | 5/1991 |
| JP | 4-171586 | 6/1992 |
| JP | 5-153581 | 6/1993 |
| JP | 7-37092 | 2/1995 |
| JP | 7-56942 | 3/1995 |
| JP | 2000-276598 | 1/2000 |

OTHER PUBLICATIONS

Hiroshi Harushima, "Chiteki Gazou Fogou-ka to Chiteki Tsushin", Television Gakkai-shi, vol. 42, No. 6, (1988), pp. 519 to 525 non-english.

Kenkichi Fukurotani et al, "Principles of Three-Dimensional computer Animation", Modeling, Rendering, and Animating with 3D Computer Graphics, non-english.

* cited by examiner

FIG. 2

EXAMPLE A OF STORAGE DATA IN FIRST PART STORAGE (DATABASE)

| ID (Key) | name | shape (numerical value data) | color (numerical value data) | use | ○ | △ |
|---|---|---|---|---|---|---|
| 1001 | table-1 | 25694458 | 26885696 | for meeting | ……… | ……… |
| 1002 | table-2 | 25555655 | 26555565 | for personal computer | ……… | ……… |
| 1003 | table-3 | 52265566 | 45544485 | for office | ……… | ……… |
| | | | | | | |

FIG. 9

EXAMPLE B OF STORAGE DATA OF COORDINATE CODE (DATABASE)

| ID (Key) | coordinate-X | coordinate-Y | coordinate-Z | direction-X | direction-Y | direction-Z |
|---|---|---|---|---|---|---|
| 1001 | 12.238 | 15.469 | 58.221 | 0.365 | 0.265 | 0.681 |
| 1002 | 58.269 | 23.659 | 96.586 | 0.698 | 0.365 | 0.689 |
| 1003 | 89.365 | 98.123 | 73.951 | 0.165 | 0.985 | 0.852 |

| 1 | 3 | 5 | 3 | 1 | 0 | 0 | 0 | -1 | -3 |
| 1 | 3 | 5 | 3 | 1 | 0 | 0 | 0 | -1 | -1 |
| 1 | 3 | 5 | 3 | 1 | 0 | 0 | 0 | 0 | 0 |
| 1 | 3 | 5 | 3 | 1 | 0 | 0 | 0 | 0 | 0 |
| 1 | 3 | 5 | 3 | 1 | 0 | 0 | 0 | 0 | 0 |
| 1 | 3 | 5 | 3 | 1 | 1 | 1 | 1 | 1 | 1 |
| 1 | 3 | 5 | 3 | 3 | 3 | 3 | 3 | 3 | 3 |
| 1 | 3 | 5 | 5 | 5 | 5 | 5 | 5 | 5 | 5 |
| 1 | 3 | 3 | 3 | 3 | 3 | 3 | 3 | 3 | 3 |
| 1 | 1 | 1 | 1 | 1 | 1 | 1 | 1 | 1 | 1 |

FIG. 17A

LIST OF VECTOR DISPLAY OF CORNERS
AND LINES ON PART SIDE

| part-side corner ||
|---|---|
| corner identifier | vector display of line |
| c − 1 | L 1   L 2 |
| c − 2 | L 3   L 4 |
| c − 3 | L 5   L 6 |
| c − 4 | L 7   L 8 |

| part-side line ||
|---|---|
| line identifier | vector display of line |
| l − 1 | L L 1 |
| l − 2 | L L 2 |
| l − 3 | L L 3 |
| l − 4 | L L 4 |

FIG. 17B

CORRESPONDING RELATION BETWEEN PART-SIDE CORNER
AND PART-SIDE LINE

| part-side corner || part-side line ||
|---|---|---|---|
| corner identifier | vector display | line identifier | vector display |
| c − 1 | L 1   L 2 | l − 4 | L L 4 |
|  |  | l − 1 | L L 1 |
| c − 2 | L 3   L 4 | l − 5 | L L 1 |
|  |  | l − 2 | L L 2 |
| c − 3 | L 5   L 6 | l − 6 | L L 2 |
|  |  | l − 3 | L L 3 |
| c − 4 | L 7   L 8 | l − 7 | L L 3 |
|  |  | l − 4 | L L 4 |

FIG. 18

LIST OF VECTOR DISPLAY OF CORNERS
AND LINES ON INPUT SIDE

| input-side corner | |
|---|---|
| corner identifier | vector display of line |
| c−03 | L11  L12 |
| c−04 | L13  L14 |
| c−05 | L15  L16 |
| c−06 | L17  L18 |
| c−11 | L19  L20 |
| c−10 | L20  L22 |
| c−02 | L23  L24 |
| c−09 | L25  L26 |
| c−08 | L27  L28 |
| c−07 | L29  L30 |
| c−01 | L31  L32 |

| input-side line | |
|---|---|
| line identifier | vector display of line |
| l−01 | LL11 |
| l−04 | LL12 |
| l−05 | LL13 |
| l−06 | LL14 |
| l−07 | LL15 |
| l−02 | LL16 |
| l−04 | LL17 |

FIG. 19

CORRESPONDING RELATION BETWEEN
INPUT-SIDE CORNER AND INPUT-SIDE LINE

| input-side corner | | input-side line | |
|---|---|---|---|
| corner identifier | vector display | line identifier | vector display |
| c-03 | L11  L12 | l-04 | LL12 |
| | | l-05 | LL13 |
| c-04 | L13  L14 | l-05 | LL13 |
| | | l-06 | LL14 |
| c-05 | L15  L16 | l-06 | LL14 |
| | | l-07 | LL15 |
| c-06 | L17  L18 | l-07 | LL15 |
| | | l-04 | LL12 |

FIG. 28

EXAMPLE A' OF STORAGE DATA IN SECOND PART STORAGE (DATABASE)

| ID (Key) | name | shape (numerical value data) | color (numerical value data) | brightness | | | |
|---|---|---|---|---|---|---|---|
| 1001 | table-1 | 25694458 | 26856696 | | ...... | ...... | |
| 1002 | table-2 | 25555655 | 26555565 | | ...... | ...... | |
| 1003 | table-3 | 52265566 | 45544485 | | ...... | ...... | |

FIG. 36A
FIG. 36B
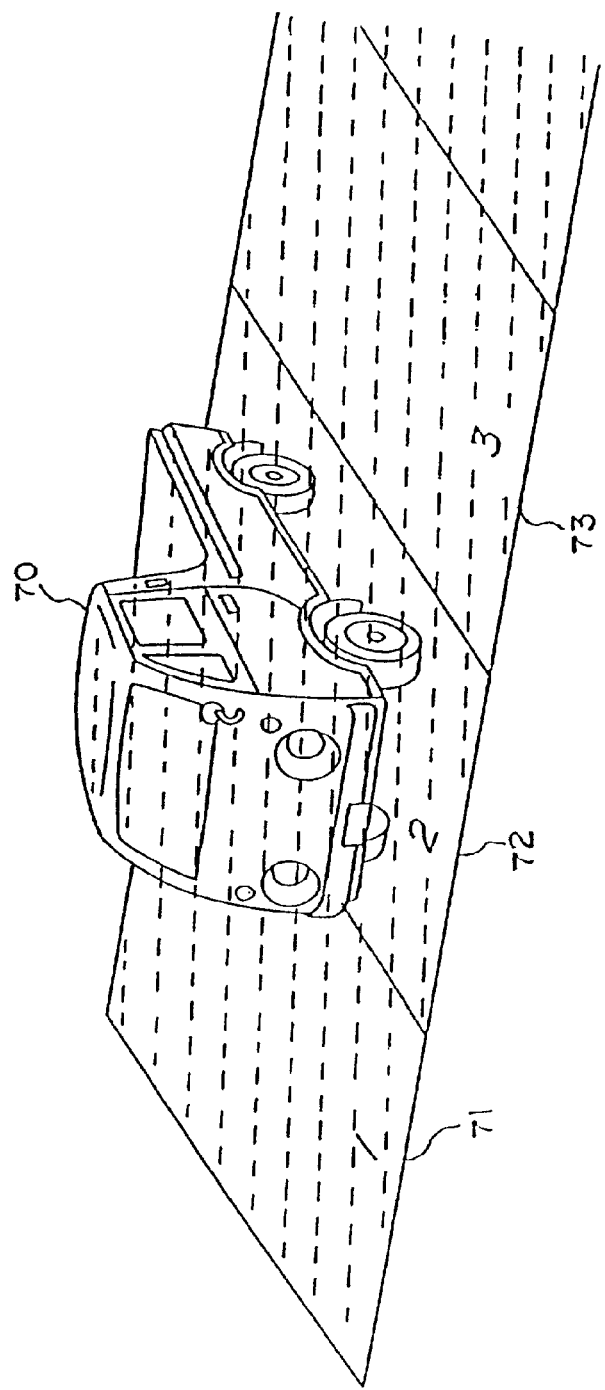
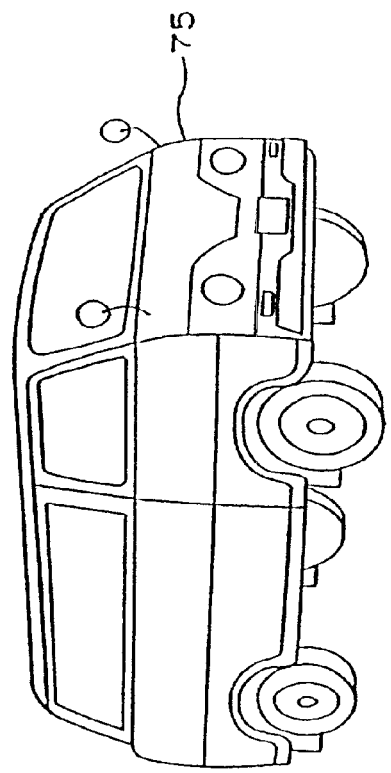

INFORMATION CONVERTING SYSTEM

TECHNICAL FIELD

The present invention relates to an information converting system for automatically recognizing an object on the basis of input information having a physical quantity indicative of the properties of the object. More particularly, the invention relates to an information converting system suitable for automatically recognizing an object having three-dimensional shape on the basis of an input image and, further, relates to a basic technique for an information transferring technique or an artificial intelligence by using the results of recognition of an object.

BACKGROUND ART

Conventionally, in a monitoring system such as a security system, various sensors such as a monitor camera and an infrared sensor are used. By using the monitor camera and sensor, the presence or absence of an intruder in a building or the like can be easily monitored or detected from a remote place.

In recent years, by digitization of an image, image processing techniques have advanced dramatically. As a result, a specific portion in an image can be enhanced or clipped, and synthesis of desired images has been made possible. For example, in live coverage of a baseball game, a technique of arbitrarily replacing an advertisement image behind the batter's box and broadcasting the resultant images are a practical use.

Further, because of the progress in communication techniques of recent years, the amount of information transferred via a communication line such as the Internet is increasing. Particularly, the amount of image information is incomparably larger than that of character information. Therefore, in order to reduce the amount of image information transmitted, various image compressing techniques for compressing an image signal, transmitting the compressed image signal, and decompressing the image signal on the reception side have been developed.

For example, as a compression encoding system for a still image, the JPEG (Joint Photographic coding Experts Group) system is adopted as an international standard system. In the JPEG system, the total amount of image information is reduced by thinning out the number of pixels in accordance with a predetermined rule. Also as a compression encoding system for a moving image, for example, the MPEG (Motion Picture coding Experts Group) system is adopted as an international standard system. In the MPEG system, only the parts of an image that are in motion are processed, thereby reducing the total amount of image information.

Incidentally, for recognizing the occurrence of an accident or a crime, it is still necessary to watch a monitor image of a monitor camera by a human being. That is, the occurrence of an accident or the like is not recognized by the monitor camera or the monitor image itself. Therefore, even if a monitor camera is installed, if the person monitoring the camera is not watching the monitor image, the occurrence of an accident or the like will be missed.

Also, although a security sensor such as an infrared sensor can detect intrusion of something, it is difficult to recognize "what" has been detected. Because of this, security sensors often give out false alarms. That is, the security sensor detects not only an intruder but also intrusion of an animal such as a dog.

In the final analysis, the cause of these problems is that "what object is" is not being recognized automatically.

Furthermore, in order to enhance or clip a specific portion of a digital image by image processing, the operator has to designate the specific portion. Also, however a digital image is processed by image processing, the image itself is merely a set of pixel signals. Consequently, "what" the object is in an image is still recognized by a human being in a manner similar to the case of the above-described monitor camera.

Incidentally, as an image recognizing technique, the optical character reader (OCR) has been practically used. Objects for recognition in the OCR are usually characters on a plain white sheet of paper. The OCR automatically recognizes characters by using a pattern matching method of comparing a character pattern clipped from an input image with a reference pattern.

However, in the case of recognizing the image of an object existing in three-dimensional space, the background of the object is not limited to plain white but is often a succession of lines from the outlines of neighboring objects. In this case, it is often difficult to clip an individual object image from the background. Therefore, even by directly applying a conventional pattern matching technique such as the OCR, it is not easy to recognize a three-dimensional object.

Also in conventional image compressing techniques, because processing is intended to compress image signals, the volume of compressed image information transmitted is much larger than that of character information. As a result, there are still problems such that it takes much time to transfer image information and that the burden on the transmission line becomes heavy.

Incidentally, by the existing image recognizing techniques, it is impossible to realize the function of recognizing a three-dimensional object from two-dimensional image information of that three-dimensional object, reading a large amount of the three-dimensional information of the object from the two-dimensional image information, and inferring the three-dimensional object from the read information like a human being. That is, although current two-dimensional image recognizing techniques are fairly advanced, using existing techniques, recognition is only possible to realize to such an extent that the name and kind of the object can be recognized. It is difficult to recognize the object so as to be separated from the other objects and make three-dimensional measurement of a physical quantity of the object and so on like a human being does.

Therefore, if three-dimensional recognition in a real meaning including not only recognition to the extent of name and kind of an object but also recognition of various attributes, three-dimensional shape, and position of three-dimensional coordinates of an object is realized, by combining the recognition with the current computer technology, an artificial intelligence technique of selecting a target object from a plurality of existing objects, recognizing the object, measuring the object, and further, deriving one final conclusion from the positional relation and the meaning relation of the objects like a human being does daily can be realized.

DISCLOSURE OF THE INVENTION

The present invention has been achieved in consideration of the above circumstances and its first object is to provide an information converting system capable of automatically recognizing a three-dimensional object.

By the invention, not only a three-dimensional object is automatically recognized but, further, it becomes possible to recognize an object so as to be distinguished from another object, determine a three-dimensional shape of even an unseen portion of the object, determine position coordinates of the object, reconstruct a plurality of objects into a plurality of corresponding three-dimensional CG (Computer Graphics) including positions, and represent the resultant at a free viewpoint.

A second object of the invention is to provide a technique capable of largely reducing the amount of image information by information transformation and further realizing high-speed transfer of the image information.

By combining the first and second objects, a technique realizing artificial intelligence for interpreting the situation of an object and determining a conclusion in place of a human being in a remote place or the like can be provided.

After various investigations to achieve the first object, the inventor herein paid attention to a fact that when the conventional pattern matching method is applied to recognize a three-dimensional object, the process of individually clipping an object image from an input image becomes very difficult. The inventor herein therefore has sought for a technique capable of automatically recognizing an object without clipping an object image from an input image and has achieved the present invention.

An information converting system disclosed in the first aspect of the invention includes: a database in which attribute data including data indicative of properties of an object and an identification code of each of parts modeled on various objects are registered; a comparison part generating unit for generating one piece or a plurality of pieces of part information for comparison from the attribute data for each of the parts; an input unit for obtaining input information including information regarding an object; a comparison information generating unit for generating information for comparison in which information of the objects is not individually separated from each other, from the input information; a part specifying unit for specifying a part corresponding to the object by using the part information for comparison and the information for comparison each having the same kind of data; and an output unit for outputting, as a result of recognition of the object, the identification code and at least a part of the attribute data of the specified data, and the part specifying unit has: a retrieving unit for retrieving a corresponding portion which corresponds to at least a part of the part information for comparison from the information for comparison sequentially with respect to one or plural piece(s) of part information for comparison of one or plural part(s); a recognizing unit for recognizing, as an object, the corresponding portion in the information for comparison; and a specifying unit for specifying a part having the part information for comparison as a part corresponding to the object.

Thus, for example, in the case where an object is sound information, even when it is difficult to extract: the sound information as a target from input information due to noise or the like, the corresponding portion in the input information is retrieved from the part side, so that the sound information as a target can be specified.

Moreover, not only simply recognizing the name of the object, after specifying the part, a process can be performed by replacing input information with the specified part. As a result, even data which is not included in input information, if it is included in attribute data preliminarily given to the specified part, the data can be output. According to the invention, therefore, realization of more advanced object recognition, for example image recognition, image understanding, further, sound recognition, sound understanding, and automatic translation, can be expected. The invention can be expected to be applied as the basic technology of the information processing technique such as artificial intelligence to various fields.

(Image)

The information converting system disclosed in the second aspect of the invention has: a database in which attribute data including three-dimensional shape data and an identification code of each of parts modeled on various objects are registered; a comparison part generating unit for generating one or plural piece(s) of part information for comparison from the attribute data for each of the parts; an input unit for obtaining an input image including an object image; a comparison image generating unit for generating image information for comparison in which information pieces of the objects are not individually clipped, by performing an imaging process on the input image; a part specifying unit for specifying a part corresponding to the object image by using the part information for comparison and the image information for comparison each having the same kind of data; and an output unit for outputting, as a result of recognition of the object image, the identification code and at least a part of the attribute data of the specified part, and the part specifying unit includes: a retrieving unit for retrieving a corresponding portion which corresponds to at least a part of the part information for comparison from the image information for comparison sequentially with respect to one or plural piece(s) of part information for comparison of one or plural part(s); a recognizing unit for recognizing, as an object image, the corresponding portion in the image information for comparison; and a specifying unit for specifying a part having the part information for comparison as a part corresponding to the object image.

As described above, in the information converting system of the invention, the object image is recognized by converting the object data to a modeled part having attribute data. At that time, the image information for comparison is retrieved by the part information for comparison. A corresponding portion in the comparison image is recognized as an object image and a corresponding part is specified.

Consequently, the object can be automatically recognized without clipping the object images from the input image. Therefore, even in the case where it is difficult to individually clip an object image from an input image, a three-dimensional object can be automatically recognized.

In the invention, the object is not limited to an actually existing one. For example, an image in virtual reality or the like can be used as an input image. For example, as image information for comparison, it is also possible to generate integral transform data from an input image by a method such as Fourier transform and generate, as part information for comparison, integral transform data from attribute data of a part by a method such as Fourier transform.

Further, according to the invention, attribute data is given to each part. Consequently, not only simply recognizing the name of the object, after specifying the part, a process can be performed by replacing input image with the specified part. As a result, even data which is not included in input image, if it is included in attribute data preliminarily given to the specified part, the data can be output. For example, the shape of a backside portion of an object or information of price or weight of the object, which does not appear in the input image, can be also output as attribute data.

As described above, according to the invention, more advanced image recognition and image understanding can be realized. The invention can be expected to be applied as the basic technique of the information processing technique such as artificial intelligence to various fields.

The object is included in the object in the first aspect. The comparison image generating unit is included in the comparison information generating unit in the first aspect. Also the image information for comparison is included in the information for comparison in the first aspect.

(Decomposition of Part Element)

According to the invention of the third aspect, the comparison part generating unit decomposes, as the part information for comparison, the attribute data of the part into basic elements of an outline or the like and generates basic elements or a composite element obtained by combining a plurality of basic elements. The comparison image generating unit extracts the basic elements of an outline or the like and generates a set of basic elements or composite elements as the image information for comparison. The retrieving unit retrieves a part corresponding to the basic element or composite element of the part from the image information for comparison.

In such a manner, when the attribute data is decomposed to the basis elements, and a corresponding portion in the comparison image is retrieved on the unit basis of the basic element or composite element, efficiency of the retrieving process can be improved. It is preferable to give an element identification code to each of the basic and composite elements for the following processes.

(Characteristic Element of Part)

According to the invention of the fourth aspect, the comparison part generating unit generates, as the part information for comparison, basic elements or a composite element of a characteristic portion of the attribute data of a part, the retrieving unit retrieves a part corresponding to the basic element or composite element of the characteristic portion from the image information for comparison, and the recognizing unit detects, after the portion corresponding to the basic element or composite element of the characteristic portion is retrieved, correspondence between the corresponding portion and a basic element or composite element out of the characteristic portion in the same part, and recognizes the corresponding portion as an object image.

Consequently, by performing the retrieving process by using the basic element or composite element in the characteristic portion, the efficiency of the retrieving process can be further increased.

(Part Operator)

According to the invention of the fifth aspect, the comparison part generating unit generates, as the part information for comparison, an element extracting filter (hereinbelow, also called "element operator") taking the form of a two-dimensional matrix or a three-dimensional matrix in which a high point is given to a pixel coinciding with the shape of the basic element or composite element and a low point is given to a pixel apart from the shape of the element, and the retrieving unit retrieves, as the corresponding portion, a portion in which the total point of pixels coinciding with the basic element or composite element in the image information for comparison is the highest.

By using the element extracting filter, while retrieving the portion in which the total point is the highest, coincidence can be finally made. Thus, with suppressing useless retrieval, the retrieving efficiency can be improved.

(Coupling Relation)

According to the invention of the sixth aspect, the comparison part generating unit gives information for specifying only a coupling relation of the basic elements to the composite element, and the part specifying unit retrieves the corresponding portion on the condition that at least a part of the coupling relation coincides with the corresponding portion.

In such a manner, when only the coupling relation is specified, the information of direction, size, position, and shape of a composite element can be ignored. Consequently, even in the case where the directions, sizes, positions, shapes, or the like do not coincide, a corresponding portion which partially coincides with a composite element can be retrieved. As a result, the corresponding portion can be retrieved by the part information for comparison of a smaller number of kinds. Thus, the efficiency of the retrieving process can be further increased.

Further, when the element identification code is given to each of the basic elements constructing a composite element and the element identification code is also given to each of the basic elements of the image information for comparison obtained by decomposing the input image into the basic elements, coincidence is derived by each of the element identification codes. For example, the element identification code of the part information for comparison and the element identification code of image information for comparison can be compared with each other on a table.

The basic element includes corner, line segment, plane or a combination of these, or data obtained by integrally transforming them by a method of the Fourier transform.

(Self-Recognizing Function)

According to the invention of the seventh aspect, the attribute data of each part registered in the database includes self-specifying information for instructing a method of specifying the part, the comparison part generating unit generates part information for comparison for designating the self-specifying information and outputs the part information for comparison to the part specifying unit in accordance with priority designated by the selfspecifying information, and the part specifying unit specifies a part on the basis of the self specifying information.

As described above, by providing each part with the self-specifying information, at the time of specifying the part, the part information for comparison including characteristic information can be generated. Further, by designating the kind of part information for comparison or the generating order, the efficiency of the retrieving process can be improved. As a result, the efficiency of the specifying process can be improved, and the accuracy of specification can be improved.

The processing method and condition in the part specifying unit may be set in the part specifying unit or registered as self-specifying information in a database.

For example, a plurality of selectable processing methods are preset in the part specifying unit and, at a stage that a part is selected, the optimum processing method may be selected from the processing methods in accordance with the designation of the self-specifying information in the attribute data of the part.

Further, for example, not only the selection of the processing method, but also a program of the processing method in the part specifying unit is set as self-specifying information. By obtaining the program, the part specifying unit may perform the retrieving process, recognizing process, and specifying process in accordance with the self-specifying information.

(Set of Parts)

According to the invention of the eighth aspect, as attribute data of a set of parts, identification codes of a plurality of parts constructing the part set and a combination condition are registered in the database, and when specified parts satisfy the combination condition, the specifying unit further specifies a part set obtained by combining specified parts.

Consequently, even in the case of an object of which whole image is not uniform, a portion can be specified as a set of parts corresponding to the portion in the object.

An example of the combination condition of parts is a placement relation of parts. Also the part set is suitable for use in recognition of an object which is constructed by a plurality of blocks and whose whole shape changes.

(Four-Dimensional Part)

According to the invention of the ninth aspect, the database has, as attribute data of a four-dimensional part modeled on a series of operations of an object, a set of three-dimensional shape data in a time-series order of the object.

Thus, the operation itself of an object can be also recognized.

(General Part)

According to the invention of the tenth aspect, the database has, as attribute data of general parts modeled commonly on an object group, attribute data common to parts modeled on the objects of the object group.

With the configuration, part information for comparison of a wide permissible range can be easily generated. For example, in the case of recognizing objects whose shapes are different from each other like farm products different from industrial products whose shapes are standardized, the invention is suitable to be used as means for representing the general shape of the objects.

(Narrowing of Parts)

According to the invention of the eleventh aspect, the general parts and parts commonly having the attribute data of the general parts are associated with each other in the database, the comparison part generating unit generates part information for comparison with respect to the general parts, and when the general part is specified by the specifying unit, the comparison part generating unit generates part information with respect to a part associated with the general part.

With the configuration, an object can be efficiently specified.

A processing method of specifying an object in two stages may be designated by the self-specifying function in the sixth aspect.

(Capture of Data)

According to the invention of the twelfth aspect, the database captures data obtained from a recognized object image as attribute data of a specified part or replaces the data obtained from a recognized object image with a part of attribute data.

As described above, by capturing or replacing attribute data from the object image, more accurate attribute data can be derived. For example, in the case where a part is specified, it is desirable to capture or replace attribute data of a portion which does not coincide with the recognized object image.

The attribute data may be captured on the unit basis of, for example, the basic element or composite element in claim 3.

(Narrowing by Grouping Parts)

According to the invention of the thirteenth aspect, a plurality of parts are grouped for each set situation in the database, and when the input image corresponds to any of set situations, the comparison part generating unit generates the part information for comparison for a part in the group of the corresponding set situation.

By specifying a part in the group of set situation, the parts using for the retrieving process can be limited. As a result, the efficiency of the retrieving process can be increased.

(Narrowing of Coordinate)

According to the invention of the fourteenth aspect, the retrieving unit limits a retrieval range in the image information for comparison in accordance with a scene of an input image.

By limiting the retrieval range, the efficiency of the retrieving process can be increased. For example, when an object image of a part of the image information for comparison is already recognized, the retrieving process can be limited from the relation between the already recognized object and a part to be retrieved. For instance, in the case of searching the image information for comparison for a part of a glass, when an image of a table has already been recognized, the retrieval range may be limited to the area on the table image.

(Specification by Multi-Viewpoint Coincidence)

According to the invention of the fifteenth aspect, a plurality of the input units obtain input images of the same object from known directions which are different from each other, the comparison image generating unit generates image information for comparison including two-dimensional shape data from each of the input images obtained by the input units, the comparison part generating unit generates part information for comparison having two-dimensional shape data obtained by projecting three-dimensional shape data of a part into the known directions, and the part specifying unit specifies a part in each image information for comparison and confirms that the same part is specified in each of the image information for comparison.

In the case when a part can be specified, the same part is specified with respect to the input images in the different directions. Thus, the accuracy of specification of parts can be largely improved. As a result, the reliability of recognition of an object can be improved.

For example, when the correspondence to the part information in a single piece of image information for comparison is not satisfied, as a general rule, the correspondence to the part information for comparison is not also satisfied in the image information for comparison in the other directions, so that a part is not specified. In contrast, when the correspondence to the part information for comparison is satisfied in one piece of image information for comparison, as a general rule, the correspondence to the part information for comparison is also satisfied in the image information for comparison in the other directions, and a part is specified.

At the time of generating two-dimensional comparison image information, for example, data obtained by performing two-dimensional integral transform on input images of multiple viewpoints by a method such as Fourier transform may be used. Also at the time of generating two-dimensional part information for comparison, for example, when it is assumed that a part is placed in the position of the object, two-dimensional integral transform data of the object image of the part obtained by a camera for taking images of the image from a known direction may be generated. The part specifying unit obtains the corresponding relation between two-dimensional integral transform data and can specify a part when the data coincides with each other.

(Specification by 2D—2D)

According to the invention of the sixteenth aspect, the input unit obtains an input image including an object image photographed from a single direction, the comparison image generating unit generates image information for comparison including two-dimensional shape data from the input image, and the comparison part generating unit generates part information for comparison having two-dimensional shape data obtained by projecting the three-dimensional shape data of the part into an arbitrary direction.

The attribute data of a part includes three-dimensional shape data. Consequently, attribute data such as three-dimensional shape data can be given to part information for comparison projected in a known direction. As a result, at the time of retrieving the image information for comparison, by the attribute data of the part information for comparison, a three-dimensional shape, coordinates, and the like of the object in the corresponding portion can be predicted.

For example, when a part candidate is a desk, a situation in which the desk is provided upright on a floor can be preferentially retrieved rather than a situation in which the desk floats in the air or a situation in which the desk is inverted. As a result, the retrieval efficiency can be improved.

(Specification by 3D—3D)

According to the invention of the seventeenth aspect, the input unit obtains input images having parallax of the same object from directions which are different from each other, the comparison image generating unit generates image information for comparison including three-dimensional shape data from each of the input images, and the comparison part generating unit generates part information for comparison having three-dimensional shape data of a part.

Since the three-dimensional shape data of the whole circumference is preliminarily given to a part, part information for comparison having the three-dimensional shape data can be generated. Also from a plurality of input images, the image information for comparison having the three-dimensional shape data of a part of the object can be generated as a stereo image by parallax. Consequently, with the three-dimensional shape of the part information for comparison, the three-dimensional shape portion in the image information for comparison can be directly retrieved. As a result, a part can be specified within a three-dimensional coordinate system directly. Thus, a part can be specified simply with reliability.

At the time of generating three-dimensional image information for comparison, for example, it may be generated by performing three-dimensional integral inverse transform on data in a plurality of directions obtained by performing two-dimensional integral transform on input images of an object obtained from a plurality of directions by a method such as Fourier transform. Also at the time of generating three-dimensional part information for comparison, for example, when it is assumed that a part is placed in the position of the object, three-dimensional data of the part to be captured by a camera for taking an image of the part from a known direction may be generated from attribute data by calculation.

According to the invention of the eighteenth aspect, the part specifying unit has a settling unit for determining a three-dimensional shape of a specified part and three-dimensional coordinates indicative of an arrangement relation.

Further, at the time of determining three-dimensional coordinates, data obtained from an input image, which is not preliminarily included in attribute data of a specified part may be added to the attribute data.

By fixing the parts as described above, not only simple image recognition but also more advanced image process and image understanding can be realized by using the three-dimensional coordinates and attribute data of the specified part. For example, from the three-dimensional coordinates, the three-dimensional position relation of parts corresponding to the objects can be derived. Further, for instance, from the three-dimensional coordinates and attribute data of each part, information indicative of the relation of parts corresponding to objects and data necessary for total determination on meaning of the situation shown by the input image is considered to be lead.

(Distinguishing Same Part)

According to the invention of the nineteenth aspect, when the same part is specified with respect to a plurality of different object images by the part specifying unit, the settling unit adds identifiers which are different from each other to identification codes of the specified parts.

As described above, by adding an identifier to an identification code, even in the case where a plurality of objects are of the same kind, the objects can be recognized individually and distinguished from each other.

(Trace)

According to the invention of the twentieth aspect, when the input image is a moving image constructed by a plurality of frames, the part specifying unit specifies a part with respect to one of the frames and repeatedly performs only the settling process with respect to the part once specified on the other frames.

Consequently, once a part is specified, even if the object moves, it is unnecessary to re-perform the recognizing process and specifying process. That is, without changing the identification code of a part, while updating only the position of the object image (for example, coordinate data), the object can be traced. As a result, the part specification result can be used repeatedly, so that extremely efficient transfer, recording, and display can be realized.

For example, in input images continuously input such as video images, the position of the same object is displaced continuously. Consequently, in continuous images and the like, the object in a predetermined deviation range can be sequentially specified as the same part. Thus, it becomes unnecessary to re-specify the same part each time the input image is updated.

(Free Viewpoint)

According to the invention of the twenty-first aspect, the output unit reconstructs a plurality of parts subjected to the settling process in the part specifying unit and three-dimensional space arrangement of the parts as an image seen from a viewpoint in an arbitrary position and displays the result.

Each part has three-dimensional shape data. Consequently, even when input images are images obtained only from one direction, with respect to each of parts reconstructed, data of the image seen from an arbitrary direction can be obtained. As a result, an image showing a state where the whole part group is seen from a viewpoint different from that of the input image can be output.

Consequently, a plurality of objects and their placement relations in the three-dimensional space can be recreated as a placement relation of parts modeled on the basis of attribute data of the corresponding parts.

(Camera Calibration and Coupling of Three-dimensional Images)

According to the invention of the twenty-second aspect, the input unit obtains an overlapped portion of three-dimensional spaces in image capturing ranges of input images on the basis of an object image in each of input images of an object whose three-dimensional shape and position are known, obtained from directions which are different from each other, aligns the overlapped portions so as to coincide with each other on a three-dimensional coordinate system, thereby coupling the images, and obtains a viewpoint position and an angle of view of each of the input units.

The specified and settled part has three-dimensional shape data and three-dimensional coordinate data. Consequently, by coupling the overlapped portions from object images of a known object, images from different cameras can be coupled and, simultaneously, the direction of the viewpoint to the object can be obtained. Further, the direction of the viewpoint in the case of obtaining images of the object from another direction can be also derived. Therefore, the viewpoint direction, viewpoint position, and angle of view of each of the input units which obtain images of the same object from multiple directions can be obtained from parts specified and settled with respect to the object.

A plurality of input images are not limited to images obtained at the same time. For example, also in the case where the input unit moves relative to the object, if the object does not move relative to the coordinate system as a reference, images can be similarly coupled and the viewpoint position and the angle of view can be obtained.

(Communication)

In order to achieve the second object in addition to the first object, according to the invention of the twenty-third aspect, the information converting system further includes: a transmitting unit for transmitting an identification code output from the output unit to a communication line; a receiving unit for receiving the identification code; a reception-side database in which the identification code and attribute data are associated with each other and registered; and a reconstructing unit for searching the reception-side database for attribute data of a part corresponding to the identification code and outputting the attribute data.

With the configuration, by transferring the identification code and position information of a part specified on the transmission side, an image obtained by converting the object image in the input image to a part can be reconstructed on the reception side. As a result, it becomes unnecessary to transfer image data of the object. Thus, the transmission amount is largely reduced, so that high-speed transmission can be realized, and a load on the line can be lessened.

(Different Part Storage)

According to the invention of the twenty-fourth aspect, three-dimensional shape data of parts of the same identification code in the database on a transmission side and the reception-side database are different from each other.

A part registered in the database on the reception side may or may not coincide with a part registered in the database on the transmission side.

For example, in the case of transmitting only information of the placement state of objects or the like quickly, the data in the databases do not always have to be the same. Also for example, for easy explanation, although it is different from an object, the object may be reproduced as a part symbolically representing the object by animation or illustration.

(Analysis Information)

According to the invention of the twentyfifth aspect, the information converting system further includes an analysis information generating unit for combining attribute data of a plurality of parts specified by the part specifying unit to thereby generate analysis information regarding a group of the parts.

With the configuration, not only each object but also the state of the whole object group can be recognized. For example, by combining weight data in attribute data of objects, the total weight of all the objects can be generated as analysis attribute information.

Attribute data to be combined is not limited to those of the same kind. Attribute data of different kinds of different parts may be also combined with each other.

Further, when analysis attribute information is generated by using attribute data which is not included in an input image, information (such as the date of manufacture) which is difficult to be recognized or determined by a human being only from input images can be also automatically recognized and determined.

It is desirable to provide an item selecting unit for selecting a way of combining parts and attribute data used for generating analysis information in accordance with analysis information to be generated. By providing the item selecting unit, the combining way adapted to a purpose can be selected and used. As a result, the information converting system can be used as a general system which is not limited to a specific use.

BRIEF DESCRIPTION OF THE DRAWINGS

FIG. 2 is a table for explaining an example of an identification code and attribute data in a database.

FIG. 9 is a table for explaining an example of coordinate codes of the first embodiment.

FIG. 17A is a list of vector display of corners and lines on the part side and FIG. 17B is a list showing the corresponding relation between the corner and line on the part side.

FIG. 18 is a list of vector display of corners and lines on the input side.

FIG. 19 is a list showing the corresponding relation between the corners and lines on the input side.

FIG. 28 is a table for explaining an example of identification codes and attribute data registered in a reception-side database.

FIG. 36A is a schematic diagram of an input image in the sixth embodiment and FIG. 36B is a schematic diagram of a registered vehicle.

BEST MODE FOR CARRYING OUT THE INVENTION

Preferred embodiments of the invention will be described hereinbelow with reference to the drawings. However, the invention is not limited to the embodiments.

First Embodiment

A first embodiment will be described with reference to FIGS. 1 to 10.

1. Configuration of Information Converting System

Figure 1:
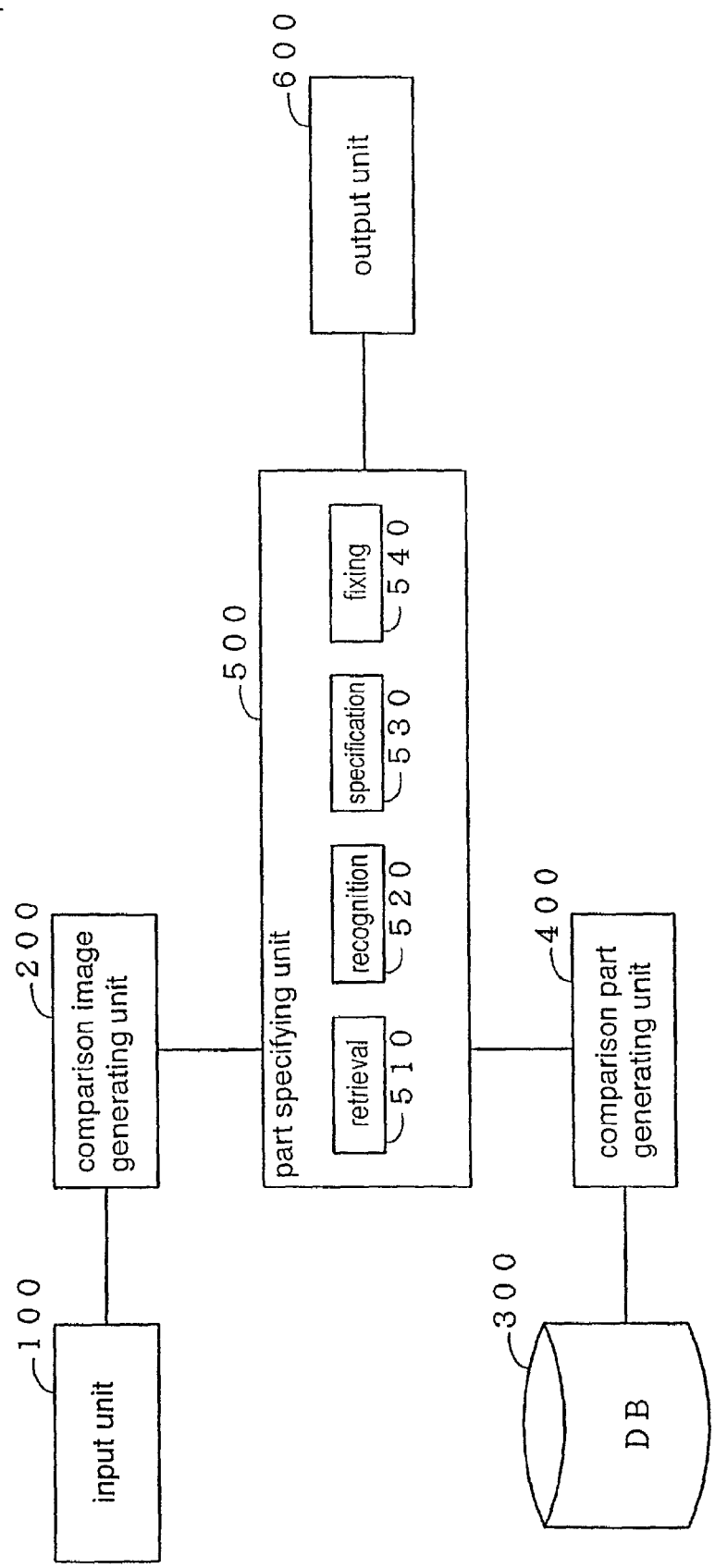
FIG. 1 is a functional block diagram for explaining the configuration of an information converting system of a first embodiment.

FIG. 1 is a functional block diagram of an information converting system of the first embodiment. As shown in FIG. 1, the information converting system of the first embodiment has a database (DB) 300, a comparison part generating unit 400, an input unit 100, a comparison image generating unit 200, a part specifying unit 500, and an output unit 600.

(1) Database

First, the database 300 will be described.

In the database 300, parts as models of objects are registered. To each part, various attribute data such as data indicative of a three-dimensional shape of an object, characteristics, properties, and circumstances is given. The attribute data of each part is associated with an identification code of the part and registered in the database 300.

It is generally desirable that the number of parts to be registered in the database 300 is as large as possible. However, in the case where objects to be recognized are limited, it is sufficient to register only parts corresponding to the limited objects.

Generally, it is desirable that the kinds of attribute data are various as much as possible. However, depending on the purpose of recognizing an object or the kind of an object, the kinds of attribute data may be limited.

FIG. 2 shows an example of identification codes and attribute data registered in the database 300. As shown in FIG. 2, in the database 300, attribute data such as the name, three-dimensional shape, color, and use of a part is stored in association with an identification code (ID) of the part. The attribute data of three-dimensional shape and color is stored as numerical value data.

Figure 3A:
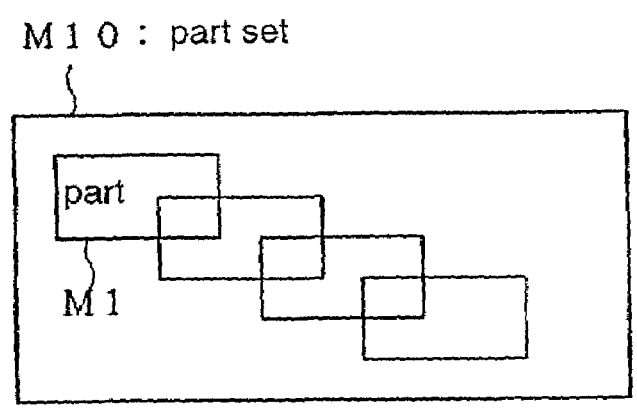
FIG. 3 is a flowchart for explaining the operation of the information converting system of the first embodiment.

In the database 300, as attribute data of a part set M10, the ID codes of a plurality of parts M1 constructing the part set M10 and a combination condition may be registered. FIG. 3A schematically shows the concept of the part set M10.

An example of the part set is a human's face. In this case, parts of a face may be registered as a part set of combined parts such as eyes, mouth, and nose. The positional relations of the parts of eyes, mouth, and the like may be registered as a combination condition.

Another example of the part set is a car. In this case, as a part set of combined parts of tires, doors, and the like, parts modeled on the car may be registered. The positional relations of the parts of tires, doors, and the like may be used as a combination condition.

Figure 3B:
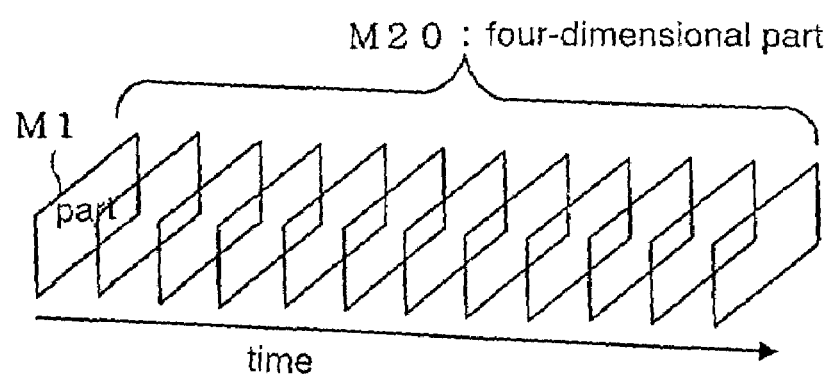

Further, in the database 300, as attribute data of a four-dimensional part modeled on a series of operations of an object, a set of three-dimensional shape data of the object in a time-series order may be registered. FIG. 3B schematically shows the concept of a four-dimensional part M20. By using the four-dimensional part M20, the operation itself of an object, for example, an operation of running of a human being or a gesture can be also recognized.

In the database 300, as attribute data of general parts commonly modeled on a group of objects, attribute data common to parts modeled on the objects of the group may be registered.

It is suitable to use general parts on an occasion of recognizing objects having different shapes such as farm products.

An object may be specified once by using the general parts and further specified by each part.

In the database (part storage) 300, a plurality of parts may be grouped and registered for each set circumstance.

Figure 4:
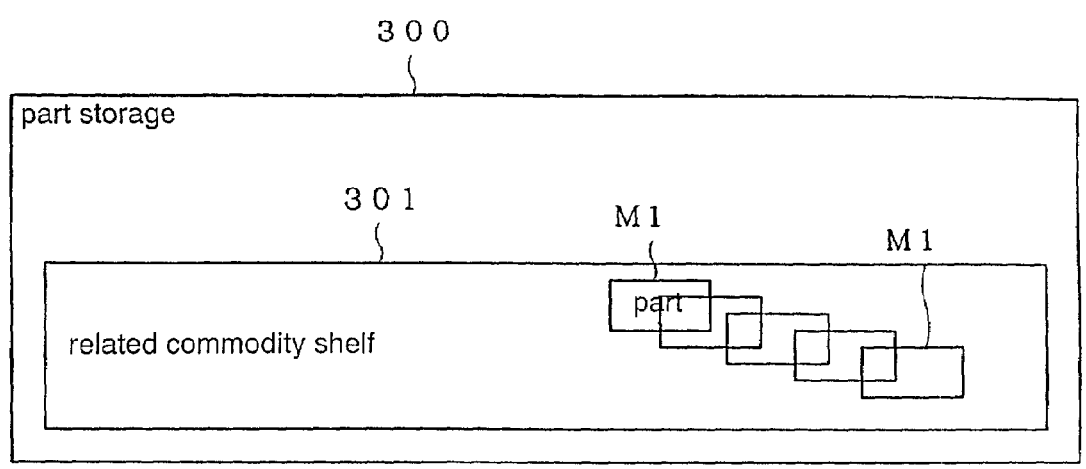
FIG. 4 is a schematic diagram showing a state in which a plurality of parts are grouped and registered in a database.

FIG. 4 schematically shows an example of a plurality of parts M1 grouped in a related commodity shelf 301. In the related commodity shelf 301, for example, when a set circumstance is "indoor," parts of furniture such as "desk" and "chair" may be grouped and registered.

By grouping parts in such a manner, parts used for a retrieving process can be limited to parts in a group corresponding to the set circumstance. As a result, the retrieving process can be performed more efficiently.

In the embodiment, attribute data of each of parts registered in a database includes self-specifying information which instructs a processing method of specifying the part itself.

By the self-specifying information, the kind of data used for part information for comparison in the attribute data of the part is designated and the order of the part information for comparison used for retrieval is also designated.

The processing method in the part specifying unit may be preset in the part specifying unit 500 or set as self-specifying information. In the case of setting the processing method as self-specifying information, the following two examples can be considered.

As a first example, a plurality of selectable processing methods are preset in the part specifying unit 500, and the part specifying unit 500 is allowed to select the optimum processing method from the processing methods.

As a second example, a program of the processing method in the part specifying unit 500 is set as self-specifying information, and the program is sent to the part specifying unit 500 and executed there.

Since three-dimensional shape data of the whole circumference is preliminarily given to a part, the comparison part generating unit 400 may generate part information for comparison including the three-dimensional shape data of the part. In this case, for example, when it is assumed that a part is placed in the position of the object, three-dimensional data of parts to be taken by a camera for acquiring images of the part from a known direction may be generated by calculation from the attribute data.

(2) Comparison Part Generating Unit

The comparison part generating unit 400 will now be described.

The comparison part generating unit 400 generates one or plural part information for comparison from attribute data on a part-by-part basis. For example, as part information for comparison, two-dimensional images obtained by projecting a part having three-dimensional shape data to various directions may be generated. Alternately, for example, as the part information for comparison, integral transform data may be generated by a method such as Fourier transform from the attribute data of a part.

The range and order of candidate parts for generating the part information for comparison may be preset or instructed by the operator.

When a part has self-specifying information, the comparison part generating unit 400 generates the part information for comparison designated by the self-specifying information. The comparison part generating unit 400 outputs the part information for comparison to the part specifying unit in a priority order designated by the self-specifying information.

(3) Input Unit

The input unit 100 will now be described.

The input unit 100 acquires an input image including an image of an object. In the first embodiment, the input unit 100 takes the form of a stereo camera. By the stereo camera, as input images, pseudo three-dimensional images having parallax are obtained by taking images of an object from different directions.

(4) Comparison Image Generating Unit

The comparison image generating unit 200 will now be described.

The comparison image generating unit 200 performs an imaging process on an input image to thereby generate image information for comparison which has not been subjected to an advanced imaging process of, for example, clipping an image of an object.

In the embodiment, the comparison image generating unit 200 generates image information for comparison having data of the same kind as that of data of the part information for comparison. For example, when the part information for comparison is a two-dimensional image, image information for comparison of a two-dimensional image is generated. For example, when only an outline of a two-dimensional image is extracted as part information for comparison, image information for comparison obtained by extracting only an outline from an input image is generated. For instance, as the image information for comparison, integral transform data may be generated from an input image by a method such as Fourier transform.

The comparison image generating unit 200 may generate image information for comparison including three-dimensional shape data from a stereo image obtained by the input unit 100. In this case, for example, the image information for comparison may be generated by three-dimensional integrate inverse transform from data obtained from various directions by performing two-dimensional integral transformation on input images of an object captured from a plurality of directions by a method such as Fourier transform.

Although the image information for comparison is generated in accordance with the kind of data of the part information for comparison in the embodiment, in the invention, the comparison part generating unit 400 may generate part information for comparison in accordance with the kind of data of the image information for comparison.

(5) Part Specifying Unit

The part specifying unit 500 will now be described.

The part specifying unit 500 specifies parts corresponding to an image of an object by using the part information for comparison and image information for comparison having data of the same kind.

For this purpose, the part specifying unit 500 has a retrieving unit 510, a recognizing unit 520, a specifying unit 530 and a settling unit 540.

In the embodiment, each object image is not clipped from an input image and is not collated with a part.

(5-1) Retrieving Unit

The retrieving unit 510 retrieves a corresponding portion which corresponds to the part information for comparison from the image information for comparison sequentially with respect to one or plural part information for comparison of one or plurality parts. The retrieving unit 510 determines whether a portion corresponding to at least a part of the part information for comparison exists or not in the image information for comparison.

At the time of retrieval of the corresponding portion, a portion in any of the image information for comparison and part information for comparison do not have to be completely matched. For example, it is sufficient to determine a corresponding portion when the portion coincides with a portion of a predetermined ratio or larger out of elements of the part information for comparison.

(5-2) Recognizing Unit

The recognizing unit 520 recognizes a corresponding part in the image information for comparison as an object image. In such a manner, without clipping an image of the object from an input image, the area of the object image in the input image can be defined.

In the case of performing a process of retrieving another part after any part in the image information for comparison is recognized as an image of the object, it is sufficient to search the remaining portion of the comparison image.

(5-3) Specifying Unit

The specifying unit 530 specifies a part having the part information for comparison as a part corresponding to the object's image, and obtains the identification code (ID) and attribute data of the part from the database 300.

By the operation, the image information of the object is converted to data of the part. Therefore, the object ("what is the object") is not recognized by a human being but can be automatically recognized by the computer.

(5-4) Settling Unit

The settling unit 540 determines the position of the specified part by the position of the recognized object's image. Further, the settling unit 540 determines the placement direction of the part in the determined position on the basis of the data of the comparison part information corresponding to the object image.

Depth information in the position information of the object is obtained as, for example, a parallax amount of a stereo image. Also in the case that an image is not a stereo image, by specifying parts, the relative positional relation of objects may be obtained as a result.

For example, in the case where a table is placed on a horizontal floor and the floor, the table, and a glass placed on the table are recognized, each of a floor as a part, a table as a part, and a glass as a part has three-dimensional shape data. Consequently, even in the case where there is no parallax, the positional relations among the floor as a part, the table as a part, and the glass as a part can be narrowed down. For example, from the existence of gravity and rational assumption that the table and glass do not float in the air, the positional relations of the parts can be narrowed down to their horizontal plane. Within the range of the horizontal plane, a portion in an image matching any of the parts can be retrieved. When there is a match, the part is specified.

Further, by executing backward calculation from the size and direction of the three-dimensional shape of the specified part, three-dimensional positions of the table and glass can be obtained.

The information of the placement direction of a part is usually included in data of the part information for comparison. For example, in the case of generating the part information for comparison having two-dimensional shape data obtained by two-dimensionally projecting three-dimensional shape data of a part, the part information for comparison includes information of the projection direction. Consequently, on the basis of the information of the projection direction of the part information for comparison having the corresponding part which is found, the placement direction of the part can be determined.

The settling unit makes final determination on not only the positional direction obtained from the object but also, as necessary, information regarding the five senses such as the shape, color, sound, smell, and hardness preliminarily given as attribute data to a part and, as further, information created by a human being such as the date of manufacture.

There is a case such that the same part is specified with respect to a plurality of different object images. In this case, since the objects have different position coordinates, they can be separated from each other. The settling unit 540 adds identifiers which are different from each other as the identification codes of specified parts. Thus, the objects for which the same part is specified can be individually recognized.

As a method of describing the identifier, an arbitrary suitable method can be used. For example, an alphabetical character or a number may be added to the end of an identification code.

(5-4-1) Trace

When input images are continuously input as video images, the position of the same object is continuously displaced. Because of this, in frames of the continuous input images, the object within a predetermined deviation range can be sequentially specified as the same part. In this case, once the part is specified in one frame, it is sufficient to perform only a settling process on the other frames. That is, without changing the identification code of a part, while repeatedly updating the position of the part by the settling unit 540, the object can be traced.

(6) Output Unit

The output unit 600 outputs the identification code and at least a part of the attribute data of the specified part as a result of the recognizing process, specifying process, and settling process on the object's image.

The output unit 600 may reconstruct a plurality of parts and spatial placement of the parts as an image seen from a viewpoint in an arbitrary position and display the resultant. In this case, a plurality of objects and the placement relation of them can be reproduced as a placement relation of modeled parts on the basis of the attribute data of corresponding parts. By the above, computer graphics (CG) in which the state of real space is reflected can be easily generated.

The output unit 600 can output not only CG but also information such as sound and the data of manufacture included in the attribute data of a part as necessary.

Parts and their placement relation are determined by the settling unit on the basis of the identification code of the specified part and position data added to the attribute data and the resultant is output.

As described above, according to the embodiment, the object can be converted to the part to which the attribute data is given and the resultant can be output. As a result, when data is included in attribute data preliminarily given to the specified part, even the data is not included in an input image, the data can be output. For example, the shape of a back side portion of a desk and weight information of the desk and a chair, which does not appear in the input image can be also output as attribute data.

Further, by specifying parts, not only the name of the object is simply recognized but also a process after the parts are specified can be performed by replacing parts with the parts whose attribute data is registered. Thus, more advanced image recognition and image understanding can be realized. As a result, the possibility of applying the invention as a basic technique of the information processing technique such as artificial intelligence to various aspects is expected.

2. Example of Process

An example of recognizing furniture or the like in a room shown in FIG. 5A will now be described.

Figure 5A:
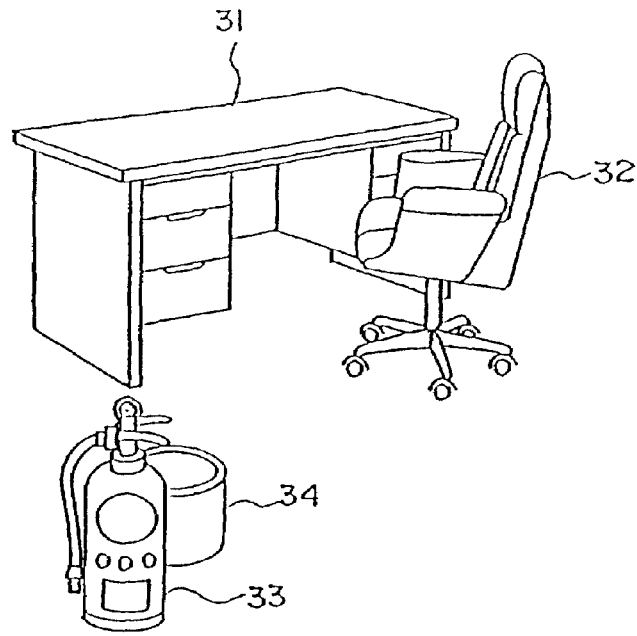
FIG. 5A is a perspective view showing objects of information conversion in the first embodiment and FIG. 5B is a schematic diagram of an input image.

FIG. 5A shows a state where a desk 31, a chair 32, a fire extinguisher 33, and a dust box 34 as objects are placed in a room.

(1) Acquisition of Input Image

Figure 6:
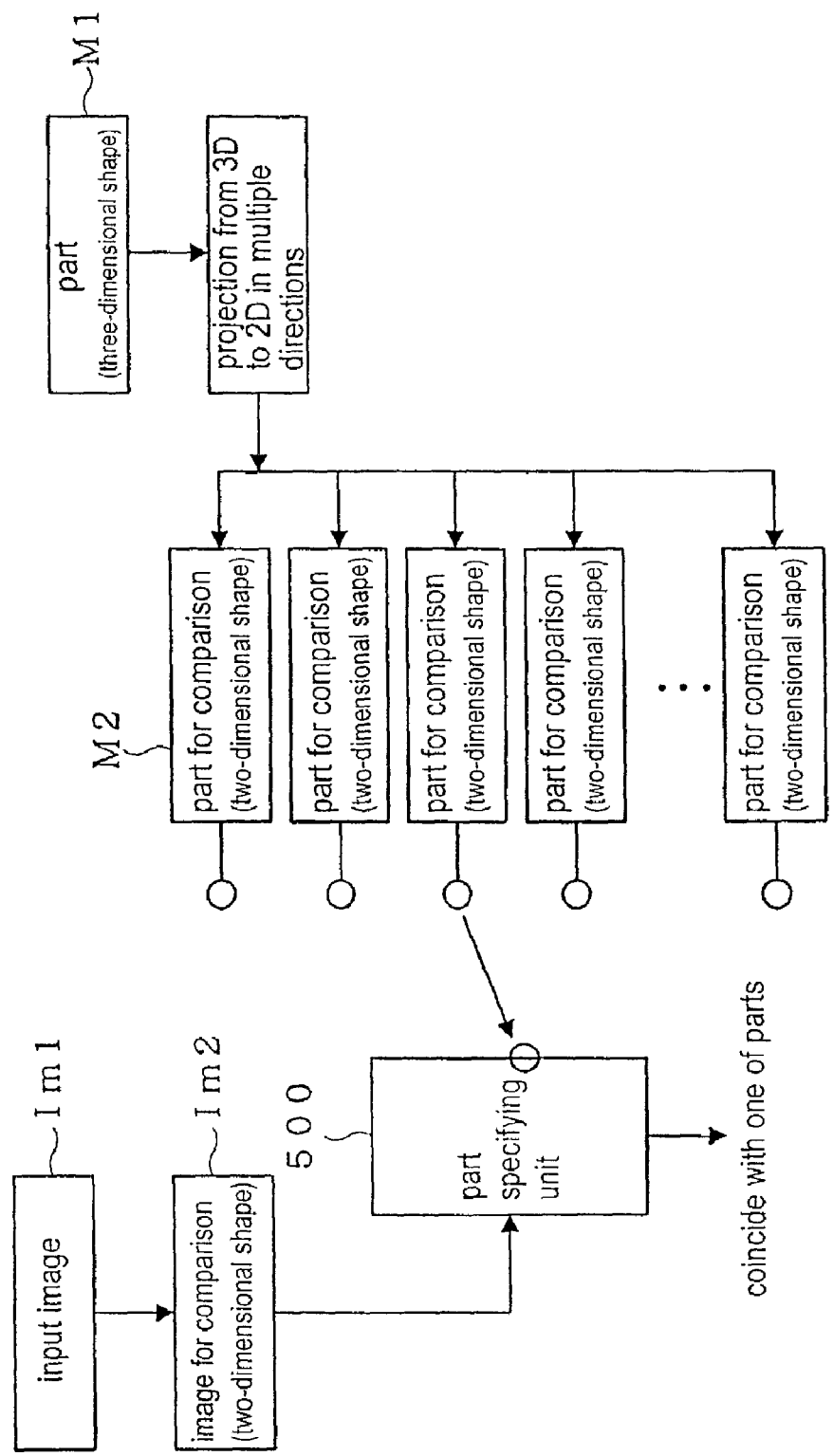
FIG. 6 is a block diagram for explaining specification of a part by using two-dimensional image information for comparison and two-dimensional part information for comparison.

First, the furniture and so on shown in FIG. 5A is photographed by the stereo camera as the input unit 100 to obtain an input image Im2 (FIG. 6).

Figure 5B:
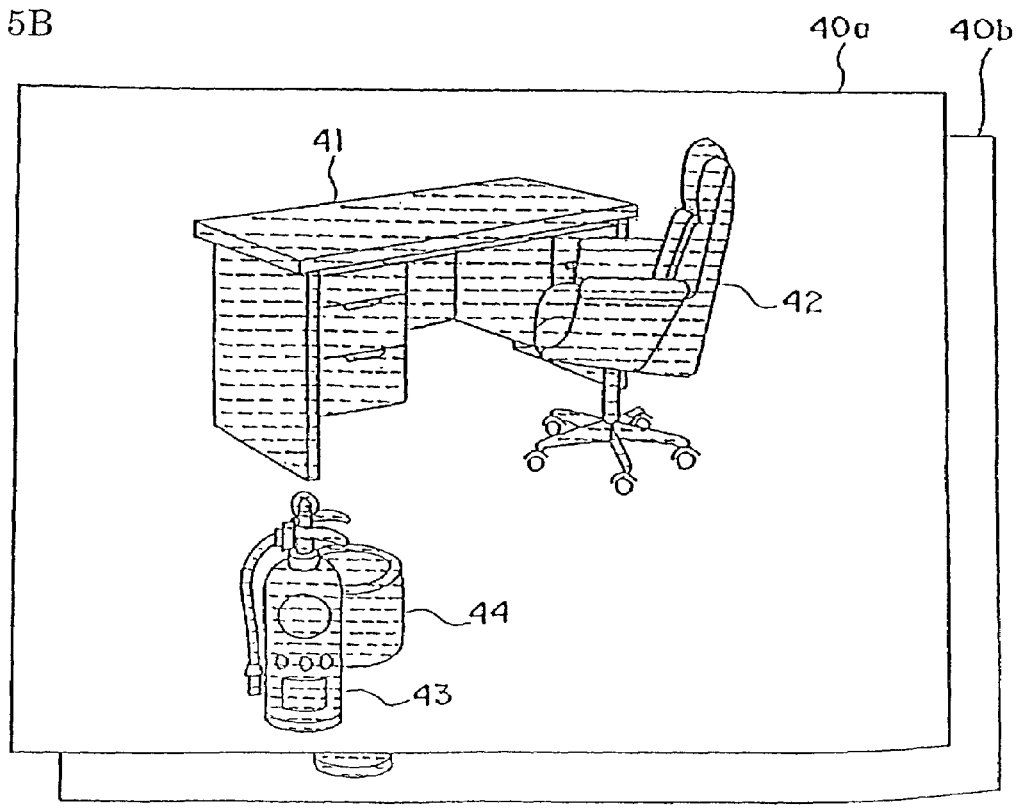

Stereo images 40a and 40b obtained are shown in FIG. 5B. In each of the stereo images 40a and 40b, an image 41 of the desk, an image 42 of the chair, an image 43 of the fire extinguisher, and an image 44 of the dust box are included with parallax.

In FIG. 5B, in order to emphasize that the input image is image data, the image 41 of the desk and the like have hatching for convenience.

(2) Generation of Image Information for Comparison

Next, the stereo image 40a or 40b is subjected to an imaging process by the comparison image generating unit 200 to thereby generate image information Im2 for comparison from which the object's image is not clipped (FIG. 6).

In the embodiment, by a conventional known arbitrary suitable method, outlines in an input image are extracted to generate the image information for comparison. In the image information for comparison, the outlines of images of neighboring objects are continuous and the image of each object is not clipped. For example, in the example shown in FIG. 5B, the outline of the desk 41 and that of the chair 42 are continuous. The outline of the fire extinguisher 43 and that of the dust box 44 are also continuous.

(3) Generation of Part Information for Comparison

In the comparison part generating unit 400, as shown in FIG. 6, two-dimensional images obtained by projecting a part Ml having three-dimensional shape data to multiple directions are generated as part information M2 for comparison.

Figure 7A:
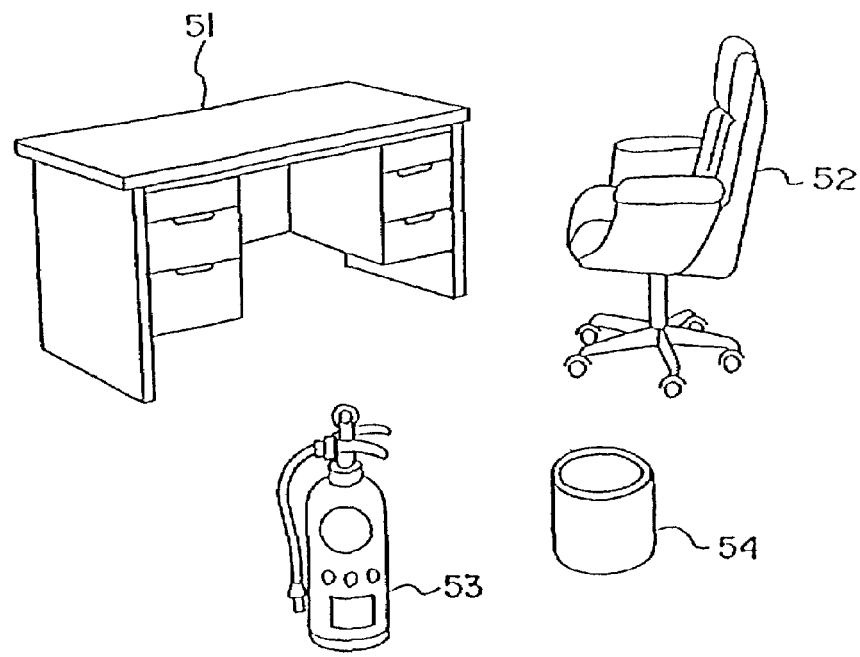
FIG. 7A is a schematic diagram of parts corresponding to objects shown in FIG. 5B

FIG. 7A shows an example of the part information M2 for comparison of a desk 51 as a part, a chair 52 as a part, a fire extinguisher 53 as a part, and a dust box 54 as a part. Although FIG. 7A shows one piece of part information for comparison for each part, in reality, a plurality of pieces of part information for comparison are generated per part. For example, as part information for comparison of the desk 51 as a part, plural pieces of part information for comparison obtained by seeing the desk from various directions are generated. Also for each of parts other than the furniture and the like shown in FIG. 7A, part information for comparison is generated.

Either the image information for comparison or the part information for comparison may be generated first. The part information for comparison may be either generated in advance for each of parts or generated each time in accordance with necessity.

(4) Specification of Part

By the part specifying unit 500, parts corresponding to the object images 41 to 44 are specified by using the part information M2 for comparison and the image information Im2 for comparison having the same kind of data.

(4-1) Retrieving Process

With reference to the flowchart of FIG. 3, the processes performed by the part specifying unit 500 will be described.

Figure 8:
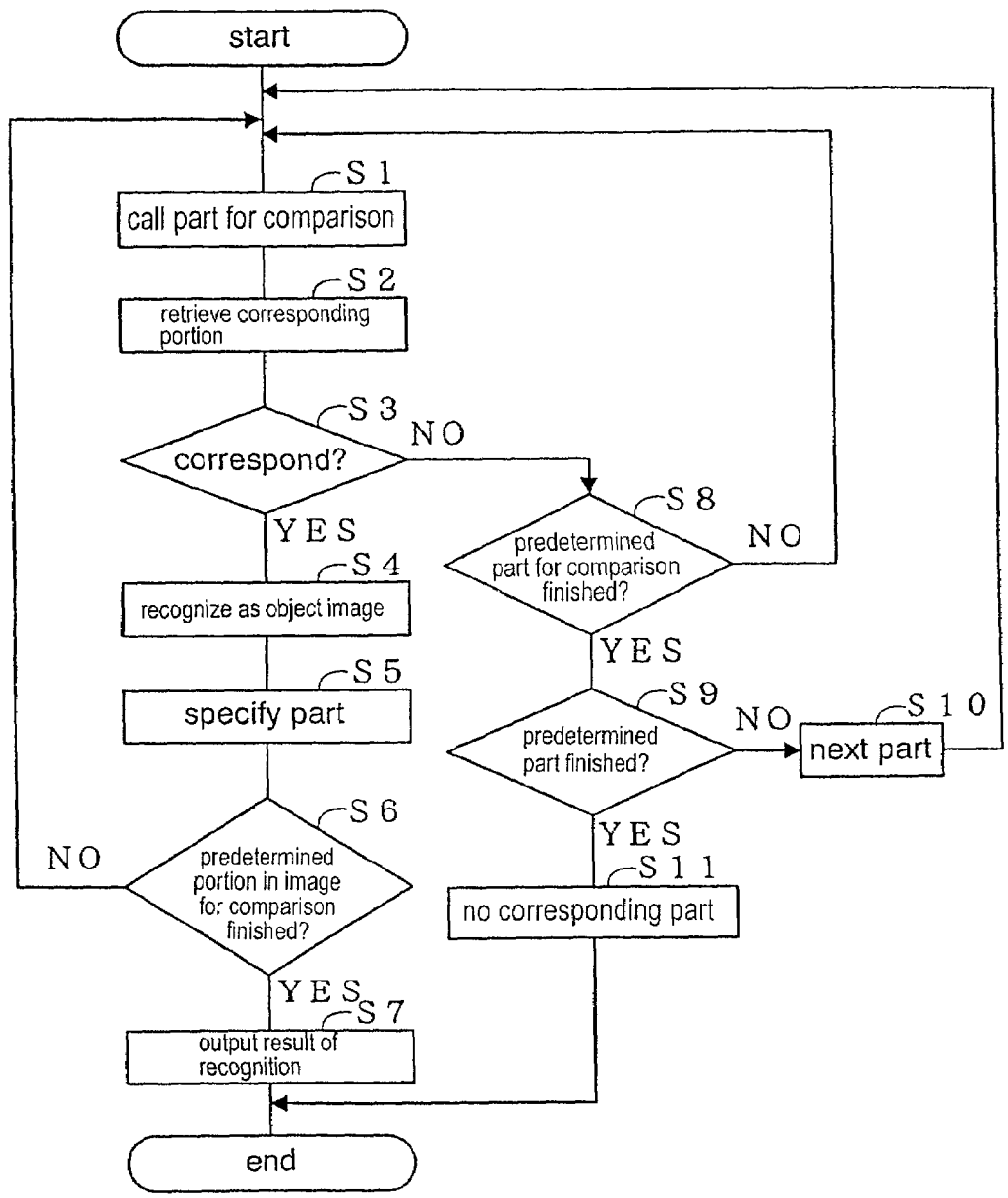
FIG. 8 is a flowchart for explaining processes of a part specifying unit.

First, the retrieving unit 510 obtains a comparison part from the comparison part generating unit 400 (step S1 in FIG. 8).

Subsequently, the retrieving unit 510 retrieves the corresponding part which corresponds to the part information M2 for comparison from the image information Im2 for comparison (step S2 in FIG. 8).

Further, the retrieving unit 510 determines whether a portion corresponding to the part information M2 for comparison exists in the image information Im2 for comparison or not (step S3 in FIG. 8).

The retrieving unit 510 repeats the processes of steps S1 to S3 with respect to sequentially one or plural part information for comparison of one or plural parts until a corresponding portion is found (steps S8 to S10 in FIG. 8). When a part corresponds to the information, as shown in FIG. 5, among the plural pieces of part information M2 for comparison generated from the part, part information M2 for comparison as two-dimensional shape data seen from any of the directions corresponds to the portion of the object's image in the image information for comparison.

When a corresponding portion is not found after all of the predetermined pieces of the part information for comparison of a predetermined part are searched, it is determined that there is no corresponding part (step S7 in FIG. 8), and the process is finished.

(4-2) Recognizing Process

When the corresponding portion is found, the recognizing unit 520 recognizes the corresponding portion in the image information for comparison as an object's image (step S4 in FIG. 8). In such a manner, without individually clipping the object's image from an input image, the area of the object's image in the input image can be defined.

(4-3) Specifying Process

Subsequently, the specifying unit 530 specifies a part having the part information for comparison as a part corresponding to the object's image (step S5 in FIG. 8). The identification code (ID) and attribute data of the part are obtained from the database 300.

As a general rule, the processes of steps S1 to S5 are repeated until all the object's images of the predetermined portion in the image information for comparison are specified (step S6 in FIG. 8).

(4-4) Settling Process

In the embodiment, simultaneously with the specifying process (step S5), by the settling unit 540, the position of the specified part is determined by the position of the recognized object's image. Further, the settling unit 540 determines the direction of placement of the part in the determined position on the basis of the data of the part information for comparison corresponding to the object's image.

FIG. 9 shows an example of position coordinate data. In the example shown in FIG. 9, as position coordinate data of each part, XYZ-axes coordinates of the position of each part and XYZ-axes coordinates of the direction of each part are generated.

At the time of specifying a part, image information such as hue and shading of an object's image may be taken into attribute data of a part. Data of a part of input information and attribute data peculiar to the part may be combined and output. For example, sound information or information of brightness in input information may be reproduced as it is and output.

Data of the shapes and the like of naturally created matters, which are different from each other, may be added to the attribute data of parts. With respect to a matter whose shape is deformed such as a crashed guardrail, the attribute data may be replaced with data of the deformed shape.

Referring to FIG. 23, an example of replacing data in input image with attribute data of a part will be described.

Figure 23A:
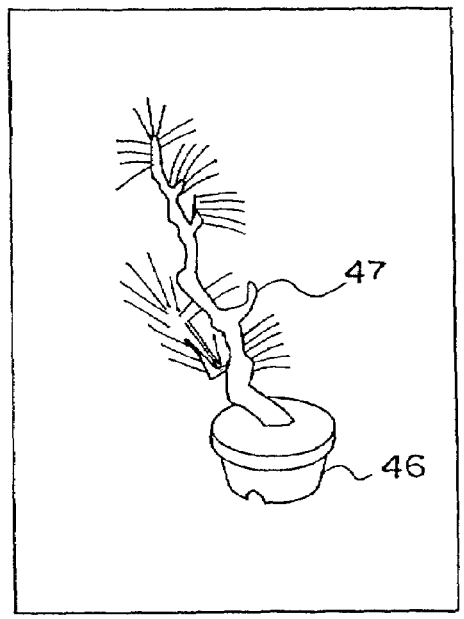
FIGS. 23A to 23C are explanatory diagrams of a process of taking input information into attribute data.
Figure 23B:
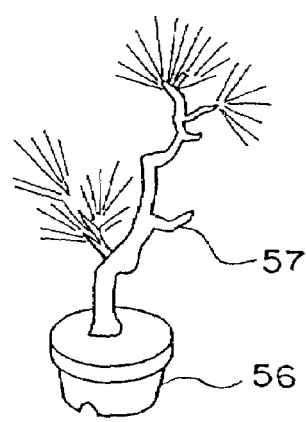
Figure 23C:
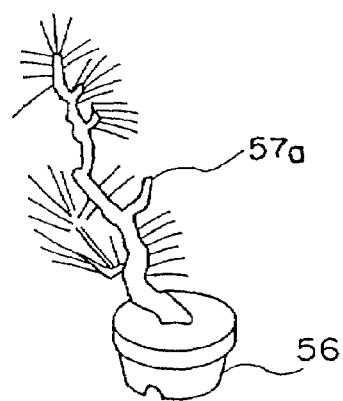

FIG. 23A shows an input image of a bonsai, a miniature potted tree. FIG. 23B shows a bonsai as a specified part. With respect to the bonsai in the input image and the bonsai as a part, the shape of an image 46 of a pot and that of a pot 56 of the part almost coincide with each other. However, the shape of an image 47 of the tree portion and that of a tree portion 57 of the part are different from each other. Consequently, a tree portion 57a as a part is generated from the input image, thereby generating a bonsai as a new part. FIG. 23C shows the bonsai as an updated part.

(6) Output

Figure 7B:
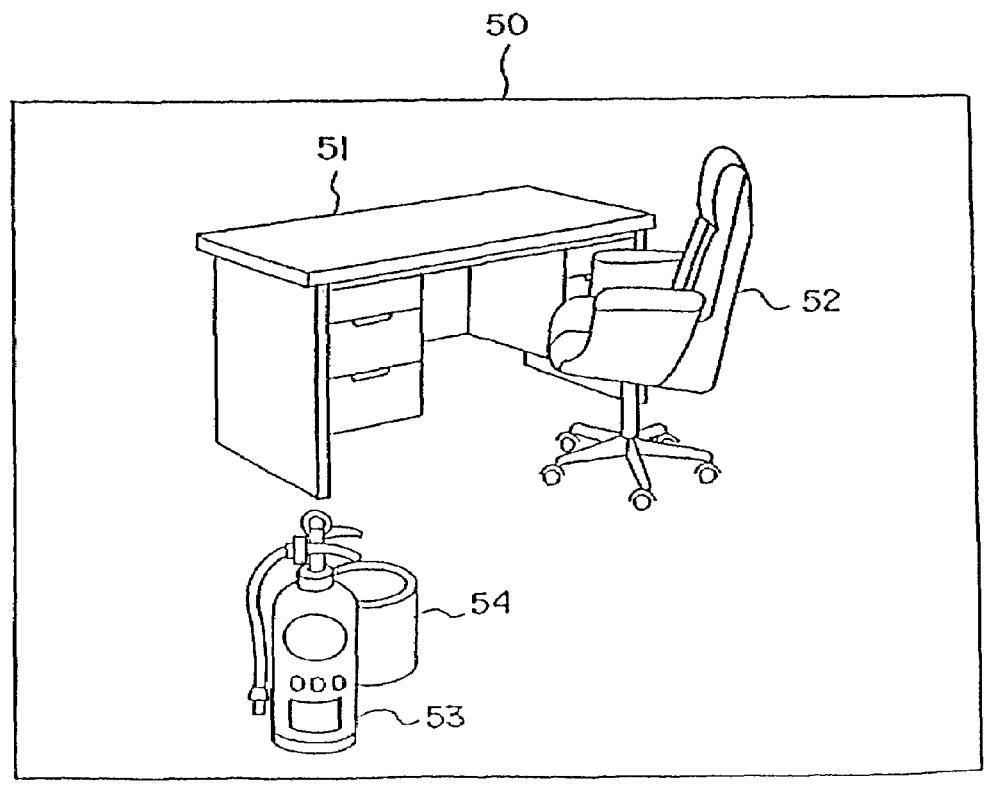
FIG. 7B is a display screen showing a group of recognized parts.

FIG. 7B shows the parts specified in such a manner.

As shown in FIG. 7B, as a part corresponding to the portion of the image 42 of the chair, the chair 52 as a part is specified. As a part corresponding to the portion of the image 43 of the fire extinguisher, the fire extinguisher 53 as a part is specified. As a part corresponding to the portion of the image 41 of the desk, the desk 51 as a part is specified. As a part corresponding to the portion of the image 44 of the dust box, the dust box 54 as a part is specified.

When the identification codes and positional information of the parts 51 to 54 are stored, by using the attribute data stored in the database 300, a display image 50 shown in FIG. 7B can be easily constructed. It is therefore unnecessary to store the stereo images 40a and 40b shown in FIG. 5B. As a result, the storage amount of storage information regarding an object can be largely reduced.

(6-1) Free-Viewpoint Display

Since each part has tree-dimensional shape data, even an input image is an image obtained only from one direction, data of the whole circumference can be obtained with respect to each of the parts 51 to 54. As a result, an image showing a state where the whole group of parts is seen from a viewpoint different from that of the input image can be output. The placement relation in three-dimensional space of the objects can be reconstructed as the placement relation of the parts.

Figure 10A:
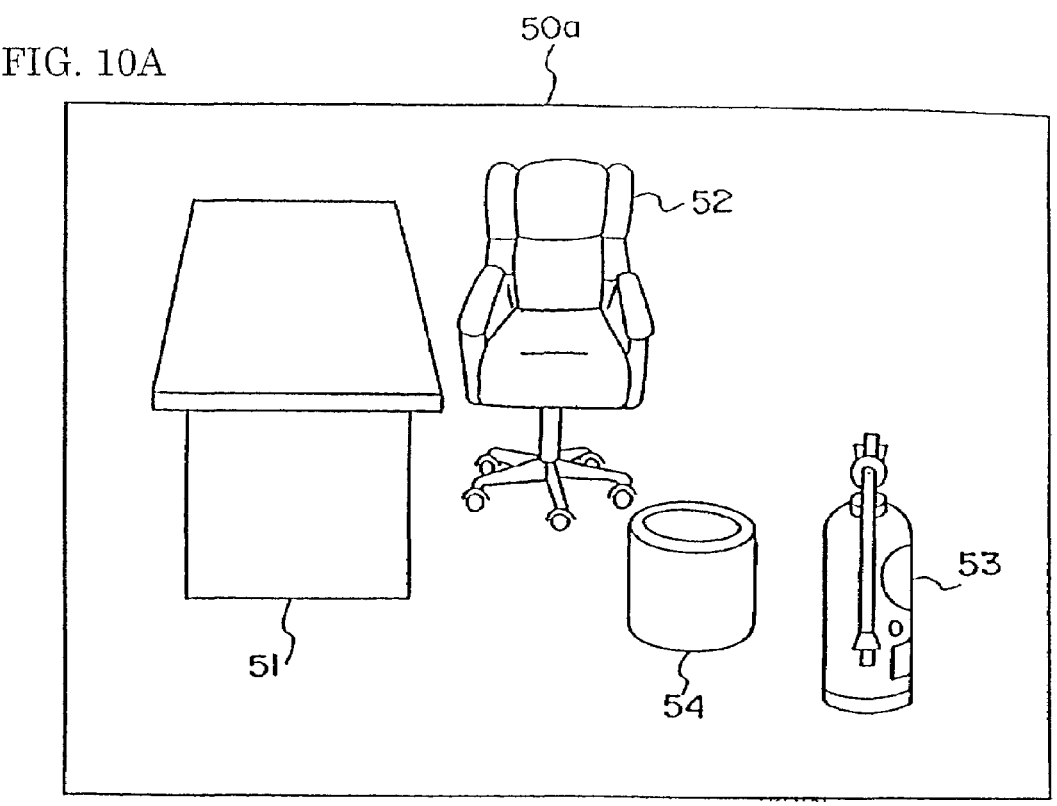
FIG. 10A is a display screen showing a state that a reconstructed part group is seen from a side viewpoint and FIG. 10B is a display screen showing a state that the reconstructed part group is seen from an upper viewpoint.
Figure 10B:
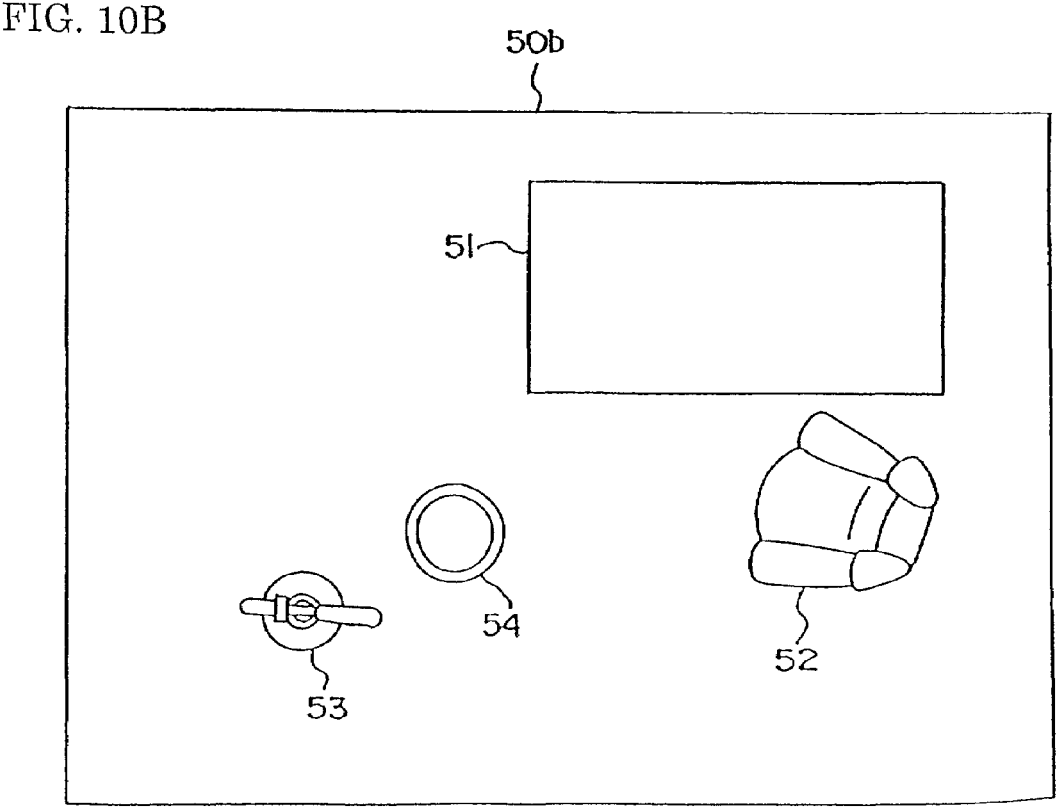

For example, as shown in a reconstructed image 50a of FIG. 10A, the placement relation of the group of the parts 51 to 54 seen from a side direction of the desk 51 as a part can be presented. As shown in a reconstructed image 50b of FIG. 10B, the placement relation of the group of the parts 51 to 54 seen from the above can be also presented.

Second Embodiment

Referring to FIGS. 11 to 20, a second embodiment will be described.

The configuration of an information converting system in the second embodiment is basically the same as that in the first embodiment shown in FIG. 1.

(1) Part Information for Comparison

However, in the second embodiment, different from the first embodiment, as part information for comparison, the comparison part generating unit 400 decomposes the attribute data of a part into basic elements such as outlines to thereby generate the individual basic elements or a composite element obtained by combining a plurality of basic elements.

The basic elements include all the elements which can be extracted from an input image as elements constructing the input image. Examples of the basic elements are a line segment of a straight line portion, a curve portion, and a corner portion of an outline. The corner portion as a basic element includes a right-angle portion and a T-shaped portion of an outline. The basic elements may be drawn by, for example, vectors.

Examples of the composite element are a plane specified by a plurality of straight line portions and corner portions, a curved surface, a surface of the same texture, a surface of a continuous hue, and a group of lines at infinity as a set of line segments which are converged to the same point.

It is desirable to give an element recognition code to each of the basic element and composite element. As a result, the input image is described by the element recognition codes.

Figure 11A:
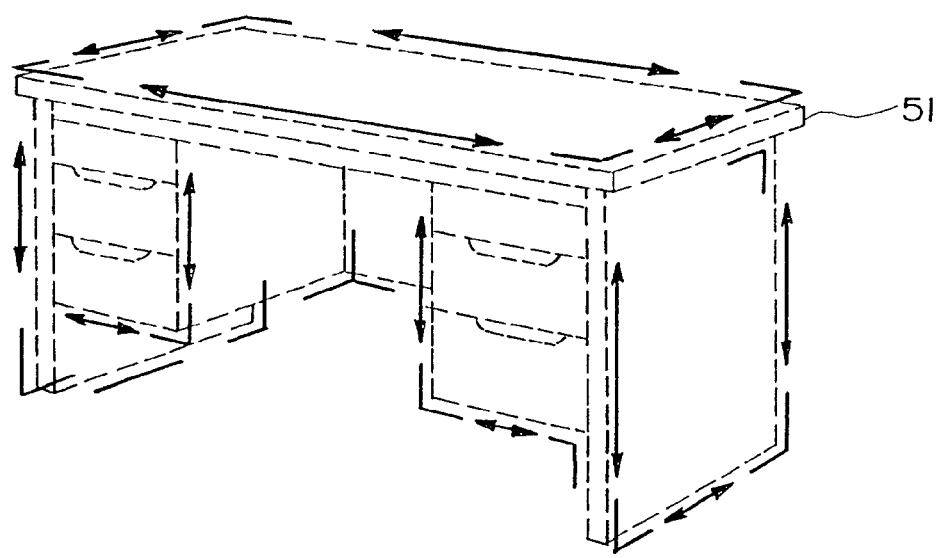
FIGS. 11A and 11B are schematic diagrams of part information for comparison of basic elements.
Figure 11B:
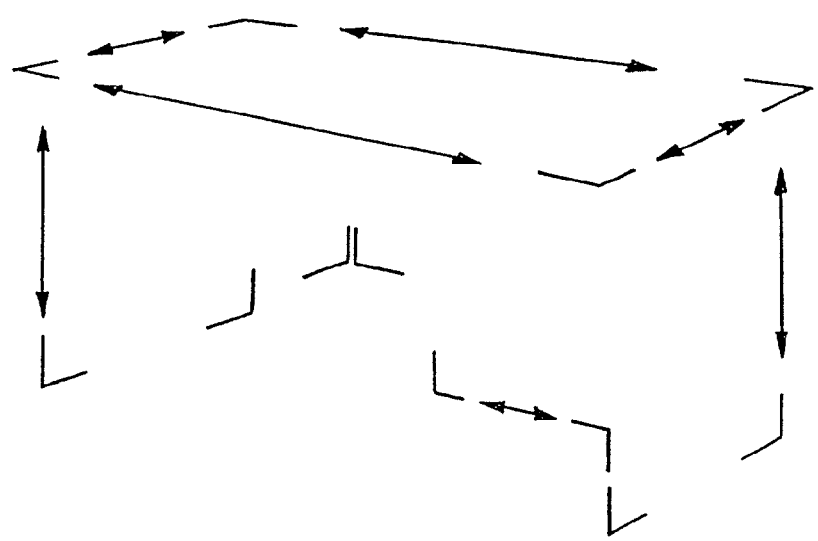

FIG. 11 shows an example of part information for comparison decomposed to basic elements. FIG. 11A schematically shows a state where the outline of the desk 51 as a part is decomposed into line segments of straight line portions and corner portions. FIG. 11B shows part information for comparison obtained by extracting only the main basic elements.

(1-1) Element Extracting Filter

Further, each basic element is described by an element extracting filter. The element extracting filter takes the form of a two-dimensional matrix or three-dimensional matrix in which a high point is given to a pixel which coincides with the basic element or composite element and a low point is given to a pixel apart from the shape of the element.

Figures 12A, 12B:
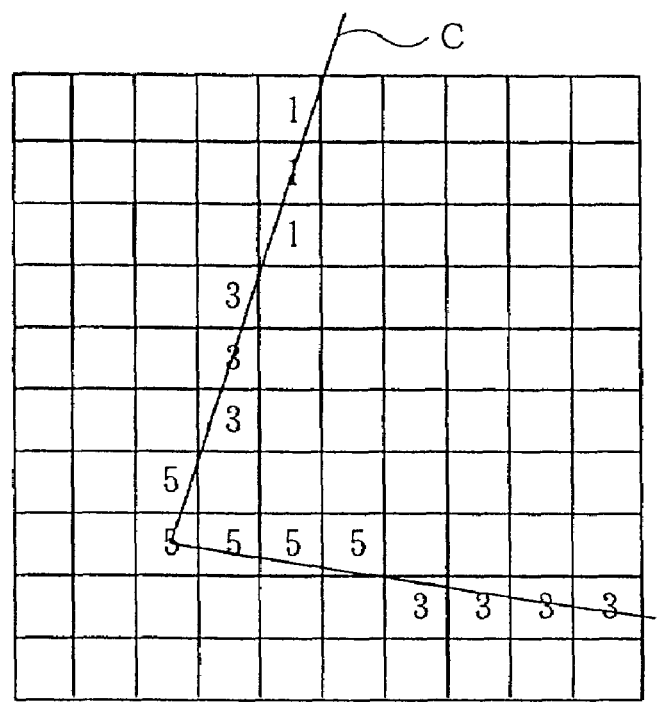
FIGS. 12A and 12B are explanatory diagrams of an element extracting filter.

FIG. 12A shows an example of the two-dimensional element matrix. The element matrix corresponds to the basic element of the corner portion of an L-letter shape. "5" is given to a portion which coincides with the shape of the basic element and the points decrease step by step like "3," "1," "1," and "−3" as the distance from the L-letter shape increases.

The values and distribution of the points can be arbitrarily set.

In the case of using the element extracting filter, the retrieving unit retrieves, as a corresponding portion, a portion in which the total point of the pixels that coincide with the basic element or composite element of the image information for comparison is the highest.

For example, FIG. 12B shows a state where an L-letter portion C in the outline in the image information for comparison overlaps with the element extracting filter. When the L-letter portion accurately coincides with the basic element of the element extracting filter, the total point becomes "5×15=275." In contrast, the total point of the case shown in FIG. 12B is "1×3+3×3+5×5+3×4=49." By turning or moving the element extracting filter on the image information for comparison, the portion in which the total point is the highest may be retrieved.

Figure 13A:
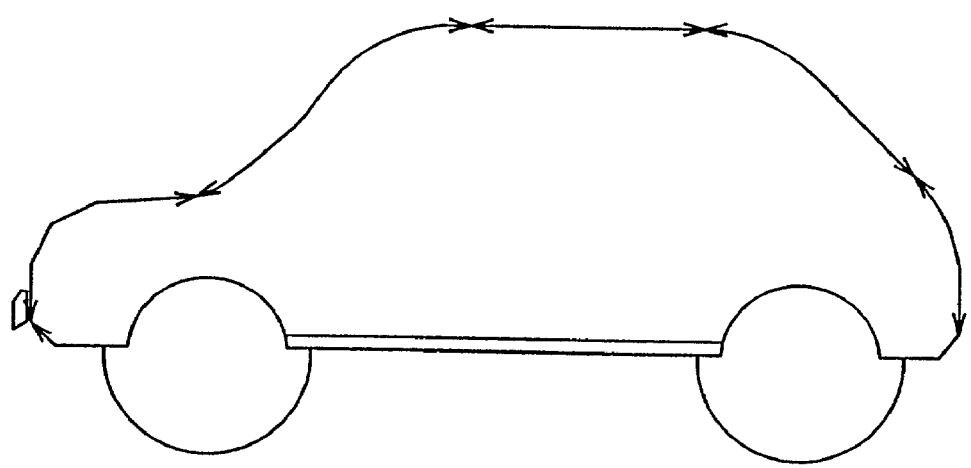
FIGS. 13A and 13B are schematic diagrams for explaining deformation of a basic element.

Further, by using the element extracting filter, the permissible range at the time of the retrieving process can be widened. FIG. 13A shows the part information for comparison obtained by decomposing the outline of a car into basic elements. In FIG. 13A, the basic element of each of a straight line portion and a curve portion in the outline is indicated by a double-headed arrow.

Figure 13B:
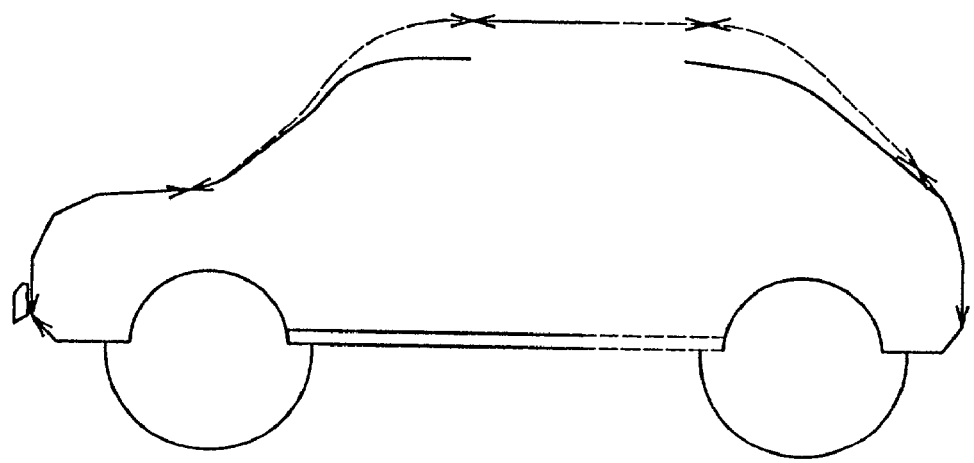

FIG. 13B shows a state where a car of a similar shape can be also retrieved by giving a permissible range to the length of each basic element.

Figure 14A:
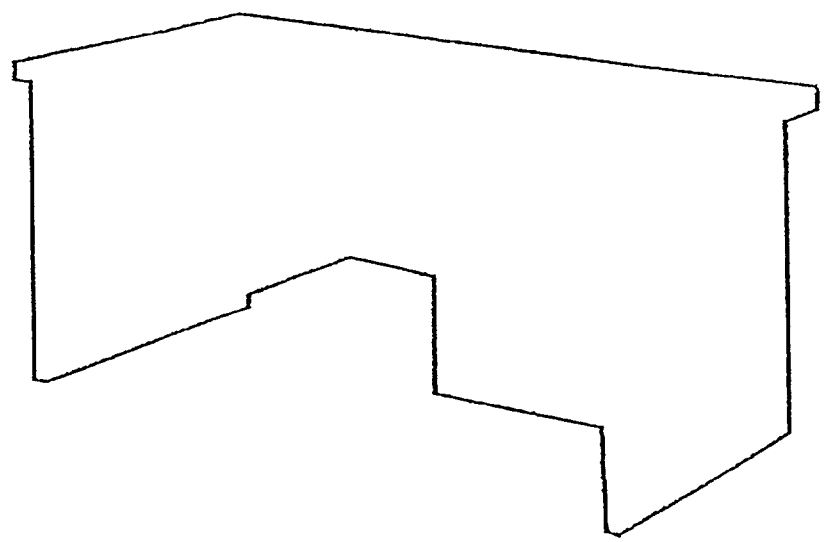
FIGS. 14A and 14B show examples of the part information for comparison.
Figure 14B:
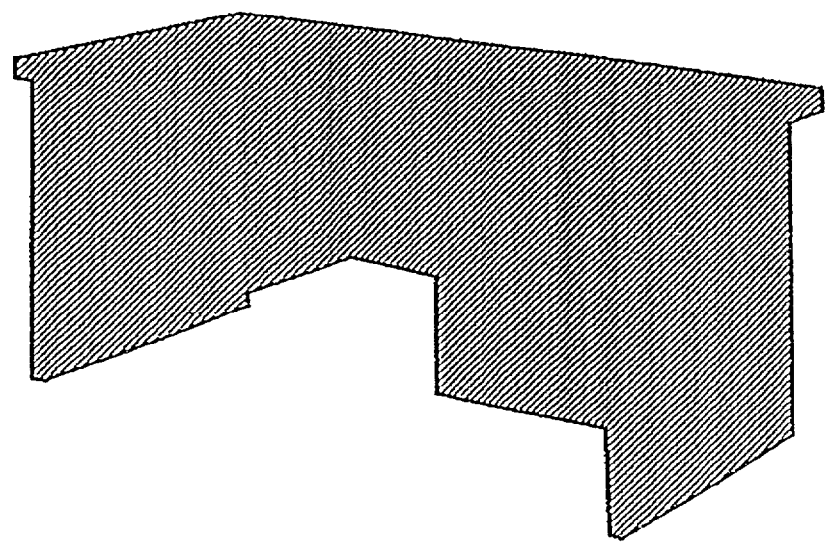

As the part information for comparison of the basic element or composite element, not only each of the above-described line segments of the outline but also an outer outline signal shown in FIG. 14A or a silhouette signal shown in FIG. 14B can be also used.

In the second embodiment, the comparison image generating unit 200 extracts basic elements of the outline or the like as image information for comparison and generates a set of the basic elements or composite elements, and the retrieving unit retrieves a portion corresponding to the basic element or composite element of a part from the image information for comparison.

(2) Image Information for Comparison

Figure 15:
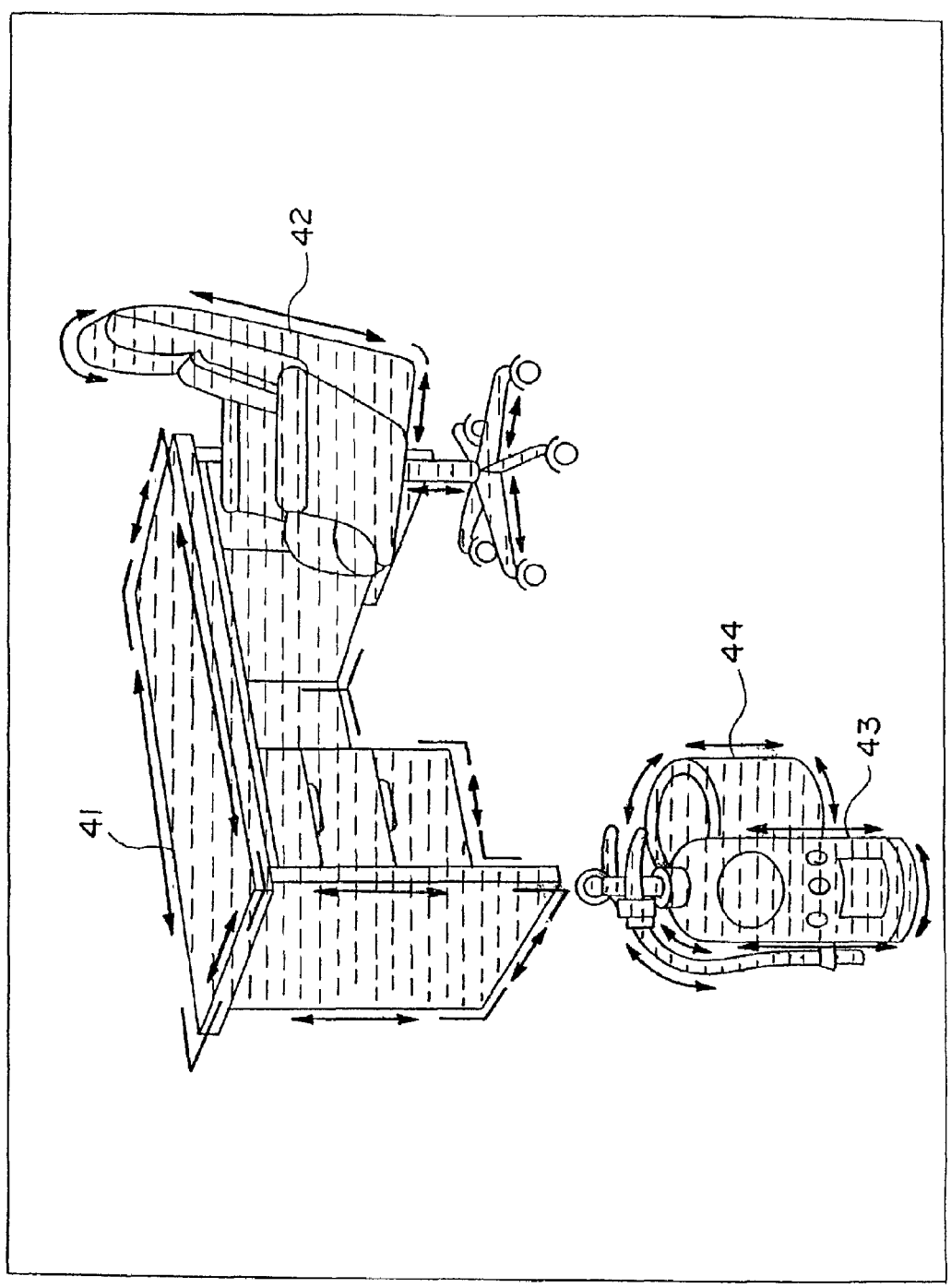
FIG. 15 is a schematic diagram of image information for comparison decomposed to basic elements.

FIG. 15 shows an example of the part information for comparison represented by a set of basic elements of an outline or the like. FIG. 15 schematically shows a state where the outline of each of the desk 41 as a part, chair 42 as a part, fire extinguisher 43 as a part, and dust box 44 as a part is decomposed to line segments of straight line portions and corner portions.

Figure 16A:
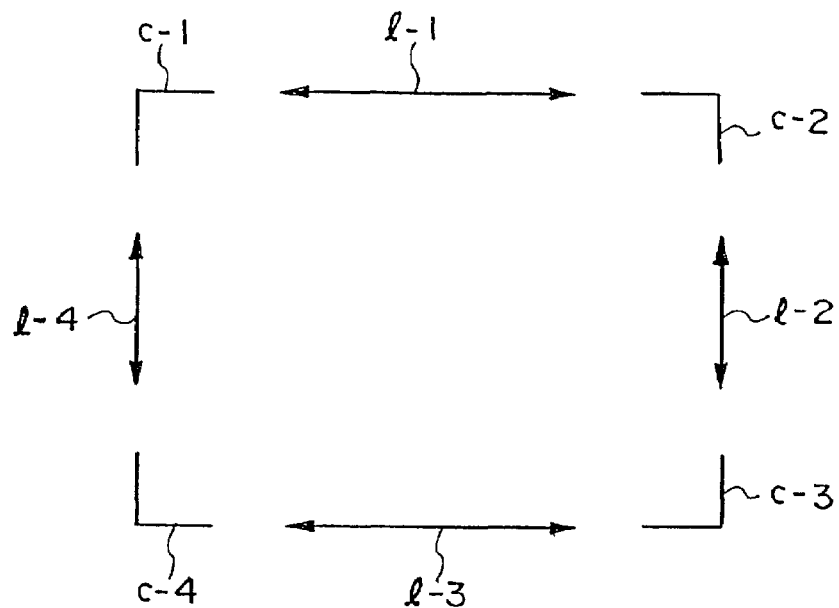
FIG. 16A is a schematic diagram of part information for comparison of composite elements of a characteristic portion.
Figure 16B:
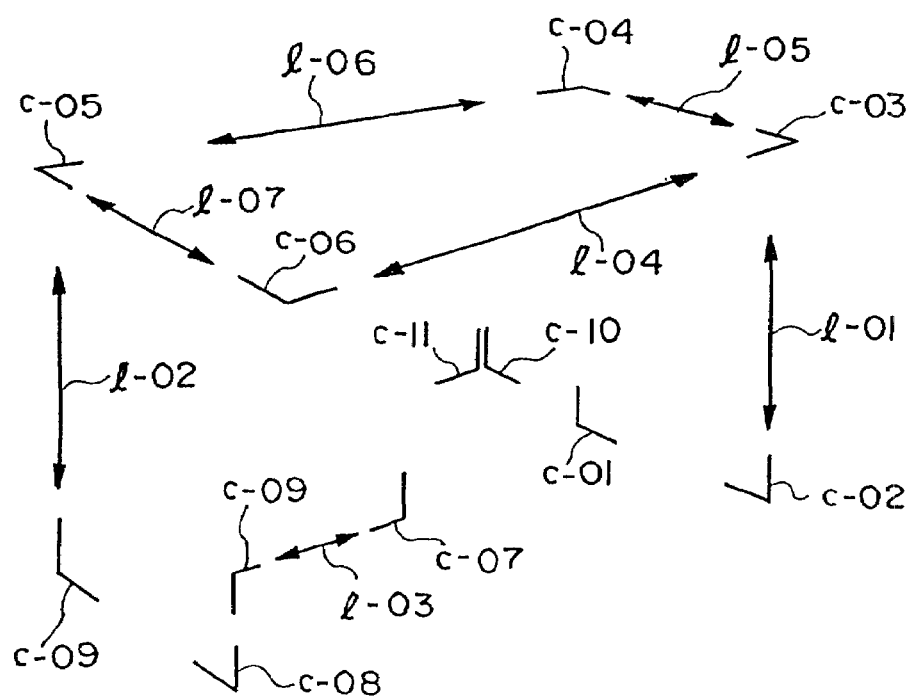
FIG. 16B is a schematic diagram of a portion of pixels for comparison decomposed to basic elements.

At the time of retrieval, in the second embodiment, the comparison part generating unit 400 further generates, as part information for comparison, a composite element of only a characteristic portion of the attribute data of a part. For example, in the case where the desk 51 as a part is decomposed to basic elements, as shown in FIG. 16A, a composite element is generated only by basic elements defining a top board. The composite element of the top board is defined by four corner portions and four straight line portions sharing the visual point with the corner portions. Element identification codes (c-1 to c-4) are given to the corner portions and element identification codes (l-1 to l-4) are given to the straight line portions.

The composite element of the top board is specified only by the coupling relation of the basic elements. Specifically, information of the direction, distance, and shape of each basic element is erased and only the order of coupling the basic elements has meaning.

In the second embodiment, the retrieving unit 510 searches the comparison image shown in FIG. 15 for a portion corresponding to the composite element of the top board on the unit basis of the basic element or composite element.

An example of retrieving the basic elements corresponding to the composite element of the top board (corners c-1 to c-4 and lines l-1 to l-4) from basic elements (corners c-01 to c-11 and lines 1-01 to 1-07) of the outline of the image 41 of the desk among the basic elements of the outline shown in FIG. 15 will be described.

FIG. 17A shows a list of vector display of the corners and lines on the part side. FIG. 17B shows the corresponding relation between the corners and lines on the part side. FIG. 17B shows that the corners and lines share vectors and the coupling order forms a loop.

FIG. 18 shows a list of vector display of the corners and lines on the part side. FIG. 19 shows corners and lines having the same coupling relation as that of the composite element of a transition difference among the corners and lines on the part side illustrated in FIG. 18. Among the basic elements shown in FIG. 16B, a portion defined by four corners (c-03 to c-06) and four lines (1-04 to 1-07) is determined to be a corresponding portion.

The correspondence relation of the corners and lines may not be perfectly coincided. For example, when corners and lines of a predetermined ratio or higher correspond, a portion defined by them may be determined as a corresponding portion.

Subsequently, after the corresponding portion to the basic element or composite element of the characteristic portion is retrieved, the recognizing unit 520 detects the correspondence between the corresponding portion and the basic element or composite element out of the characteristic portion of the same part, and recognizes the corresponding portion as an object image. Concretely, when a portion corresponding to the composite element of the top board is found, the recognizing unit 520 further detects that the basic element or composite element out of the top board portion of the same part shown in FIG. 16B also corresponds, and recognizes the corresponding portion as the object image of the desk.

(3) Specifying Process

Figure 20:
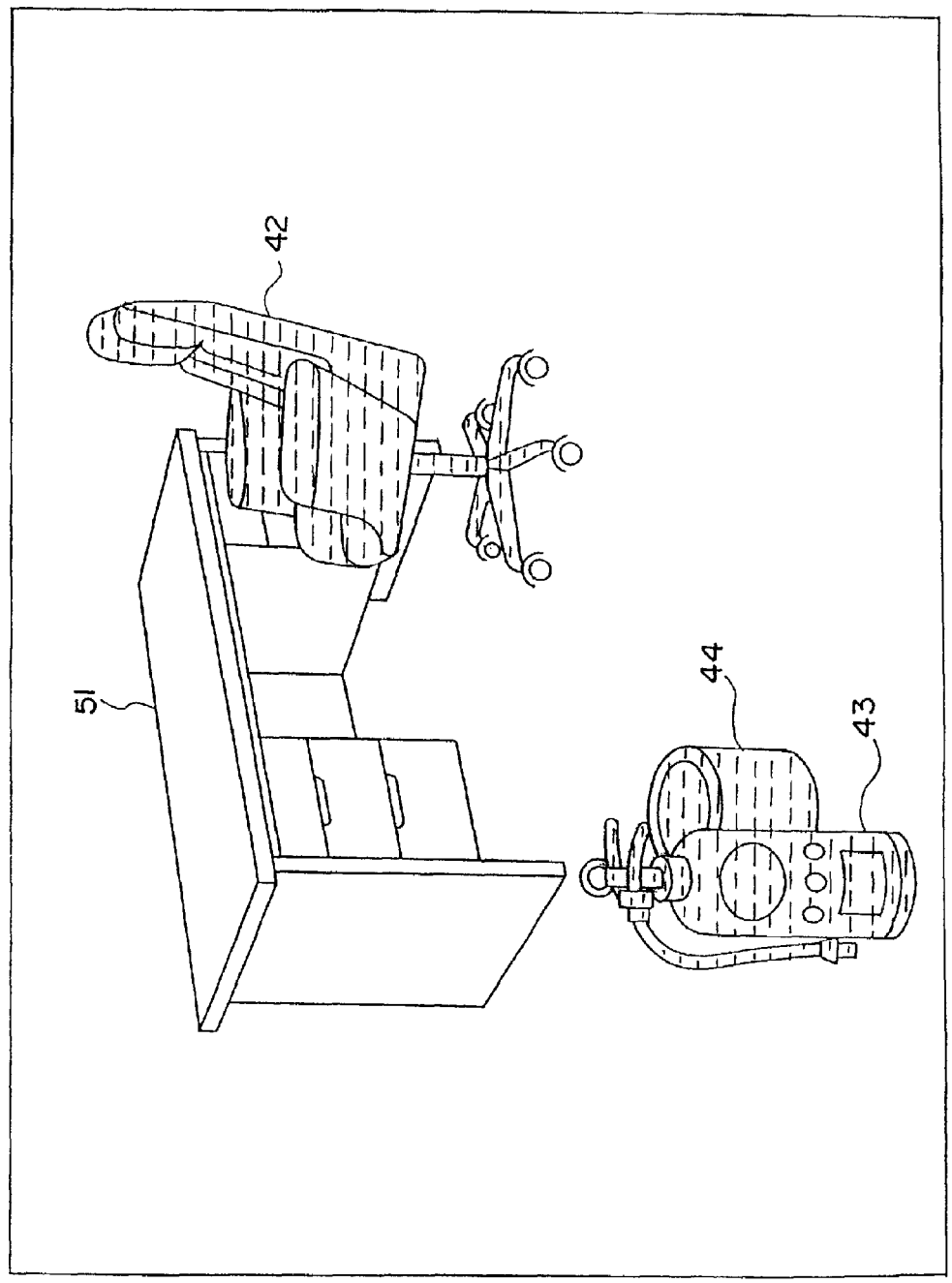
FIG. 20 is a schematic diagram showing that a desk portion in an input image is specified.

Further, the specifying unit 530 obtains the direction of the top board from the shape of the detected top board portion. The specifying unit 530 further obtains the direction of the desk, confirms that the outline, silhouette, and hue of the part correspond to the object image, and specifies the part. FIG. 20 schematically shows a state where only the desk portion is specified in the input image.

As described above, by the basic elements or composite element of the characteristic portion of the part, the part can be specified by efficiently performing the retrieving process.

It is desirable to register the method of designating and retrieving part information for comparison in the second embodiment as self-specifying information into the attribute data of a part.

Third Embodiment

Referring to FIGS. 21 and 22, a third embodiment will be described.

The configuration of an information converting system in the third embodiment is basically the same as that of the first embodiment shown in FIG. 1.

Figure 22A:
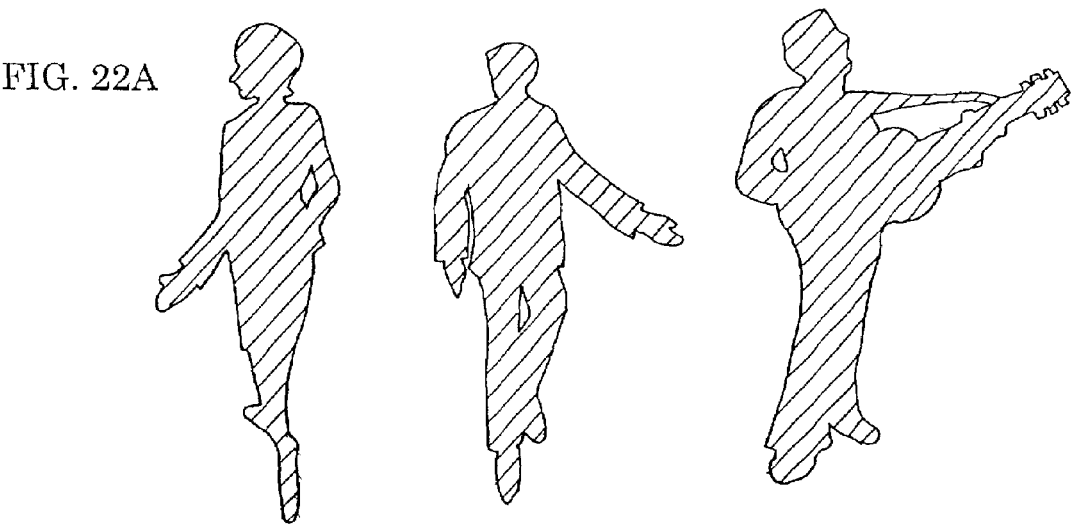
FIG. 22A shows silhouettes as general parts and FIG. 22B shows an element extracting filter of a silhouette.

In the second embodiment, however, different from the first embodiment, general parts of human beings are registered in the database 300. A generalized part is obtained by giving common attribute data to parts modeled on objects in a group as attribute data of a general part commonly modeled on the object group. In this case, as general parts of human beings, as shown in FIG. 22A, various silhouettes are given as attribute data.

Figure 21A:
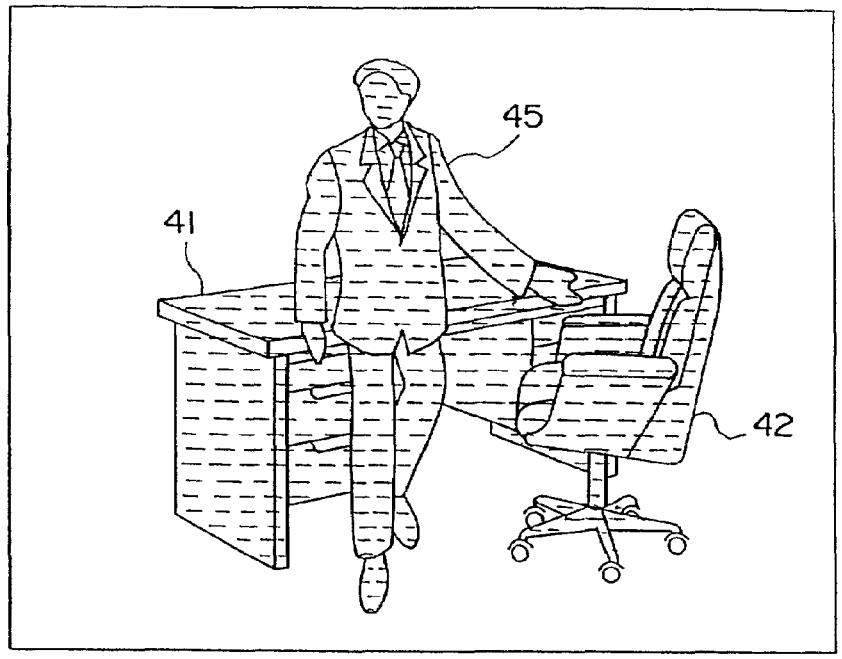
FIG. 21 shows input images in a third embodiment.
Figure 21B:
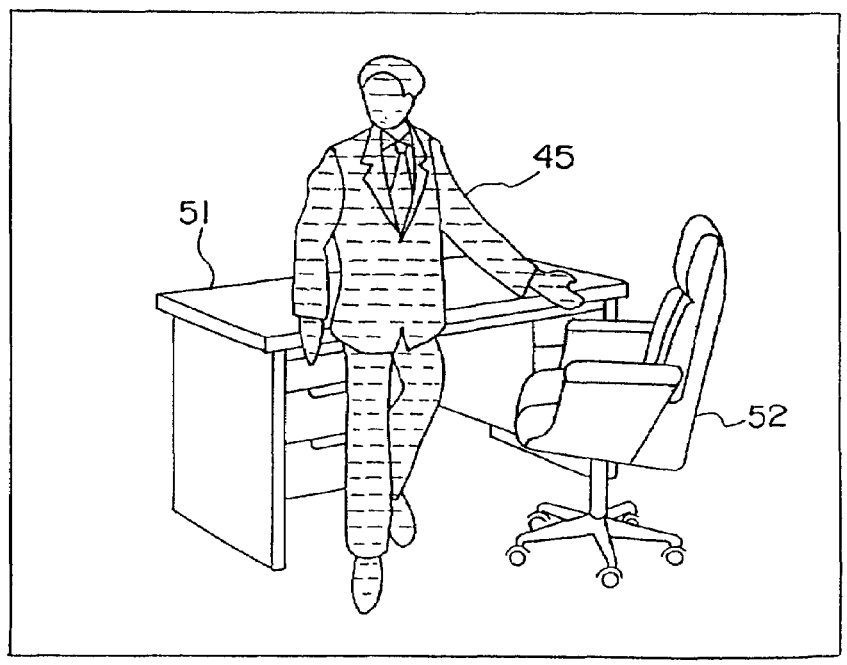

In the third embodiment, as shown in FIG. 21A, an image 45 of a human being is included in the input image. In this case, with respect to the desk image 41 and the chair image 42, the desk 51 as a part and the chair 52 as a part can be specified in a manner similar to the foregoing first or second embodiment. After those parts are specified, as schematically shown in FIG. 21B, only the portion of the human being image 45 remains as an unspecified portion.

In the third embodiment, whether the silhouette of the portion corresponds to any of the silhouettes of the general parts or not is determined. For the determination, it is preferable to use a silhouette element extracting filter (element operator) as shown in FIG. 22B.

Figure 22B:
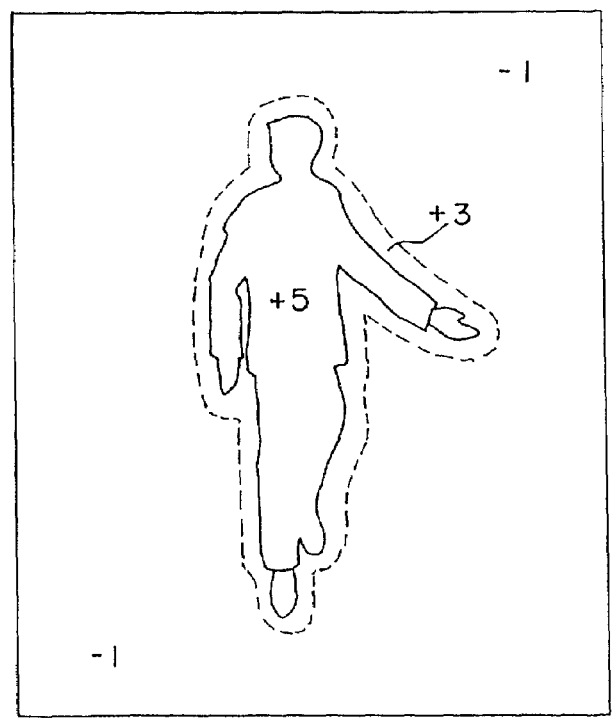

In FIG. 22B, pixels in the element extracting filter are not shown.

In the element extracting filter of FIG. 22B, point "5" is given to a pixel in a portion which coincides with the silhouette of the general part. Point "3" is given to a pixel near the silhouette. Point "−1" is given to a pixel in a portion apart from the silhouette.

The kind and position of the element extracting filter in which the total point of the pixels coinciding with the silhouette of the unspecified portion is the highest are obtained, thereby specifying the general part.

When a general part is specified, as necessary, a concrete part related to the general part may be specified. By specifying the object at two stages, the object can be efficiently specified.

Fourth Embodiment

Figure 24:
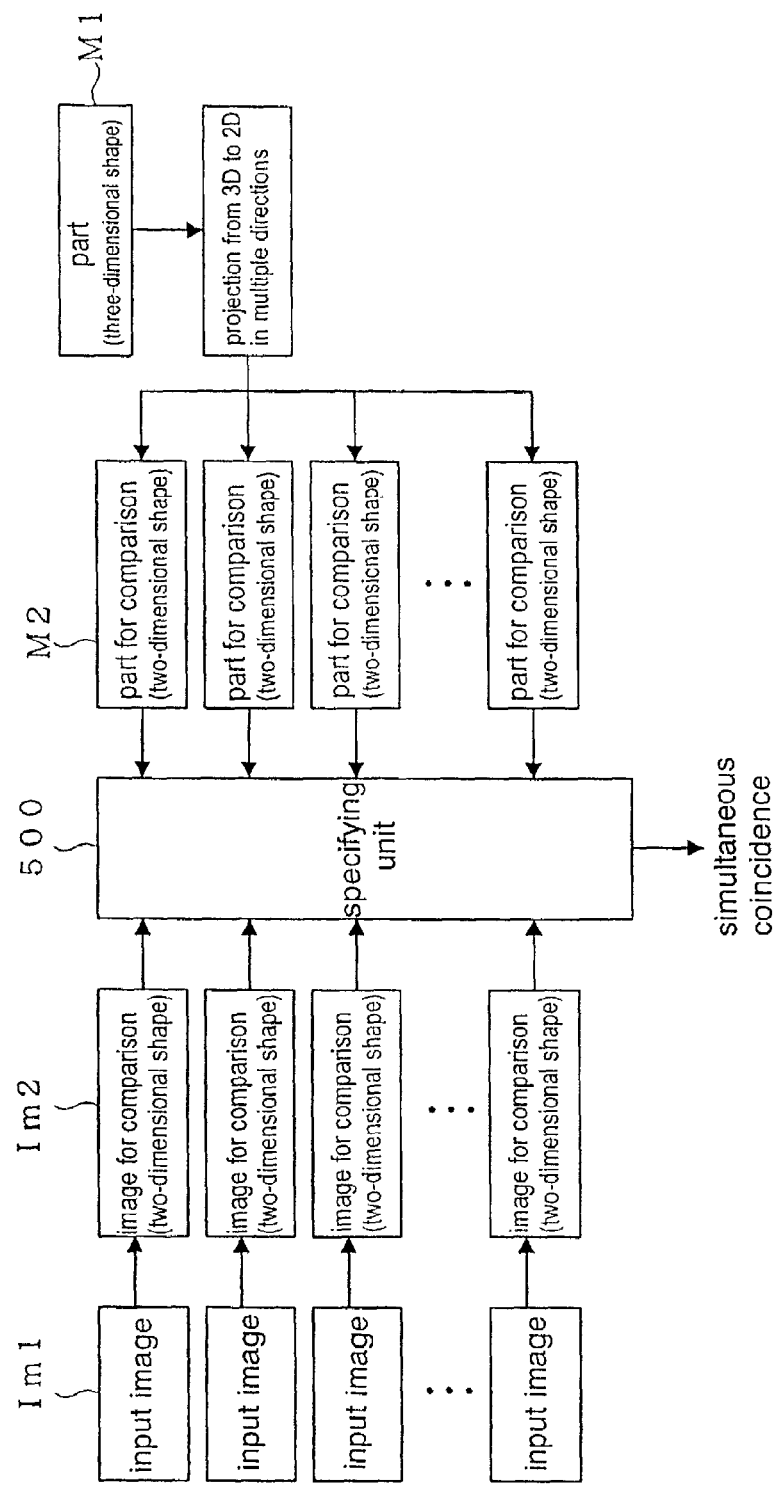
FIG. 24 is a block diagram for explaining a fourth embodiment.
Figure 25:
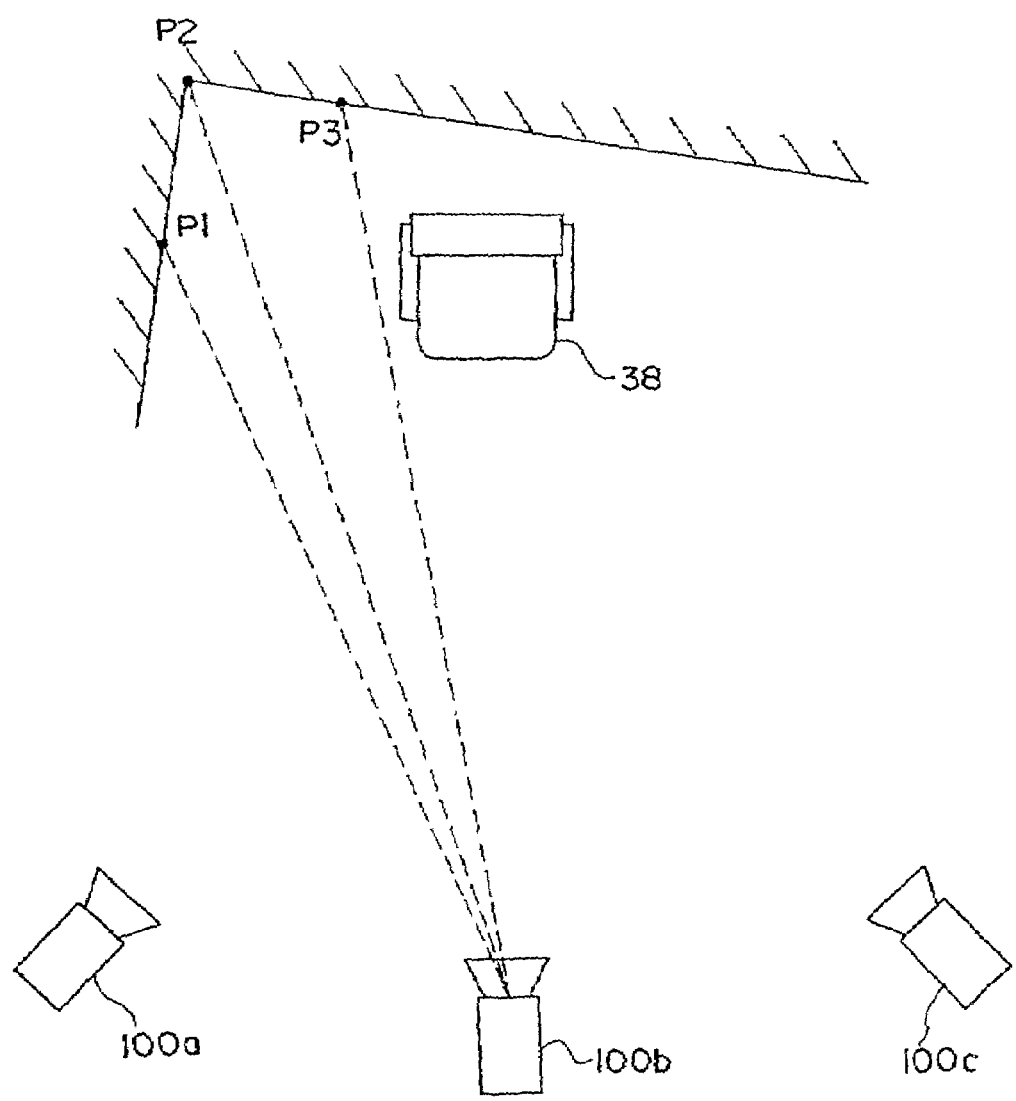
FIG. 25 is an explanatory diagram showing the placement relation of an object and a camera in the fourth embodiment.

Referring to FIGS. 24 to 26, a fourth embodiment will be described.

The configuration of an information converting system in the fourth embodiment is basically the same as that in the first embodiment shown in FIG. 1.

Figure 26A:
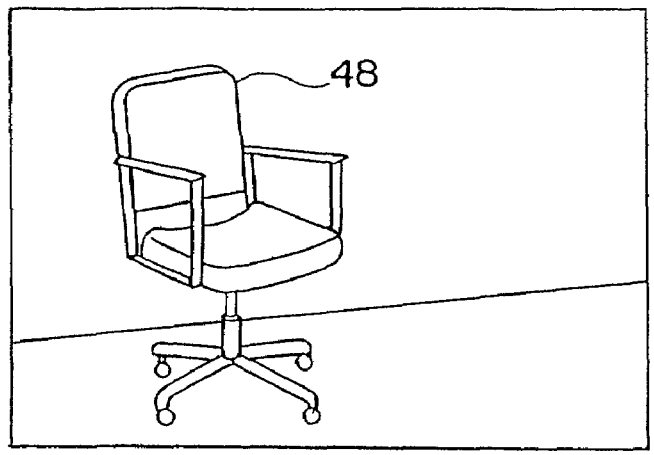
FIGS. 26A to 26C show input images in the fourth embodiment.
Figure 26B:
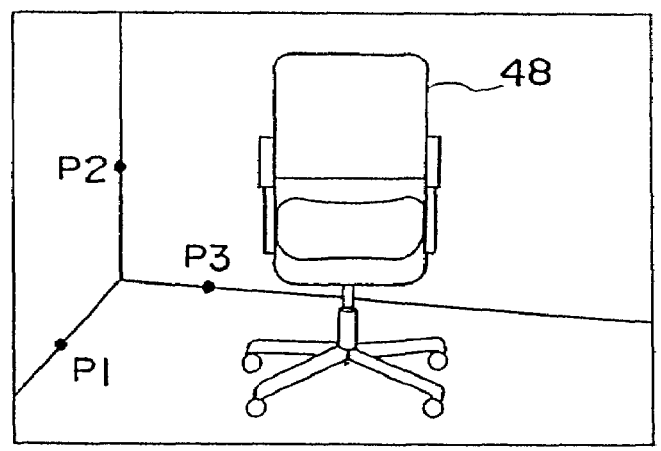
Figure 26C:
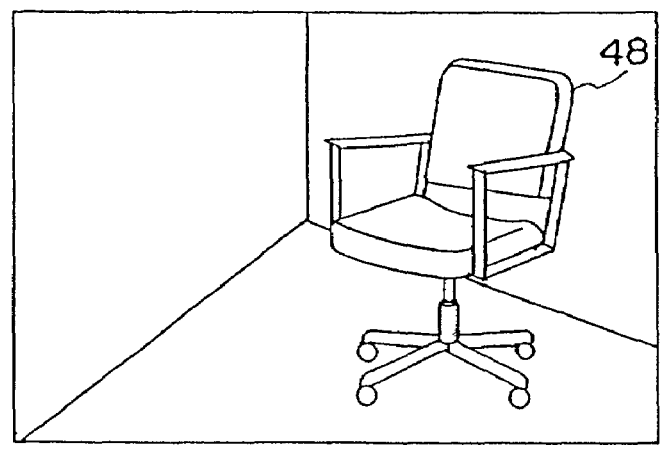

However, in the fourth embodiment, different from the first embodiment, a plurality of input units 100 obtain input images Im1 of the same object photographed from known directions which are different from each other. FIG. 25 shows a state where images of a chair 48 as an object are acquired by cameras 100a to 100c in three directions which are different from each other. FIGS. 26A to 26C show input images obtained by the cameras 100a to 100c, respectively.

The comparison image generating unit 200 generates comparison image information Im2 including two-dimensional shape data from the input images obtained by the input units 100.

On the other hand, the comparison part generating unit 400 generates the comparison part information M2 having two-dimensional shape data obtained by projecting three-dimensional shape data of a part M1 into a plurality of known directions which are different from each other.

The part specifying unit 500 specifies the part M1 for each of the image information Im2 for comparison. In this case, since the same chair image is included in all of the image information for comparison, the same part is supposed to be specified. Therefore, the part specifying unit 500 confirms that the chair as a part is specified for each of the image information Im2 for comparison.

When the same part can be specified for the chair seen from the plurality of directions as described above, the precision of specification of a part can be improved. As a result, the reliability of recognition of the object can be improved.

The input units 100a to 100c can obtain the overlap of three-dimensional spaces in the acquisition range of input images and the viewpoint positions of the input units on the basis of the object images in the input images of the object of which three-dimensional shape and position are known, obtained from different directions. The specified and settled part has three-dimensional shape data and three-dimensional coordinate data. Consequently, from the object image obtained by photographing a known object, the direction of the viewpoint for the object can be derived. Further, the direction of the viewpoint of the case where the object is photographed from another direction can be also obtained. Therefore, the viewpoint direction and the viewpoint position of each of the input units for acquiring images of the same object from various directions can be obtained by parts specified and settled with respect to the object. For example, as shown in FIG. 26B, by providing three markers P1 to P3 in known positions, the position of the camera 100b can be obtained according to how the markers are seen.

A plurality of input images are not limited to those acquired at the same time. For example, also in the case where images of the object are captured from directions which are different from each other while sequentially moving a single input unit, the viewpoint position can be obtained similarly.

Fifth Embodiment

Figure 27:
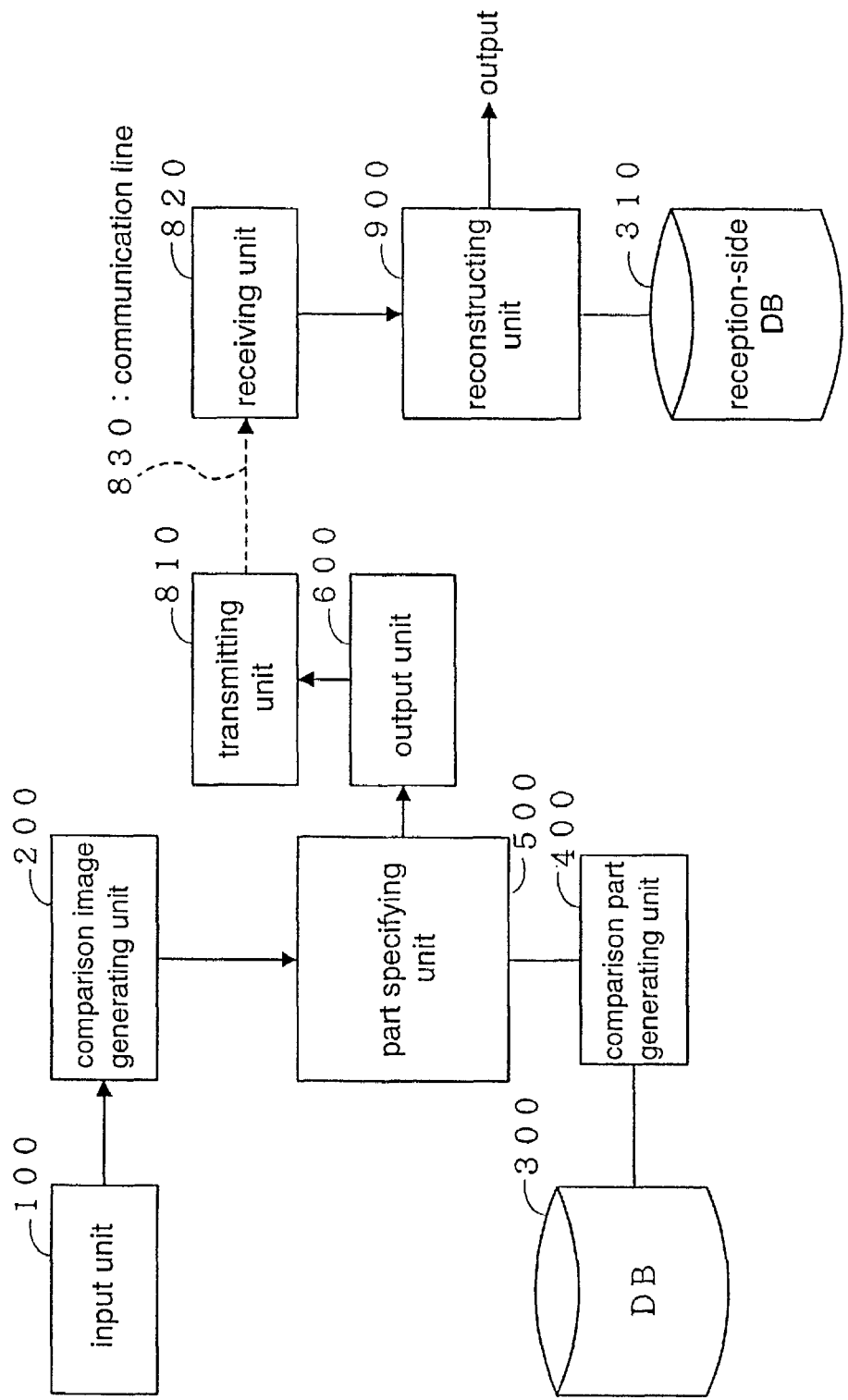
FIG. 27 is a block diagram for explaining the configuration of an information converting system of a fifth embodiment.

Referring to FIGS. 27 to 29, a fifth embodiment of the invention will now be described.

First, with reference to the functional block diagram of FIG. 27, the configuration of an information converting system of the fifth embodiment will be described. As shown in FIG. 27, the information converting system of the fifth embodiment is separated into a transmission side and a reception side.

The information converting system of the fifth embodiment has, in addition to the configuration of the foregoing first embodiment, a transmitting unit 810, a receiving unit 820, a reception-side database 310, and a reconstructing unit 900.

The transmitting unit 810 transmits an identification code output from the output unit 600 to a communication line 830. The receiving unit 802 receives the identification code. In the reception-side database 310, an identification code and attribute data are associated with each other and registered. The reconstructing unit 900 searches the reception-side database for attribute data of a part corresponding to the identification code and outputs the corresponding attribute data. In such a manner, by transferring the identification code of each part, the amount of the image information is largely reduced, and high-speed transfer of the image information can be realized.

FIG. 28 shows an example of the data structure in the reception-side database 310.

For example, when reproduction of image with fidelity is intended, desirably, the contents of the reception-side database 310 are the same as those of the database 300 on the transmission side. However, in the case of the other purposes such as the case where only information such as a placement state of objects is desired to be transferred promptly, the contents of the databases do not have to be always the same each other. For example, for easy explanation for children, although it is different from an object, the object may be reproduced as a part symbolically representing the object by animation or illustration.

Figure 29A:
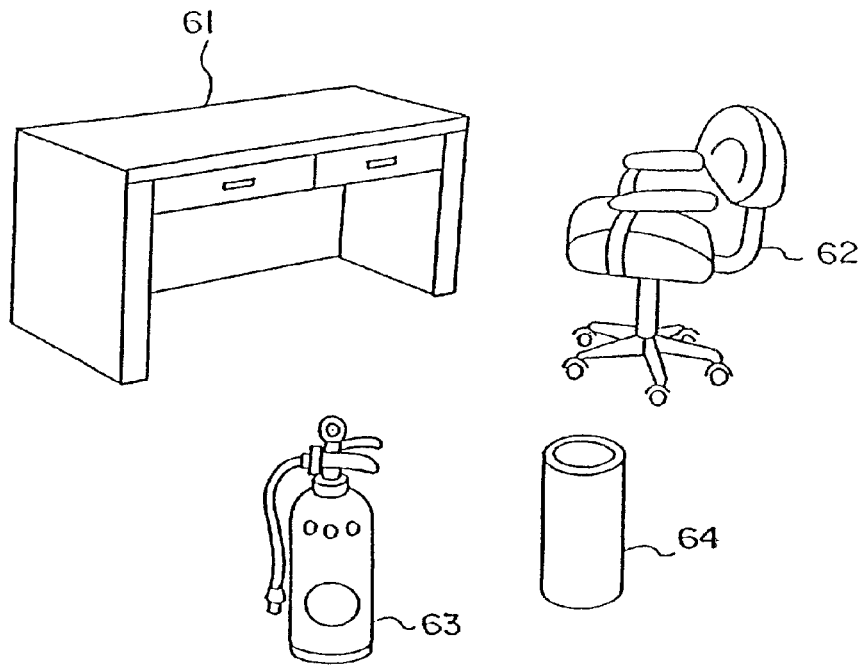
FIG. 29A is a schematic diagram of modeled parts in the fifth embodiment.

FIG. 29 shows parts and a reconstruction example in the case where attribute data of parts of the same identification code in first and second part storage 400 and 410 are different from each other. Parts 61 to 64 in FIG. 29A correspond to the same codes as the identification codes of the parts 51 to 54 shown in FIG. 7A, respectively.

However, as shown in FIG. 29A, the forms of the parts 61 to 64 are slightly different from those of the parts 51 to 54, respectively. For example, the desk 51 as a part shown in FIG. 7A is a desk having three drawers on both sides. In contrast, the desk 61 as a part shown in FIG. 29A has two right and left drawers in parallel under the top board. The form of the chair 52 as a part and that of the chair 62 as a part are also different from each other.

Figure 29B:
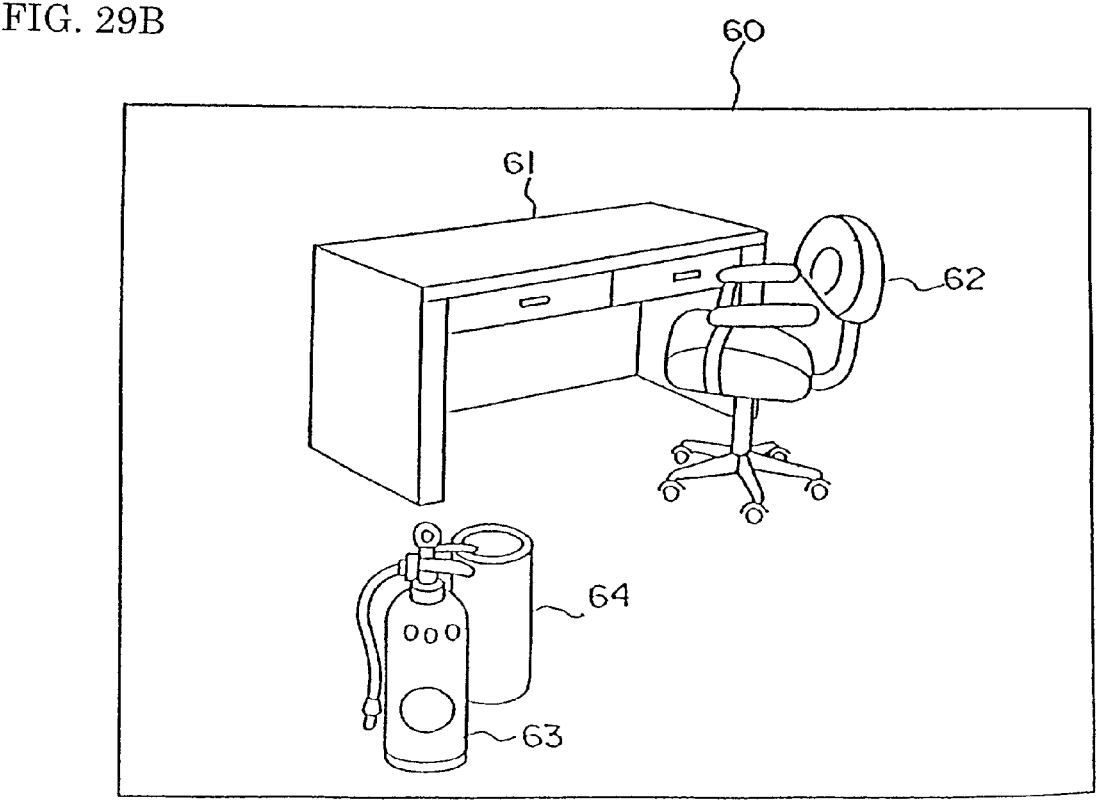
FIG. 29B is a display screen showing a reconstructed part group.

FIG. 29B shows a reconstructed image 60 of the parts 61 to 64 reconstructed by adding positional information. As shown in the reconstructed image 60, the placement relations of the parts 61 to 64 are the same as those of the reconstructed image 50 shown in FIG. 7.

Figure 30:
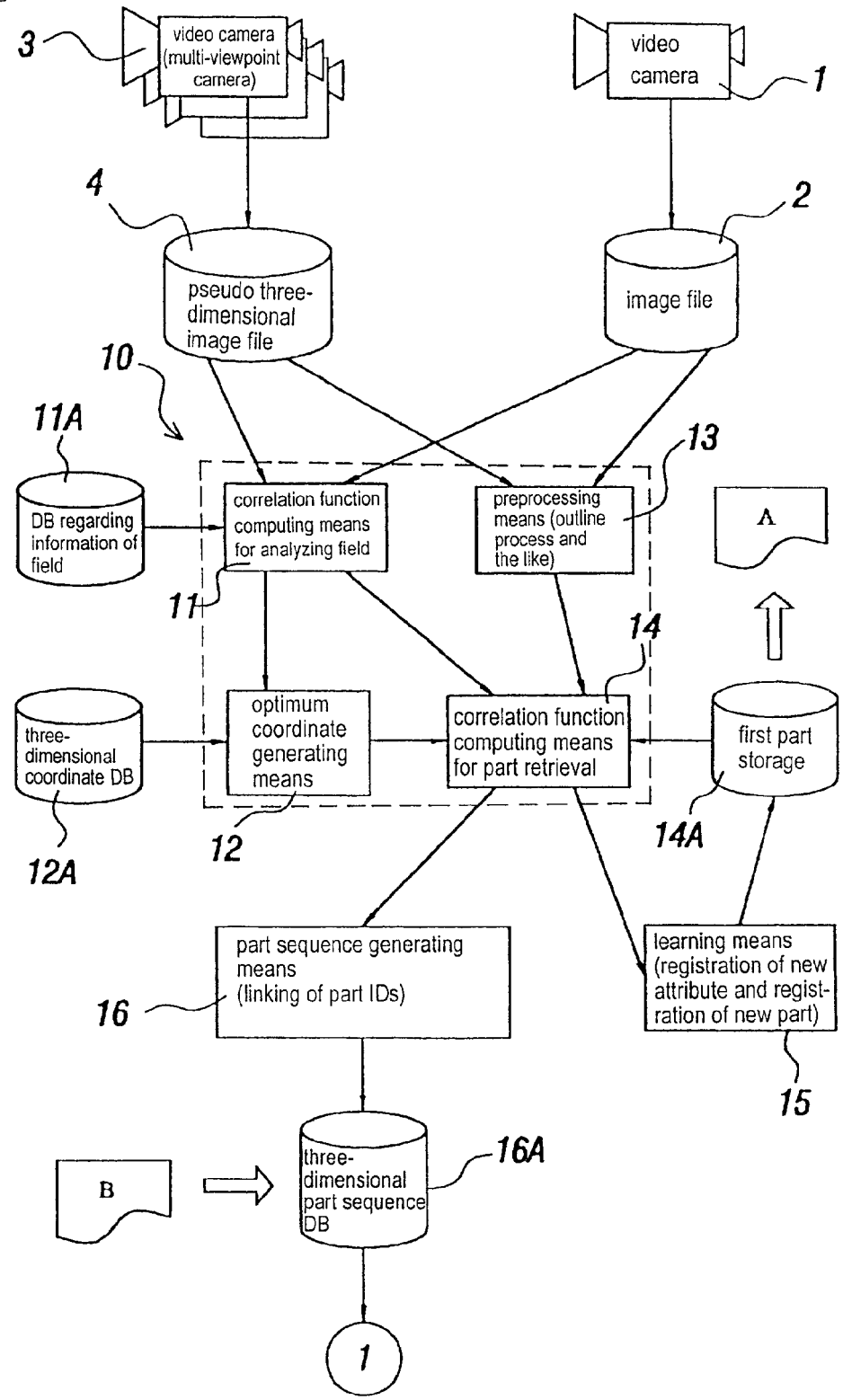
FIG. 30 is a detailed functional block diagram of an information converting system of the fifth embodiment.

Further, various concrete examples corresponding to the fifth embodiment will be described in more detail with reference to FIGS. 30 to 33. FIG. 30 shows, in place of the input unit 100, two systems of a video camera 1 as a single viewpoint camera directed to a rotating object and a video camera 3 as a multi-viewpoint camera or a mobile viewpoint camera whose viewpoint is movable (time-difference multi-viewpoint camera). Both the video cameras 1 and 3 acquire images of an object. The video camera 1 can complete image acquisition from the directions of 360° when an object rotates once. On the other hand, the video camera 3 can obtain a three-dimensional image online. Specifically, a three-dimensional image of an object can be obtained by acquiring two-dimensional images of the whole circumference of the object. Images obtained by the video cameras 1 and 3 are stored as image information into a two-dimensional image file 2 and a pseudo three-dimensional image file 4, respectively.

An image is obtained by the video camera 1 as two-dimensional information from a three-dimensional information space as an object. In this case, the three-dimensional space is converted into two-dimensional data by a digital recording method. In the case where a plurality of images having parallax (having different viewpoints) of an object are obtained, three-dimensional information which can be recognized as a pseudo three-dimensional image of which viewpoint direction is limited can be obtained. On the other hand, an image can be obtained by the video camera 3 as three-dimensional image directly from the three-dimensional information space as an object. A moving image having motion parallax due to movement or a still image having no parallax caused by motion of the object is obtained and processed in a manner similar to the above and the processed image is stored in the image file 2 or 4.

As shown in FIG. 30, image information of the object stored in such a manner is analyzed by an image code converting apparatus 10 corresponding to the part specifying unit 500 and, after that, converted to an information code as an ID (key) or a code in correspondence with the kind of the information, the number of pieces of the information, and the details such as a rough position of the object, the direction of a line segment, color, and texture so as to be associated with the details. Specifically, the information code converting apparatus 10 has a correlation function computing means 11 for analyzing a field for making an analysis on the basis of a field information database 11A, an optimum coordinate generating means 12 for generating optimum coordinates in an image by analyzing the result of computation of the correlation function computing means 11 for field analysis on the basis of a three-dimensional coordinate code database 12A, a preprocessing means 13 for performing an outline process or the like on an item, a body, or the like as an object whose outline in image information is clarified by analysis in the further obtained image, and a correlation function computing means 14 for part retrieval for making conversion into sequence codes of items on the basis of data obtained from the means 11, 12, and 13 and generating an information code to be combined with the sequence code.

In the information code converting apparatus 10 having the above configuration, the data such as outline obtained by the preprocessing means 13, the field data obtained by the correlation function computing means 11 for field analysis, the optimum coordinate data obtained by the optimum coordinate generating means 12, and the like as bases are converted to the sequence code of items by the correlation function computing means 14 for part retrieval. In the correlation function computing means 14 for part retrieval, the sequence code derived by the conversion is associated with each of information pieces regarding various objects to be recognized and compared and contrasted with data regarding the object (refer to the example A of storage data in FIG. 3) preliminarily registered, generated, and stored in a three-dimensional part storage (database) 14A as a first part storage to select data regarding the corresponding object, and an information code to be combined with the sequence code is generated.

In the field information database 11A in the correlation function computing means 11 for field analysis, a lump of objects is classified as a database. For example, at the time of making frequency analysis on image information regarding an object obtained as an image, setting can be made so as to recognize the upper and lower sides in such a manner that the complicated side on which the frequency component is high is recognized as a lower or upper side and a brighter side is recognized as an upper or lower side. The far and near sides can be also recognized in such a manner that the side in which a frequency component is high is set as a complicated far side. It is also possible to divide a space into outdoor, indoor, air, sea, and so on to thereby limit parts existing in the divided space, store the above as parts, and divide time into morning, daytime, seasons, and so on.

In the case where meaning, such as placement which is impossible from the viewpoint of probability or contradictory placement, is generated retrieval of the object and parts should be redone.

In the preprocessing means 13, edges are obtained to extract an outline or the like so as to recognize the object acquired as an image, a coordinate system which facilitates arrangement of the objects is obtained, an effective three-dimensional mesh is generated, and a part is converted to edges and compared. For example, by detecting a horizontal plane and a vertical plane, attention is paid to one part and azimuth coordinates are determined. The part whose azimuth coordinates are determined is regarded as a part whose three-dimensional coordinates are obtained. The azimuth coordinates can be always mutually converted to an orthogonal coordinate system (three-dimensional stationary coordinate system), and a conversion equation can be derived.

As a first method of forming a three-dimensional image, when a part can be specified, the same part can be determined in a different acquired image. Therefore, by positioning parts (coupling of images), images can be generated and coupled as a three-dimensional image. As a second method, by moving and turning the viewpoint of the camera, the azimuth coordinate system changes so as to follow the viewpoint of the camera. Therefore, when the azimuth coordinate system is seen from a reproduced part sequence, the visual field of the image can be widened. On the contrary, the amount of the moving and turning of the camera can be calculated from the movement of a part and deformation of the part, that is, deformation of the azimuth coordinate system.

With respect to coupling of images, it is not always necessary to obtain the camera position, movement, and rotation. As long as a part is specified, the azimuth coordinates are unconditionally obtained from deformation of the specified part. That is, even when acquired images are different from each other, by tracing the azimuth coordinates of a certain part, images can be coupled. Therefore, the coordinate transform formula of the azimuth coordinate system in the case where the viewpoint of the camera is moved can be derived.

In the correlation function computing means 14 for part retrieval, from acquired images of the object, the analyzed and recognized object can be specified as a part image by the correlation function computing means 11 for field analysis, optimum coordinate generating means 12, preprocessing means 13, and the like. Also, the image of the object is compared and contrasted with data regarding various parts as data regarding the object stored in the three-dimensional part storage 14A corresponding to the part image to select a corresponding part. When there is no corresponding part, a similar part can be retrieved or the object is measured with higher precision and registered as a new part.

In this case, in the three-dimensional storage 14A, as shown in FIG. 2, for example, when the object is recognized as "table-1," numerical value data of the shape is set as "25694458," numerical value data of the color is set as "2685696," and various data of the other attributes is associated as specific numerical value data. An information code called ID (identification code) or key is specified as, for instance, "1001."

Similarly, for example, the other various objects recognized are stored as specific numerical values of information codes in such a manner that "1002" is stored for "table-2," and "1003" is stored for "table-3." The attributes such as shape and color are similarly converted as data of specific numerical values. By combining the ID (key) of the recognized object and data regarding various attributes of the object in correspondence with the result of analyzing and recognizing an image, an information code can be generated.

The data regarding the object in the three-dimensional part storage 14A belongs to the correlation function computing means 14 for part retrieval on the transmission side and is provided as data corresponding to the information code. The correspondence between the data regarding the object and the information code is almost similar to the correspondence between data and information for reproducing the object of the three-dimensional part storage (database) 24A as a second part storage belonging to the part sequence processing means 24 on the reception side which will be described herein later. For example, in the case of performing conversion and reproduction on assumption that the data regarding the object and the data reproducing the object is the same as the information regarding the object to which information for reproducing the object is input, those data are satisfied as data having almost the same database configuration.

In the three-dimensional part storage 14A, as various image information obtained by the video camera 1 or 3 as information inputting means, a matter as an expected object is modeled and stored as a part. Therefore, the attributes regarding an object, for example, physical characteristics of the object such as size, characteristics of the outer shape such as a corner, a curved surface, and a circle, color, material, weight, symmetry, surface reflectance, luster, smell, spectrum of sound, and life are stored in a database. Further, the other various attributes such as numerical values indicative of danger or taste, manufacturing date, manufacturer, and object's existing position condition such as outdoor or indoor are also stored in a database.

The relation with another body such as affinity to another part or exclusion of another part, the relation with another body regarding characteristics for recognizing a body, the priority of the characteristics for recognizing a body, the other attributes, the relation with another body, and the like, and the other characteristics are also arranged in order.

To an existing part, for example, to a part such as a car, various parts such as body, tires, steering wheel, and engine are coupled. Therefore, a part is set so as to be recognized as a part even if it is constructed by the various parts.

To the three-dimensional part storage 14A, by the correlation function computing means 14 for part retrieval, a learning means 15 for learning information regarding an object to which a code is not given in the correlation function computing means 14 for part retrieval can be connected. The learning means 15 is constructed so as to register a new object itself as a new part and register a new attribute of an object. In the case of information regarding an object which is not set in a database, the learning means 15 converts it to an approximate information code as a part having high existence probability and learns the converting operation.

A part sequence generating means 16 for linking an obtained image or the like of the object each time a code is given to the image by the correlation function computing means 14 for part retrieval and analyzing the coordinates of a sequence state of the object is provided. In the part sequence generating means 16, raster/vector conversion of a sequence of objects is performed so that the object is linked with the ID of the part in the three-dimensional part storage 14A.

Specifically, in the information code converted by the correlation function computing means 14 for part retrieval, for example, in the information codes such as the above-described "table-1," "table-2," and "table-3," the coordinates, direction, and the like on an image of each code are converted to IDs or keywords. That is, the direction or the like is added to a part. Regarding formation of coordinates, the position along each of the X, Y and Z axes is given in a numerical value such as "12.236." Similarly, the direction of each of the axes X, Y, and Z is also given in a numerical value such as "0.365." Each of the numerical values is stored as a sequence code into a three-dimensional part sequence database 16A.

For example, as shown in FIG. 9, by the coordinate database 12A in which each of the coordinate and direction of an object in an image analyzed and recognized such as "table-1," "table-2," or "table-3" is analyzed and converted to numbers, data are set as a sequence code. By making the sequence code correspond to an information code set for each object, the coordinate, direction, and the like are combined with data such as the sequence code indicative of the contents of coordinate-X, coordinate-Y, coordinate-Z, direction-X, direction-Y, and direction-Z and the like. The resultant is stored in a coordinate code database.

In such a manner, in the information code converting apparatus 10, the object in the image information obtained by the video camera 1 or 3 is analyzed and recognized, compared with data regarding the object in the three-dimensional part storage 14A, identified, and converted to an information code. The sequence state of parts is also arranging the image which reproduces the parts in accordance with the sequence code (refer to FIG. 9) as keywords of the coordinates, directions, and the like sent so as to be linked with the input image of parts, and has the part sequence processing means 24 for arranging the image which reproduces the arranged parts. The image which reproduces the arranged parts is displaced as a reproduction image of the object on a display 28 such as a television monitor via an image reproducing means 27 as output means.

Since the part has attribute data of the three-dimensional shape, if there is a three-dimensional display, the image can be displayed three-dimensionally. However, the image is generally displayed as an image of a dimension of a free viewpoint.

The part sequence processing means 24 inversely converts a specific information code by the second three-dimensional part storage 24A having the database configuration almost corresponding to the first three-dimensional part storage 14A. The specific information code is obtained by converting the image of the part recognized on the basis of the data of the object in the first three-dimensional part storage 14A by the correlation function computing means 14 for part retrieval. The part sequence processing means 24 selects and converts an image which reproduces the part corresponding to the original image from the information code including the attributes such as shape and color. That is, the part sequence processing means 24 is constructed so as to reconstruct an image of the input object obtained by the video camera 1 or 3 by the vector/raster conversion of coordinates of the image which reproduces the part together with the data of a three-dimensional coordinate code database 22A and linking of the image which reproduces the part.

Figure 31:
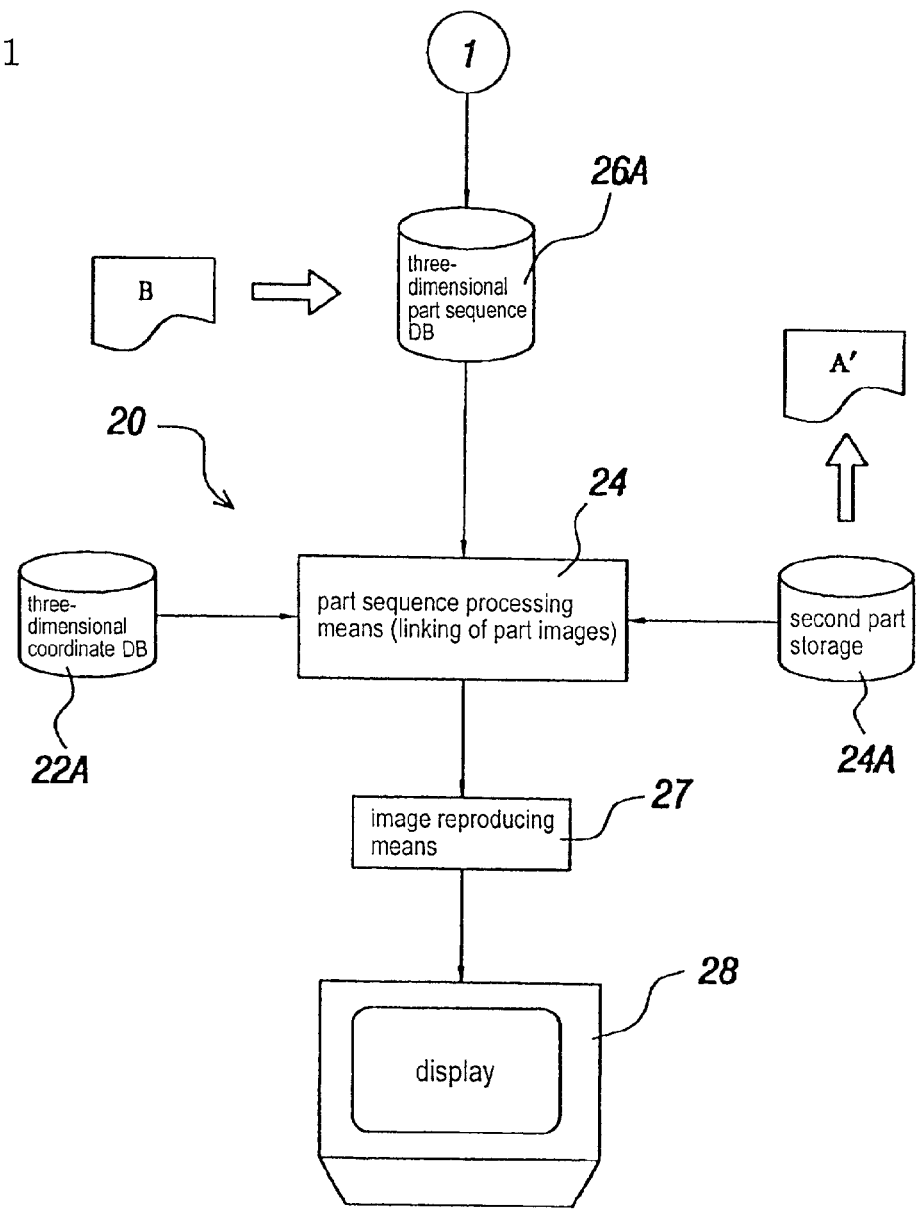
FIG. 31 is a functional block diagram continued from the functional block diagram of FIG. 30.

In this case, the sequence code as conversion data regarding part sequence is formed in a manner quite similar to that in the three-dimensional part sequence database 16A in the part sequence generating means 16 (refer to FIGS. 31 and 9). In accordance with the sequence code transmitted in relation with each of the information codes, by a three-dimensional part sequence database 26A, the coordinates of an image which reproduces a specific part are set in a position along the axes X, Y, and Z. Similarly, the directions of the image can be also arranged and reproduced as the directions of the axes X, Y, and Z.

With respect to the sequence in the case of reproducing a part, after obtaining a stationary coordinate system, for example, the parts are sequentially adhered so as to be in contact with dominant parts such as the ground surface, water surface, floor, wall, and desk registered as parts. At the time of the adhering operation, it is set so that rotation and movement vectors and the like of the parts are given, the direction, visual field range, movement vector, and the like as viewpoint information of the video camera 1 at the time of acquiring the object's image are detected, and three-dimensional coupling of images by linking screens can be also made possible.

At the time of arrangement for reproducing the parts, related information such as when, where, who, with whom, what, why, and how is also set so as to be output. In this case, it is suitable so that a process of detecting contradiction of a part, comparing the part with another part and selecting can be tried in consideration of the relation with the other parts, existing conditions, and so on. Further, in this case, in a manner similar to the three-dimensional part storage (database) 14A in the correlation function computing means 14 for part retrieval, it is set so that learning of the image of the part and parts related to the image by registering, correcting, eliminating, and the like can be performed by either a forcedly method (forced learning of once) or an experimentally method (statistic learning).

Even in the case where all of the information pieces regarding the input object are not converted to codes due to insufficiency or the like of data regarding the object in the three-dimensional part storage (database) 14A in the information code converting apparatus 10, when the unconverted portion is an image, it is sufficient to transmit the image information as it is. Also in such a case, the transmission amount can be reduced extremely.

In the embodiment of the information converting system according to the invention, an input signal supplied to information input means is subjected to an imaging process and becomes a comparison signal (input image) which is compared with data regarding a part in a comparing and determining apparatus. In this case, it is desirable that the input signal (image signal) is processed at the highest level of the time.

However how much the input signal is processed, it does not become an output signal. The output signal is not information processed but is always the part itself obtained by coincidence in the comparing operation, a part to which a new attribute is added, or the ID codes of the parts. The input signal and the part have generally different dimensions or physical quantities. For example, when the input signal is a two-dimensional image, the input signal is a two-dimensional output signal and a part is a three-dimensional signal.

As shown in FIG. 30, a three-dimensional signal or a pseudo three-dimensional signal may be input to the comparing and determining apparatus (part specifying unit).

On the other hand, at the time of comparing parts, as attributes of the parts, the front, upper side, lower side, symmetry axis, center axis, and the like are determined in advance. When the front, upper side, lower side, symmetry axis, center axis, and the like can be determined also from the input signal, comparison is limited in an extremely narrow range, so that it is effective. For displaying a coordinate system, the ground plane, vertical plane, and horizontal plane are determined. A comparison part candidate is clipped at the ground plane. For a comparison part, temporary front, upper side, lower side, symmetry axis, asymmetry axis, and the like are determined. At the time of actual comparison, by making the front, upper side, lower side, and symmetry axis closer to those, the point having the highest coincidence is detected. The parts are not compared in an unplanned manner. The parts are approximated by an algorithm such that similar planes are made closer to each other, a coincidence point is obtained, the degree of coincidence is evaluated, the parts are turned and moved in the direction of increasing the degree of coincidence, and the final coincidence point is obtained. The part has, as an attribute, information regarding comparison items and the comparison priority in the comparing and determining operation.

Next, attributes of a part and those of another part to be compared and the relation of a set of three parts will now be described.

In this case, a group of items as an object is decomposed to a group of parts, and each of the parts is always a block having meaning (for example, a human being, a car, or the like). Each part can be decomposed to smaller parts (such as hand, leg, wheel, and bumper). The smaller parts are dealt as attributes of the part. Further, each block having meaning is decomposed to parts and, after that, determined as a set position relation of a plurality of blocks each having meaning.

As a combination of a plurality of independent parts, a new part may be constructed. Attributes and recognition data are given to the newly constructed part as a new part, and the part is registered as a new part.

The recognition data is attribute priority data, history data, experience (place, time, seasons, circumstances, parameters, and so on), and data necessary to recognize the part and has a learning function. The recognition data is data necessary to recognize the part so as to be separated from the other and, as a general rule, the part itself has the recognition data. The recognition data is evolved by experience and learning. Therefore, history becomes important data for recognition.

It is not always necessary that the comparison signal is for the whole. Specifically, since the object is three-dimensional, only a part of the object can be generally observed. In many cases, the object is positioned behind another body and only a part of the object is seen. Therefore, a part of the object is compared with a part of the part, and determination is made only by coincidence of the parts. For example, since the part is three-dimensional (object), the part can be coincided with two-dimensional projection of only a part of the part (obtained information). A three-dimensional part is compared with a three-dimensional part of the object and, by coincidence of only the parts, the part as a target can be selected.

Only a part of a two-dimensional image (or a pseudo three-dimensional image obtained by processing a two-dimensional image) as an input image can become image information for comparison (hereinbelow, also called a "comparison signal").

Next, the attribute of a part and a coincidence determining reference will now be described.

At the time of comparison of a part, not only the shape but also all the attributes become candidates to be compared. For example, in the case of an image, not only the shape and coordinates of a body, color, distribution characteristic, texture, and other total information (sound, smell, hardness, and the like) are objects to be compared. The object is decomposed into parts, and a plurality of parts are signaled as an arrangement of the parts. By rearranging the parts, an output signal is constructed and reproduced. Further, the part has a determination reference of itself as a part of the attributes. That is, each of parts has a suitable reference for determining -the coincidence of itself, thereby remarkably improving precision.

In the information converting system according to the present invention, the kinds of functions of a comparator (part specifying unit) which is desirable in the case of comparing data regarding the above-described part are as follows.

A. giving priority to comparison by shapes
B. giving priority to comparison by a distribution of hue
C. giving priority to comparison by a distribution of spatial frequency components Comparison and determination is made by variously combining the above A, B, and C.

In the case of giving priority to the functions, the following three kinds (1) to (3) of comparators can be considered.
(1) In the case of giving priority to comparison by shapes, it can be constructed so that the shape of an input two-dimensional image and that of a three-dimensional image in the part storage or the shape of an input three-dimensional image and that of a three-dimensional image in the part storage are compared with each other, and the coincided image is output as an output signal.
① In this case, when continuous images having parallax are used as input two-dimensional images, a pseudo three-dimensional image can be obtained from the input images by an imaging process. In such a manner, separation of an object is facilitated and comparison with a part is facilitated. Also in comparison, a three-dimensional part can be compared as it is, so that determination can be made with extremely high precision.
② Irrespective of existence or absence of parallax in input images, input two-dimensional images obtained from multiple directions by a plurality of cameras are kept as they are, a three-dimensional part is decomposed into the multiple directions corresponding to the cameras so as to be projected two-dimensionally, and placement of the parts so that the multi-direction two-dimensional projection of the part and inputs in the multiple directions (two-dimensional images in eight directions having differences each of 45°) coincide with each other, thereby enabling coincidence to be determined.
③ Further, in the case where there is only one two-dimensional image, it can be compared with two-dimensional projection of a part. Specifically, in the case of simple objects whose number of kinds is small, it is sufficient.
④ By comparing the outline of an input image with a three-dimensional outline of a part, a coincidence point of the rough outlines can be obtained in the beginning. In this case, the permissible deviation of the outline of each part is set to a degree that the characteristics of the part are not lost. The outline is given as a plurality of loci of a point of a three-dimensional extreme. The rough outline coinciding function includes enlargement and reduction of a part.

Subsequently, the system advances to a process of obtaining coincidence of planes and, simultaneously, position and direction are specified. At a stage coincidence is determined, the three-dimensional outline of a part is enlarged/reduced so as to coincide with an input image. This is a method of generating data of a new part.
(2) In the case of giving priority to comparison by hue distribution, in rough shapes, distributions of hue components of colors are preferentially compared and determined to obtain coincidence. This is effective to natural matters such as mountains and trees.
(3) In the case of giving priority to comparison by distributions of spatial frequency components, in rough shapes, distributions of spatial frequencies are compared with each other to obtain coincidence. In this case as well, in a manner similar to the above-described (b), it is extremely effective to natural objects.

On the other hand, in the information converting system according to the invention, selection of a part denotes recognition of attributes of the part. However, in the case of only a single part or a plurality of parts which are closely related to each other, separation of a complete part in the system of the invention does not occur.
(1) Therefore, decomposition of all of objects into parts denotes that all of matters constructing the object are recognized together with their names and attributes and, moreover, the whole is understood. That is, since the attributes of each part are already known, when the whole object is decomposed into parts and each object is associated with each part, it means that the system recognizes each of the objects. When placement of the parts is determined, it means that the whole object as an individual object can be understood.
(2) If a part corresponding to an object is not found, it means that the object cannot be recognized. The case in which an object cannot be recognized is dealt with as follows.
① It is dealt with as a case where it is unnecessary to recognize the object and circumstances in which the object does not exist are determined.
② It is dealt with as a case where a part corresponding to the object does not exist in a part storage as a database. In this case, a part is newly generated to re-recognize the object or the volume and occupied space of an unknown body obtained from the input image are displayed without recognizing the shape.

Further, by decomposing the object into parts, general characteristics (attributes) of each object and particularity of the object are implanted as new attributes to a part, and the resultant becomes an output signal. That is, the general characteristics of each of the parts obtained by decomposing the object are included as attributes in the part. Only the particularity is added as a new attribute of the part to the output signal.

The embodiment in the information converting system according to the invention has been described with respect to the case of obtaining an image which reproduces an object by transmitting an information code obtained by converting an image of the object by analysis, recognition, or the like to a remote place, receiving the information code on a reception side or outputting the information code as it is to another device, and inversely converting the received information code. However, information regarding the obtained object is not limited to only an image.

That is, as long as information can be converted to a general physical quantity, by transmitting information regarding obtained various objects as information codes, the various objects can be reproduced at the destination of transfer. For example, information regarding each of the five senses of visual sense, auditory sense, olfactory sense, sense of taste, and tactile sense may be used. Further, every information including properties such as quality, weight, and surface reflectance of various matters, life, danger, and taste can become a target to be converted.

Figure 32:
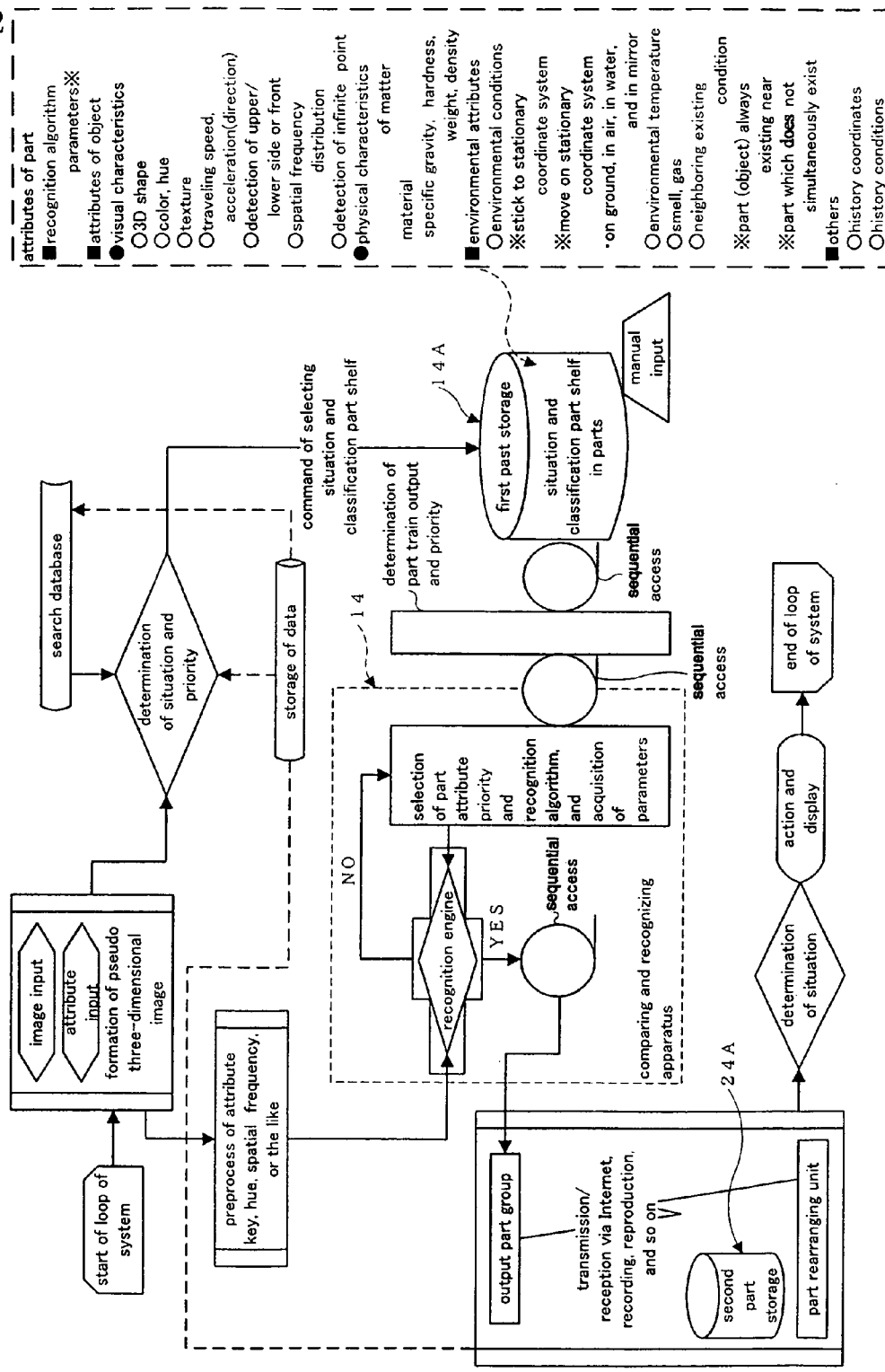
FIG. 32 is an explanatory diagram showing, as a model, an algorithm for performing comparison and recognition with a database regarding an input image and parts in a correlation function computing means for part retrieval shown in FIG. 30.

FIG. 32 is an explanatory diagram showing a modeled algorithm in the case of comparing and recognizing an input image regarding an object and a database regarding attributes of each of parts stored in the part storage (first and second part storage 14A and 24A) in the information converting system according to the invention by a comparing and recognizing apparatus (recognition engine) in the correlation function computing means 14 for part retrieval shown in FIG. 30.

The explanation so far is organized and shown in FIG. 32. In FIG. 32, the process from the start of a loop of the system of the invention to the end of the loop is as follows. First, an image and its attributes are input as image information. For the image input and attribute input, the situation and priority are determined via a search database, and a command of selecting a situation and a classified part shelf is sent to the first part storage 14A. On the basis of the selection command, a database of the attributes of parts is searched for the situation and the classified part shelf in the part storage.

On the other hand, the image input and attribute input are subjected to a preprocess regarding ZKey (depth signal), hue, spatial frequency distribution, or the like, and the resultant is input to the recognition engine. In the recognition engine, according to the result of searching the first part storage 14A, data based on part string output and priority determination sequentially accessed is input together with the priority of the attributes of a part, selection of a recognizing algorithm, and acquisition of parameters to a comparison engine (comparing unit) and compared with the input signal. A part corresponding to a coincided part is output as a data, and all of parts construct a part group. The output part group constructed by the output data of the parts is transmitted, recorded, or displayed in accordance with the purpose.

At this time, the second part storage 24A which stores a database regarding attributes of parts similar to the first part storage 14A is searched for a part which can reproduce corresponding image information, parts are rearranged, and the image information can be used, displayed, or the like on the basis of proper determination or the like.

A newly determined result with respect to the output part group can be properly stored as record data, used as information for determining situation and priority, and stored as new data into a search database.

Figure 33:
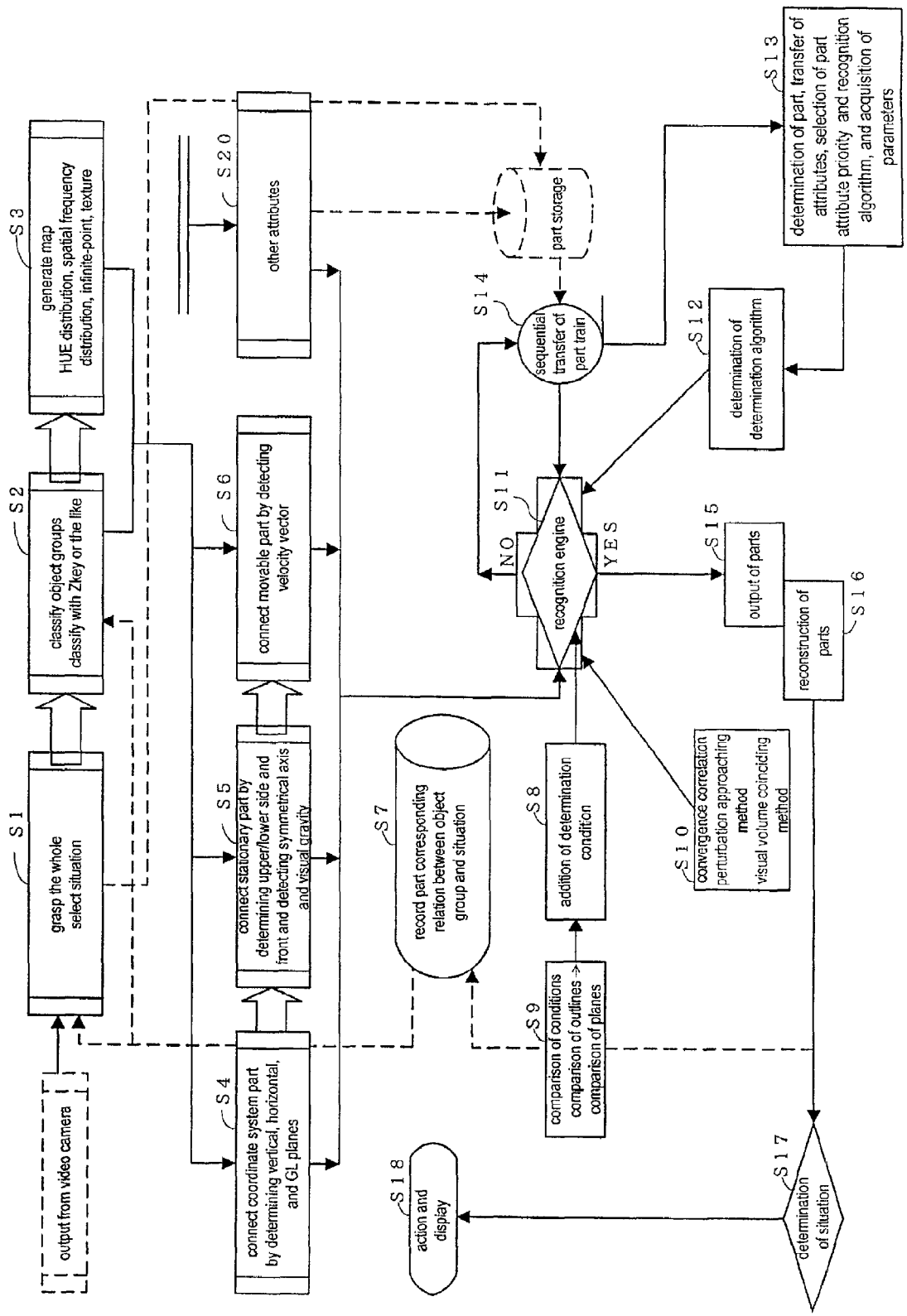
FIG. 33 is an explanatory diagram showing, as a model, an information process of a system configuration in an information converting system shown in FIGS. 30 and 31.

FIG. 33 is an explanatory diagram showing a modeled information process of the system configuration shown in FIGS. 30 and 31 in the information converting system according to the invention.

In FIG. 33, in step S1, with respect to the image information obtained by an output of a video camera, the whole is grasped and a situation is selected. Specifically, in the step, the situation is selected for the image input, the outline is determined by image retrieval with reference to history from a database, and a situation organizing shelf in the part storage is determined.

Step S2 is a separating step by ZKey indicative of the depth of the group of objects. To be specific, in this step, the whole image is roughly, three-dimensionally decomposed to a group of objects. The image may not be completely separated into corresponding parts. For example, an object may be decomposed to a lump of parts or a part of a large part.

In step 3, an image map is generated on the basis of a hue distribution, a spatial frequency distribution, a point at infinity, texture, or the like. In this case, a group of objects is decomposed to a plurality of areas. It may not be complete and the areas of the same quality are painted. An area smaller than a corresponding part can be also used. Even if areas are incomplete, they can be used extremely effectively as information of a clue to recognition.

In step S4, connection to a coordinate system part by vertical, horizontal, and ground planes is determined. Specifically, first, elements constructing an object image are determined with respect to the basic configuration of a vertical line, a vertical plane, a horizontal line, a horizontal plane, a ground plane, and the like in the image.

In step S5, connection to a stationary object (described as a stationary object part in FIG. 33) is made by determining the upper and lower sides and the front and detecting the symmetry axis and visual gravity. In this case, from the group of objects derived in step S2 and the map generated in step 3, the upper and lower sides, front, symmetry axis, and visual gravity of an object are detected. With reference to them, the position and posture of the part can be narrowed down by the comparing and recognizing apparatus.

In step S6, a velocity vector is detected for connection to a mobile object. In this case, a mobile member is processed separately from a stationary member. The velocity vector and an acceleration vector (including reciprocating motion) of the mobile member are obtained, In step S20, the other forms of the object are obtained and compared with the attribute of the part or given as an attribute.

Further, in step S7, the part corresponding relation of the group of objects and situation is recorded. In this case, a reconstructed three-dimensional image is recorded and used for retrieving an input image.

In step S8, a determination condition is added by giving a condition to the recognition algorithm. By feeding back the recognition result, setting of a situation is simplified, and candidates of parts are also narrowed down. Thus, the speed of computation of comparison and recognition is increased.

In step S9, a comparison condition is set. In this case, by comparing the outline of an object with that of a part first, comparison by high-speed computation can be made. Next, planes are compared with each other to determine the details.

In step S10, comparison and determination is made by a convergence correlation perturbation approaching method. Specifically, the convergence perturbation approaching method is a method of obtaining a coincidence point by moving the visual field of a part in the direction of reducing a volume $\Delta V$ of a discrepancy portion between the visual volume of the object group and the visual volume of the part. In other words, correlation is not needlessly computed for the whole three-dimensional space which is extremely large, but information for advancing computation of correlation in the direction of gradually approaching coincidence from a portion around the object is given. In such a manner, the speed of the computation can be extremely increased.

In step S11, an operation of the recognition engine is performed. To be specific, the recognition engine has various recognition algorithms. By an option given as an attribute to a part, the algorithm peculiar to the part is selected and the part is determined. Simultaneously, a self-recognizing function of the part itself can be obtained to perform a comparing and collating operation.

That is, the selection of the algorithm of comparison and recognition and the parameters of the algorithm are received from the part. In the case of a part having a self-recognizing function, the algorithm itself is received from the part.

In step S12, a determination algorithm is determined (in the case of a part having no self-recognizing function).

In step S13, determination of a part, transfer of attributes, selection of part attribute priority and a new algorithm, acquisition of parameters from a part and, further, acquisition of the algorithm itself from the self-recognizing function are carried out.

In step S14, a part train is sequentially sent. In this case, from the situation organized shelf in the part storage, parts are sequentially sent in accordance with the priority.

In step S15, the parts are output.

In step S16, the parts are reconstructed.

Further, in step S17, a situation is determined. In this case, the position of the situation is understood from the attributes and distribution of a plurality of parts, and normal/abnormal, danger/safe, preferred/unpreferred, beautiful/ugly, and the like can be determined.

Finally, in step S18, an action is taken and an image is displayed. In this case, by receiving a result of situation determination in step S17, a proper action can be taken. Even in the case of simply displaying the result, the proper visual angle can be automatically determined and selected.

Sixth Embodiment

Figure 34:
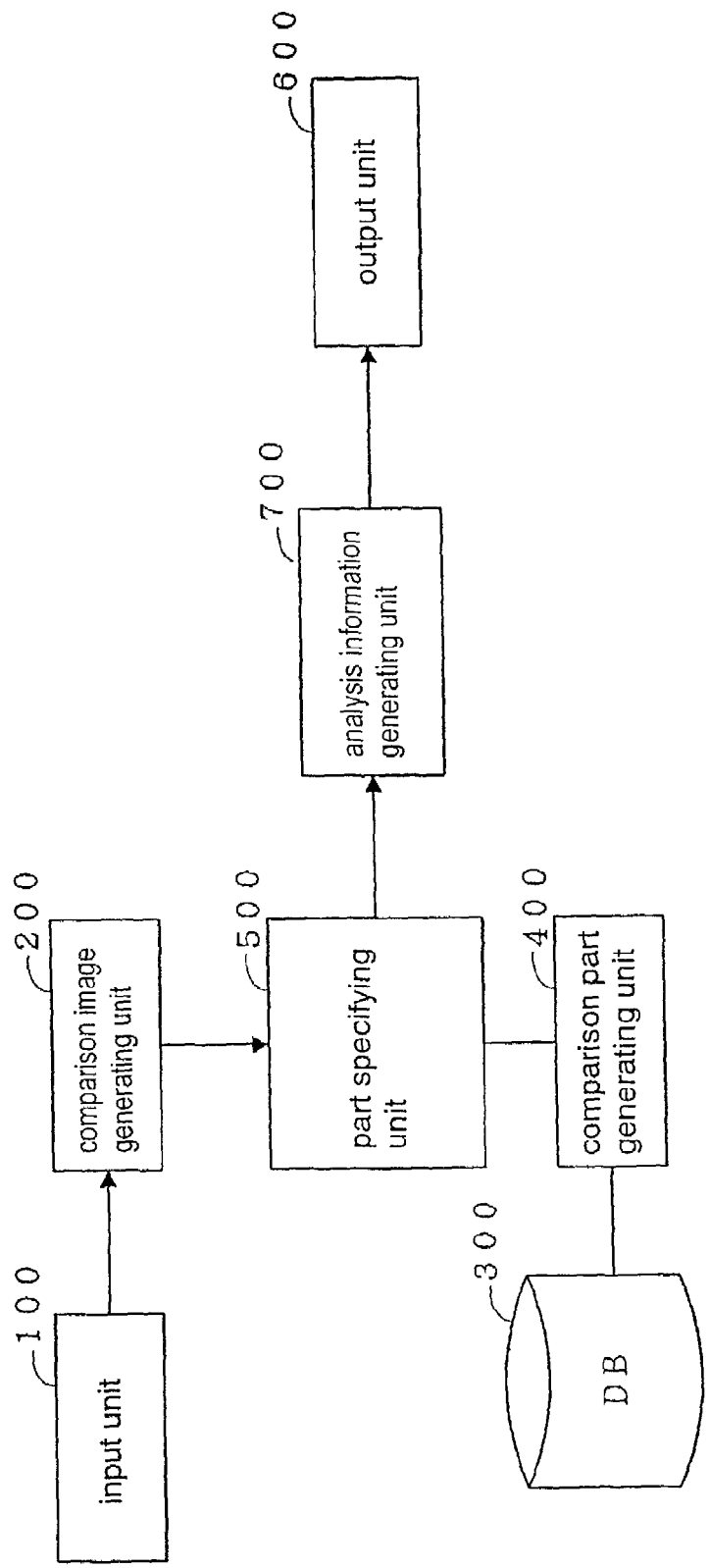
FIG. 34 is a block diagram for explaining the configuration of an information converting system of a sixth embodiment.
Figure 35:
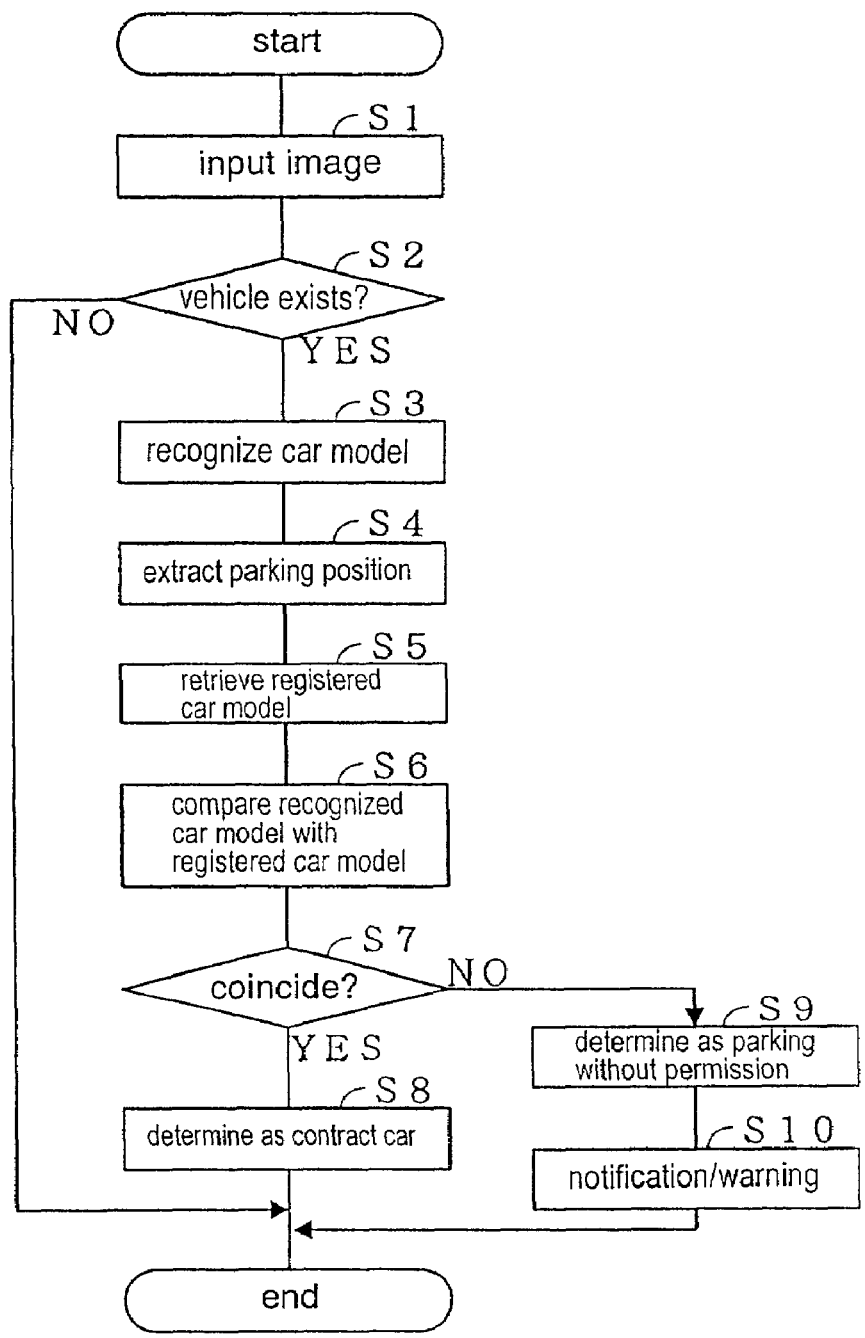
FIG. 35 is a flowchart for explaining the operation of the information converting system of the sixth embodiment.

With reference to FIGS. 34 to 36, a sixth embodiment of the invention will be described.

In the sixth embodiment, an example of using the information converting system of the invention as a monitoring system for a parking lot of contract vehicles will be described.

A parking lot of contract cars is usually unattended. Consequently, there is a case that a vehicle other than the contract cars parks without permission. As measures for preventing parking without permission, it is considered to keep watch on the parking lot so as to prevent parking without permission by a guard patrolling the parking lot of contract cars or by installing a monitor camera. However, to make a guard patrol the parking lot of contract cars or monitor a monitor image all day long, personnel expenses are necessary. It is therefore difficult to effectively prevent parking without permission at low cost.

In the sixth embodiment, an example of keeping watch on the parking lot of contract cars by the information converting system will be described.

First, referring to the functional block diagram of FIG. 34, the configuration of the information converting system of the sixth embodiment will be described. As shown in FIG. 34, the information converting system of the sixth embodiment includes an input unit 100, a comparison image generating unit 200, a part specifying unit 500, a database (DB) 400, an analysis information generating unit 700, and an output unit 600.

The input unit 100 in the sixth embodiment takes the form of a monitor camera installed so as to see the whole parking lot of contract cars.

In the database 300, car models and shapes of various vehicles are stored as attribute data. Further, in the database 300, as attribute data of each block in the parking lot of contract cars, the car model and shape of the contract vehicle are registered.

The comparison image generating unit 200 generates image information for comparison including the images of vehicles parked in images of the monitor camera.

The part specifying unit 500 specifies a part corresponding to the parked vehicle in the image of the monitor camera, thereby recognizing the car model of the parked vehicle.

The analysis information generating unit 700 generates analysis information of a group of parts which are different from each other by combining data of specific items in the attribute data of the parts. In the sixth embodiment, the analysis information generating unit 700 compares and collates data of a specific item which is the car model among the attribute data of the parked vehicle with data of a specific item which is the car model of the contracted vehicle in the attribute data of the parking block. The analysis information generating unit 700 generates analysis information indicating whether the parked vehicle is the contract vehicle or a vehicle parked without permission.

The output unit 600 makes a report or outputs warning when the analysis information indicates parking without permission.

Referring to the flowchart of FIG. 35, the processes in the case of applying the invention to the monitoring system for the parking lot of contract cars will be described.

First, by the monitor camera as the input unit 100, an image of the whole parking lot of contract cars is obtained as shown in FIG. 36A (step S1 in FIG. 35).

FIG. 36A shows an image of first to third blocks 71 to 73 of the parking lot and a mini-truck 70 parked in the second block 72. Since the vehicle 70 is included in the image ("Yes" in step S2 in FIG. 35), the part specifying unit 500 recognizes the car model of the parked vehicle on the basis of the attribute data in the database 300 (step S3 in FIG. 35).

Subsequently, the parking position of the vehicle 70 is extracted (step S4 in FIG. 35). In this case, as the parking position, the second parking block 72 is extracted.

Next, the part specifying unit 500 retrieves and reads the attribute data of a contract vehicle 75 in the second parking block 72 from the database 300 (step S5 in FIG. 35). In this case, as the item of "car model" in the attribute data, a "wagon" 75 as a part shown in FIG. 36B is read.

By the analysis information generating unit 700, the car model of the vehicle 70 in the image is compared and contrasted with that of the contract vehicle 75 registered (step S6 in FIG. 35).

At the time of comparison and contrast, the shapes and colors of the whole vehicles may be directly compared with each other, or the car model may be specified from the shapes of parts of the vehicle and the placement relation of the parts.

For example, (1) each of the parts constructing the car such as wheels, headlight, fender, doors, windows, tail lamps, and number plate are specified first.

(2) Subsequently, the placement relation of the parts constructing the car is reconstructed.

(3) When the three-dimensional positional relation of the parts matches the condition, the object is recognized as a car. Preferably, the car model of the car is further specified.

Such a method is particularly suitable for recognizing an object whose shape is not fixed or an object whose shape is easily deformed.

In the embodiment, although the parked vehicle is the mini-truck 70, the contract vehicle is the wagon 75, so that the car models do not coincide with each other ("No" in step S7 in FIG. 35).

In this case, the analysis information generating unit 700 determines that the vehicle 70 parked in the second parking block 72 parks without permission (step S9 in FIG. 35).

In other words, the analysis information generating unit 700 newly generates analysis information that "the parked vehicle parks without permission" on the basis of the attribute data of the car model "mini-truck" of the parked vehicle 70 specified from the image and the attribute data of the car model "wagon" of the contract vehicle 75 of the second parking block 72.

Subsequently, the output unit 600 outputs a message that there is the vehicle parking without permission by, for example, reporting it to the manager of the parking lot of contract cars or announcing a warning that parking without permission is prohibited.

When the car model of the parked vehicle coincides with that of the contract vehicle registered, the analysis information generating unit 700 generates analysis information that "the parked vehicle is the contract vehicle" (step S8 in FIG. 35).

As described above, according to the sixth embodiment, only by installing one monitor camera in the parking lot, parking without permission in the whole parking lot can be automatically watched. Such an automatic monitoring system cannot be realized without recognizing the car model of a parked vehicle.

A method of verifying the number plate of a vehicle can be also considered. However, particularly when a parking lot is large, it is difficult to read the number plates of all vehicles parked by one or a small number of monitor cameras.

When not only the car model but also elements such as color of a vehicle are added as elements for determination, the determination precision can be further increased.

The ground of a parking lot is generally a known flat surface or a known gentle slope. The tires of a parked vehicle are in contact with the flat surface. Therefore, as an intersection between the direction of a vehicle seen from the monitor camera and a known flat surface, the position of the vehicle can be obtained.

Seventh Embodiment

Figure 37:
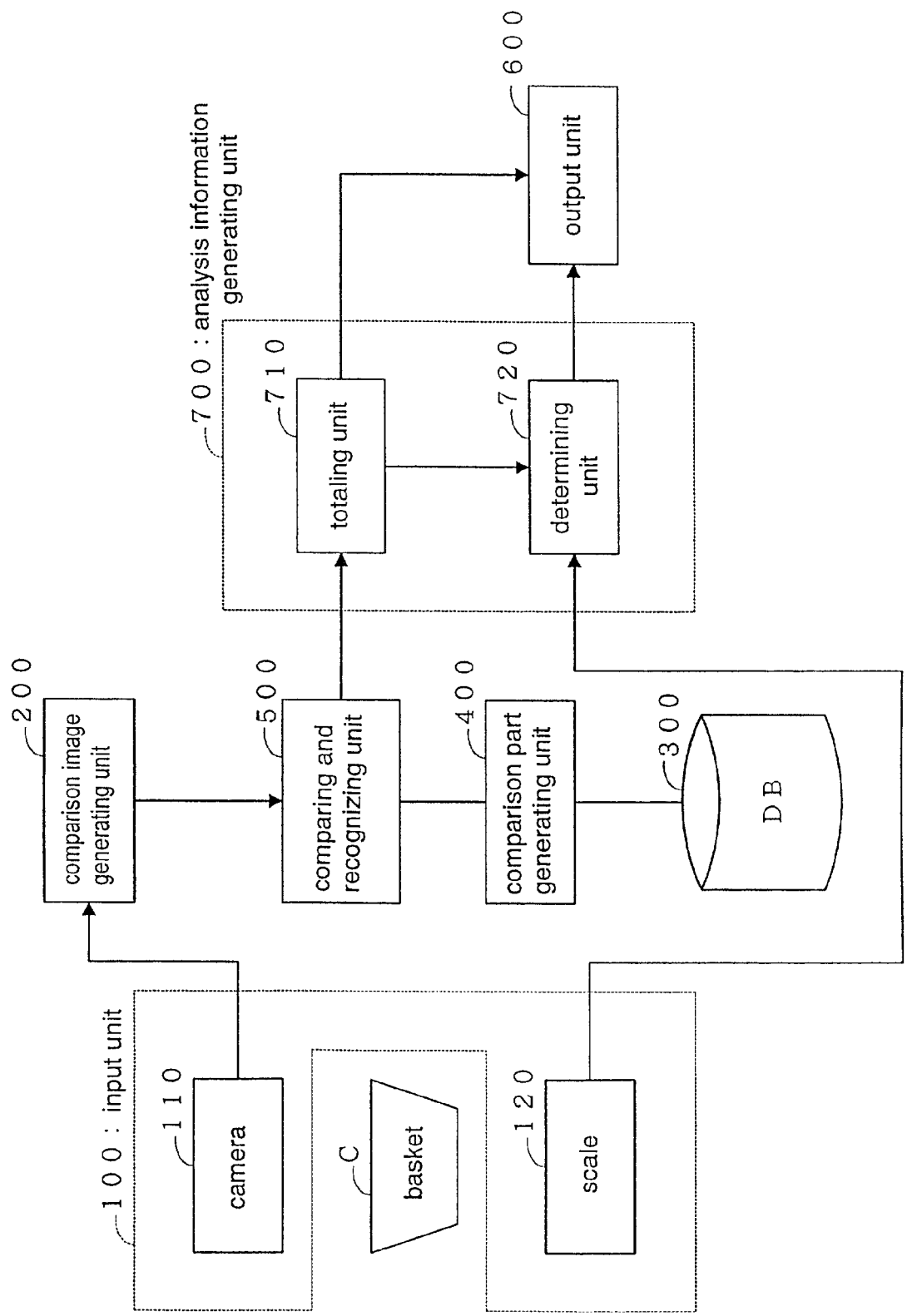
FIG. 37 is a block diagram for explaining the configuration of an information converting system of a seventh embodiment.

A seventh embodiment of the invention will now be described with reference to FIGS. 37 to 39.

In the seventh embodiment, an example of using the information converting system of the invention as a register system in a store will be described.

In a store such as a convenience store, for management and checkout of commodities, a bar code is attached to each commodity. A bar code system of identifying each commodity by reading the bar code at a checkout and automatically displaying the total amount of commodities is in widespread use.

In the bar code system, bar codes are not preliminarily attached to all of the commodities or packages of the commodities. Consequently, in many cases, a bar code has to be attached to each of the commodities in a store. As a result, particularly in a large store such as a supermarket, there is a case such that enormous efforts are required to attach bar codes to a large number of commodities.

At a checkout, conventionally, a clerk picks up commodities one by one to pass the commodity by a fixed bar code reader so that the bar code is read. Because of this operation, a burden is therefore applied to the arms and lower back of the clerk. A handy-type bar code reader has therefore been developed and a way of allowing a bar code to be read by putting the bar code reader to a commodity is in widespread use. Also in this way, however, a clerk still has to put the bar code reader to the commodities one by one so that the bar code is read.

Moreover, in the bar code system, the object actually identified is a bar code attached to a commodity. That is, the commodity itself is not directly identified. Because of this, it is feared that, when an erroneous bar code is attached to a commodity, the commodity is erroneously identified at a checkout, and a wrong amount is displayed.

In the seventh embodiment, therefore, the information converting system is applied as a register system.

First, by referring to the functional block diagram of FIG. 37, the configuration of the information converting system of the seventh embodiment will be described. As shown in FIG. 37, the information converting system of the seventh embodiment includes an input unit 100, a comparison image generating unit 200, a part specifying unit 500, a database (DB) 400, an analysis information generating unit 700, and an output unit 600.

The input unit 100 in the seventh embodiment is constructed by a camera 110 and a scale 120. The camera 110 can take an image of the whole basket C in which commodities are put and which is placed at a checkout. The scale 120 can measure the weight of the basket C in which the commodities are put.

It is desirable to install a plurality of cameras 110 to acquire images of the basket C from a plurality of different directions.

In the database 300, as attribute data of each of commodities such as a milk package and a shampoo sold in the store, data such as the shape, price, and weight of each of the commodities is stored.

The part specifying unit 500 recognizes each of the commodities from the images of the commodities in the basket C obtained by the camera 100.

The analysis information generating unit 700 is constructed by a totaling unit 710 and a determining unit 720. The totaling unit 710 adds up the prices of the commodities as parts recognized by the part specifying unit 500 and generates analysis information which is the total amount. Further, the totaling unit 710 adds the weight of the commodities as parts and the weight of the basket C to thereby also generate analysis information of total weight.

The determining unit 720 compares and collates the weight of the whole basket C including the commodities measured by the scale 120 with the total weight calculated by the totaling unit 710 and determines whether or not the weights coincide with each other within a permissible range. When the weights coincide with each other, the determining unit 720 determines that all of the commodities are correctly recognized. On the other hand, when the weights do not coincide with each other, the determining unit 720 determines that there is a commodity which is not correctly recognized in the basket C. In such a manner, the determining unit 720 also generates analysis information of determination from the measured weights and the total weight.

When the determining unit 720 determines that the commodities are correctly recognized, the output unit 600 outputs the total amount calculated by the totaling unit 710. On the other hand, when the determining unit 720 determines that the commodities are not correctly recognized, the output unit 600 outputs an error message.

Referring to the flowchart of FIG. 38, processes performed in the case of applying the present invention to a register system will now be described.

Figure 38:
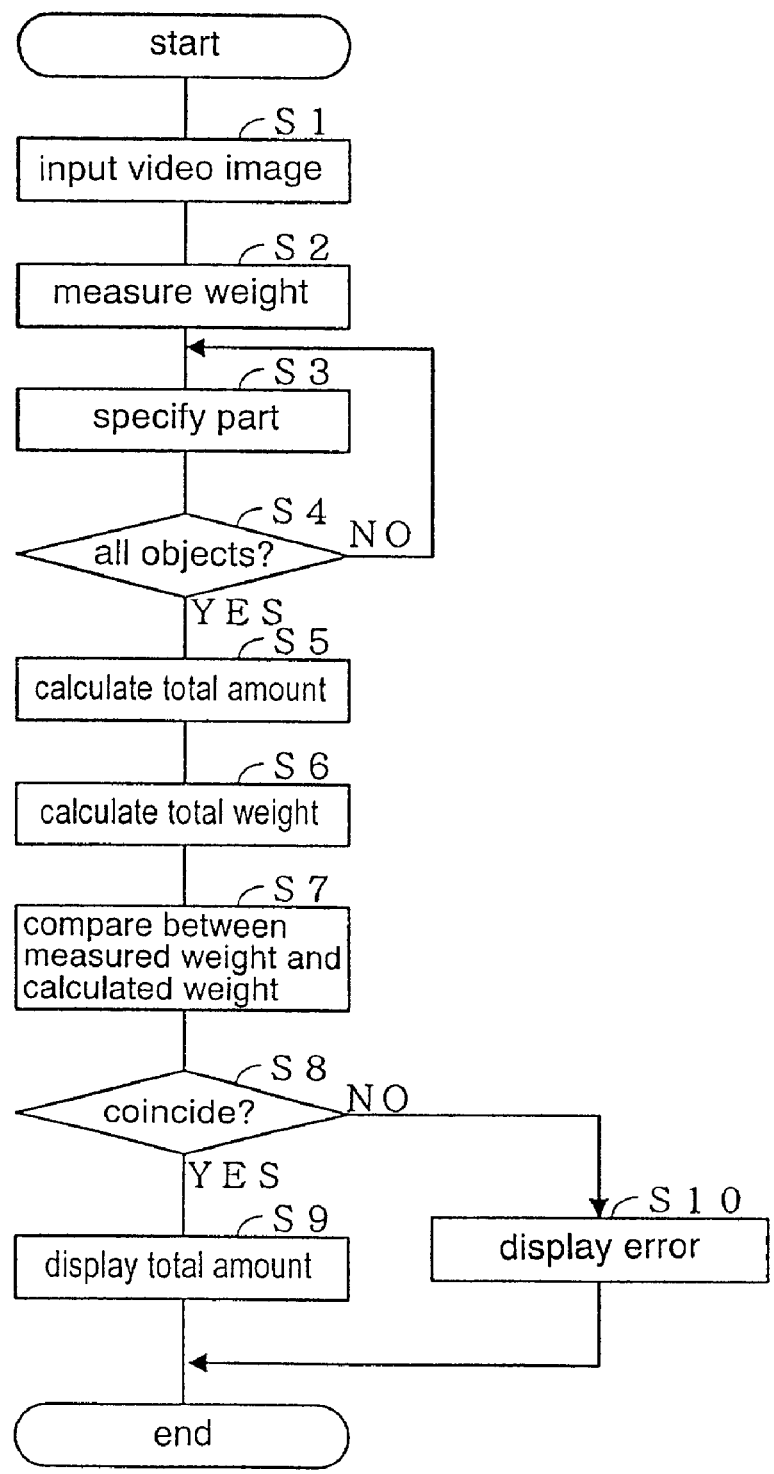
FIG. 38 is a flowchart for explaining the operation of the information converting system of the seventh embodiment.
Figure 39A:
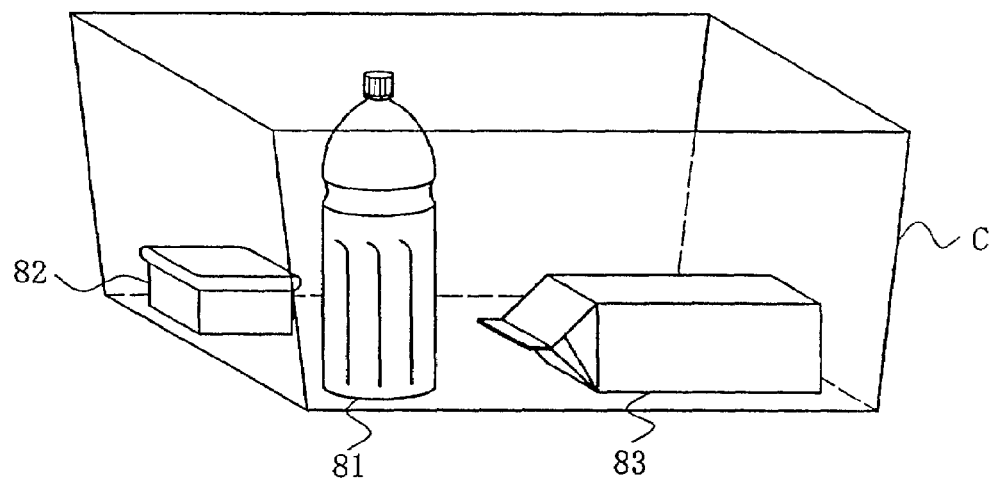
FIG. 39A is a schematic diagram of an object in the seventh embodiment and FIG. 39B is a schematic diagram showing modeled parts.

First, by the monitor camera 110 in the input unit 100, as shown in FIG. 39A, an image of the whole basket C in which commodities are put is obtained (step S1 in FIG. 38). FIG. 39A schematically shows a state In which a liquid detergent 81 in a container, a Tofu package 82, and a milk package 83 are put in the basket C.

Simultaneously with the acquisition of the image, weight G1 of the whole basket C is measured by the scale 120 (step S2 in FIG. 38).

Subsequently, by the part specifying unit 500, parts corresponding to the objects in the image obtained by the camera 110 are specified (step S3 in FIG. 38).

Figure 39B:
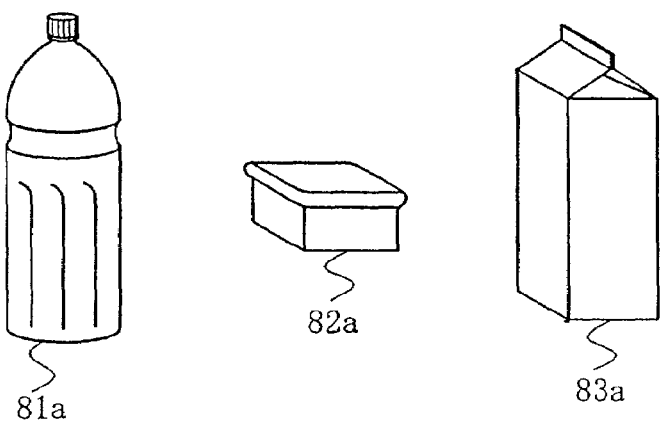

FIG. 39B schematically shows specified parts corresponding to the commodities. In this case, liquid detergent 81a as a part, a Tofu package 82a as a part, and a milk package 83a as a part are specified.

After confirming that all of the objects in the image are extracted (step S4 in FIG. 38), prices of the specified parts 81a to 83a are totaled by the totaling unit 710 to calculate the total amount (step S5 in FIG. 38).

Subsequently, by adding up the weights of the parts 81a to 83a and the basket C, a total weight G2 is calculated (step S6 in FIG. 38).

The measured weight G1 measured by the scale 120 is compared and collated with the total weight G2 calculated by the totaling unit 710 by the determining unit 720 (step S7 in FIG. 38).

When the measured weight G1 and the total weight G2 coincide with each other (in the case of "Yes" in step S8 in FIG. 38), the output unit 600 displays the total amount (step S9 in FIG. 38).

On the other hand, when the measured weight G1 and the total weight G2 do not coincide with each other (in the case of "No" in step 8), the output unit 600 displays an error message (step S10 in FIG. 38).

As described above, by applying the invention to the register system, a part corresponding to each commodity can be specified, so that bar codes become unnecessary. Consequently, a clerk does not have to make bar codes attached to commodities read one by one, and the total amount of the commodities can be calculated in short time. As a result, the process at the checkout becomes quicker, and waiting time at the checkout is shortened. Since commodities do not have to be picked up one by one at the time of checkout, the physical burden on clerks can be lessened.

Eighth Embodiment

Figure 40:
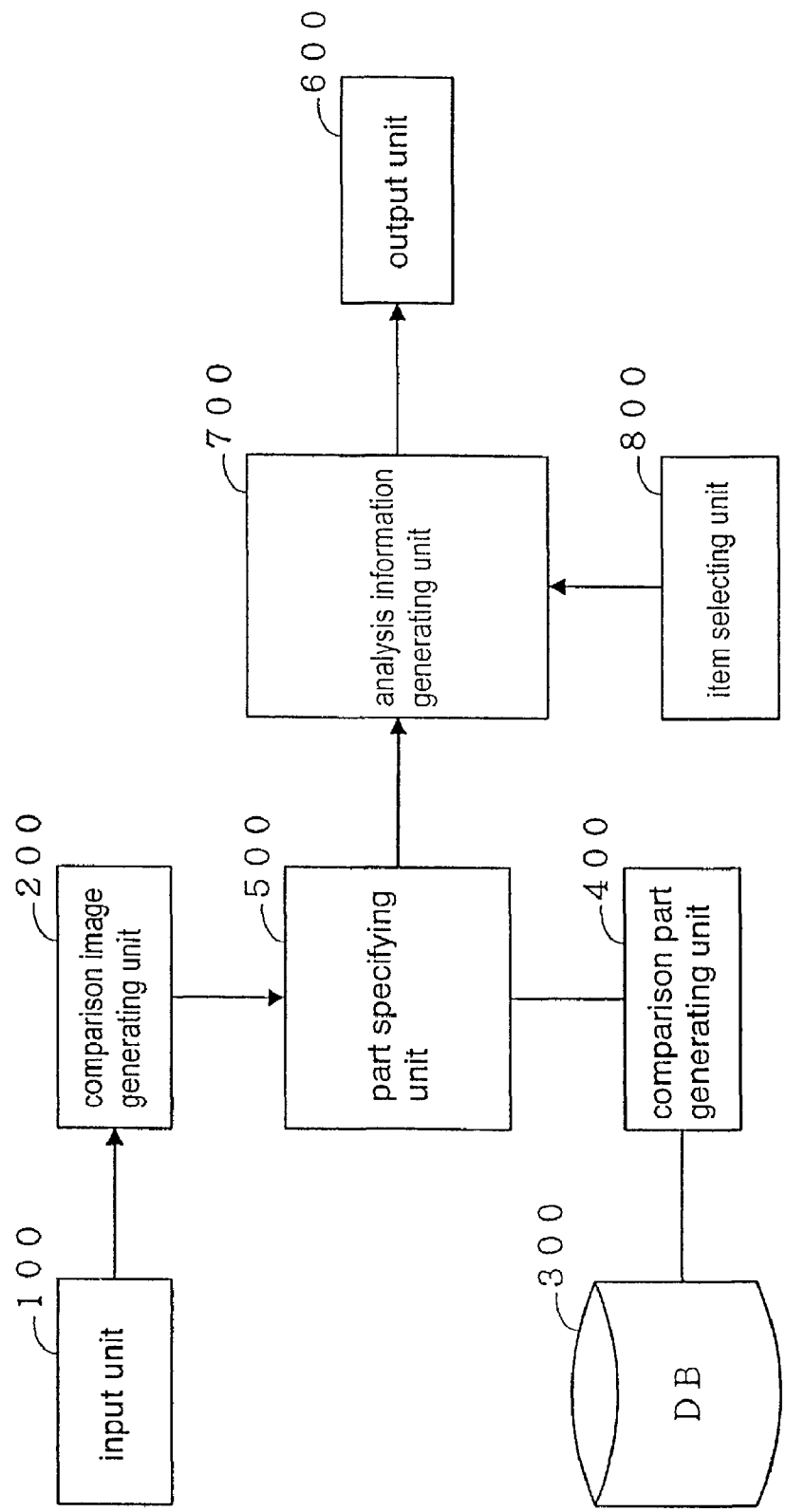
FIG. 40 is a block diagram for explaining the configuration of an information converting system of eighth and ninth embodiments.
Figure 41:
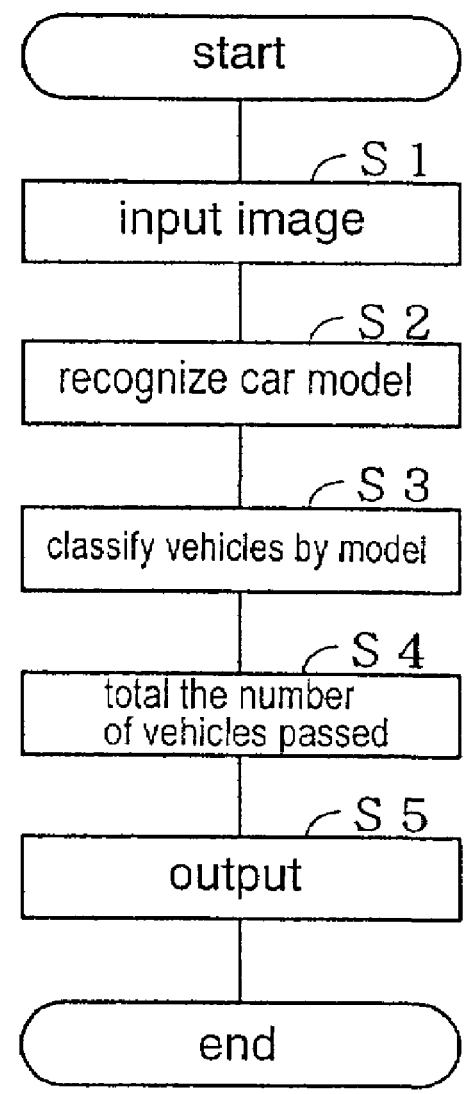
FIG. 41 is a flowchart for explaining the operation of the information converting system in the eighth embodiment.
Figure 42:
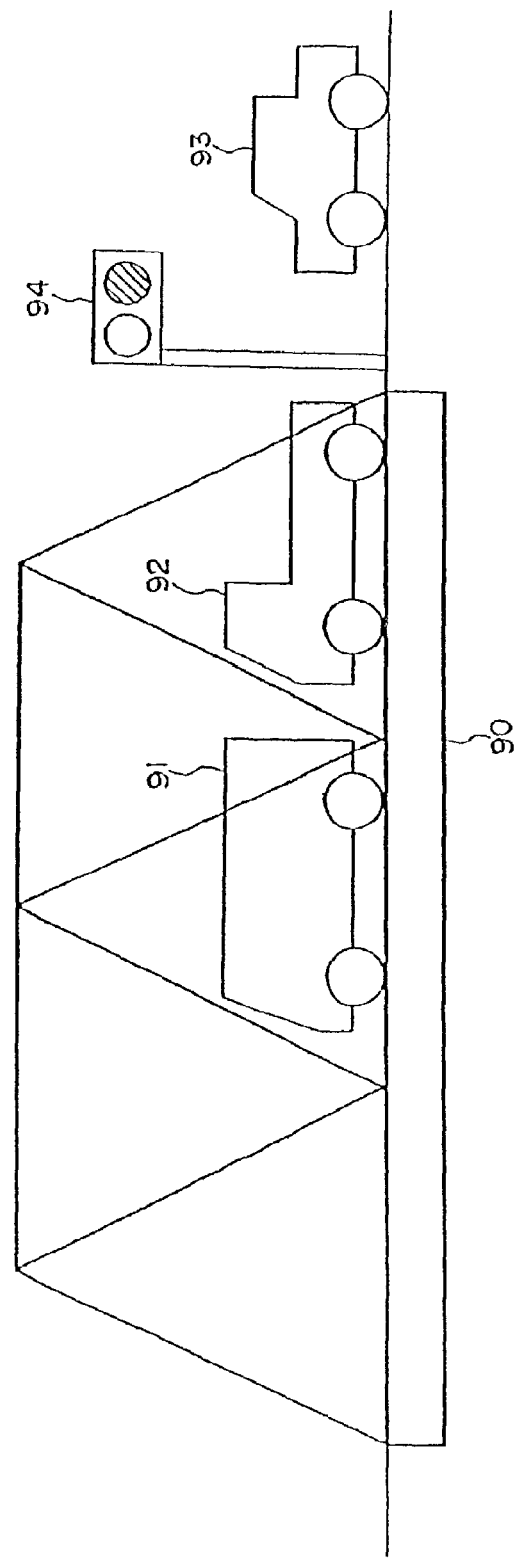
FIG. 42 is a schematic diagram of objects in the eighth and ninth embodiments.

With reference to FIGS. 40 to 42, an eighth embodiment of the invention will now be described.

In the eighth embodiment, an example of using the information converting system for a survey on traffic volume will be described.

Conventionally, to collect traffic volume data, by employing temporary workers or the like, traveling vehicles and the like are counted one by one by a counter on a kind-by-kind basis.

However, when human beings do the counting, a counting error often occurs. Moreover, it is difficult to verify the authenticity of totaled data. Particularly, at an intersection of heavy traffic, because a number of vehicles simultaneously start driving as soon as the signal is switched, an oversight in counting often occurs.

Also by employing temporary workers, personnel expenses occur, and the survey cost becomes high. Especially, for a survey on traffic volume at night or early in the morning, in many cases, it is difficult to assure the number of workers.

In the eighth embodiment, therefore, an example of applying the information converting system to a survey on traffic volume will be described.

First, referring to the functional block diagram of FIG. 40, the configuration of the information converting system of the eighth embodiment will be described. As shown in FIG. 40, the information converting system of the eighth embodiment includes an input unit 100, a comparison image generating unit 200, a part specifying unit 500, a database (DB) 300, a comparison part generating unit 400, an analysis information generating unit 700, an item selecting unit 800, and an output unit 600.

The input unit 100 of the eighth embodiment takes the form of a monitor camera for capturing images of vehicles passing on a bridge 90 schematically shown in FIG. 42. The visual field of the monitor camera may be set to be either wide so that the whole bridge 90 is captured or narrow so that only one traveling vehicle is captured. The monitor camera may be installed to capture an image of a vehicle passing the bridge 90 from the front or from a side.

In the database 300, attribute data of the car models and forms of various vehicles is stored.

The part specifying unit 500 specifies a part corresponding to an image of a vehicle obtained by the monitor camera as the input unit 100.

The item selecting unit 800 selects parts whose attribute data are combined and/or specific items of the parts in accordance with the analysis information generated by the analysis information generating unit.

The analysis information generating unit 700 generates analysis information in accordance with a result of selection of the item selecting unit 800. In the embodiment, the models of the vehicles as parts are classified, and the number of vehicles passed is totaled model by model.

The output unit 600 outputs the number of vehicles passed on the model-by-model basis.

Referring now to the flowchart of FIG. 41, processes performed in the case of applying the invention to a survey on traffic volume will be described.

First, by the monitor camera as the input unit 100, an image of vehicles passing on the bridge is input (step SI in FIG. 41).

Subsequently, by the part specifying unit 500, parts corresponding to each of the vehicles are specified. Based on the attribute data of the parts specified, the car model is determined (step S2 in FIG. 41).

It is sufficient to set the classification of car models in accordance with the purpose of a survey on traffic volume. For example, the car models can be simply classified into "heavy duty vehicles" and "non heavy-duty vehicles" or classified by manufacturer of a vehicle.

Subsequently, in the analysis information generating unit 700, the car models are classified (step S3 in FIG. 41) and the number of vehicles passed is totaled by car model (step S4 in FIG. 41).

The total value of the number of vehicles passed model by model is output from the output unit 600 (step S5 in FIG. 41).

In such a manner, according to the eighth embodiment, the number of vehicles passed can be automatically totaled model by model. Thus, very reliable data can be collected at low cost. The totaling while performing such classification cannot be realized without specifying the car model of a passing vehicle.

Ninth Embodiment

Figure 43:
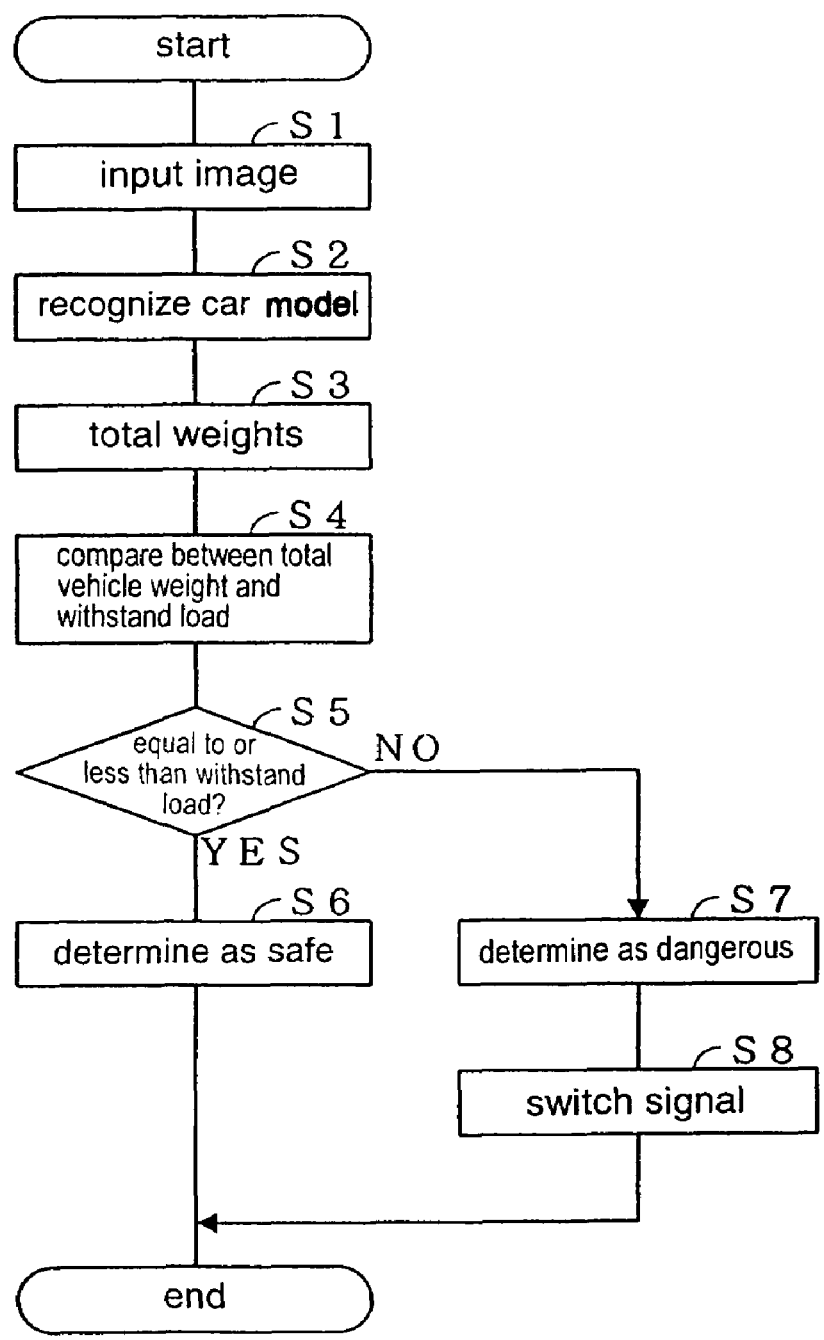
FIG. 43 is a flowchart for explaining the operation of the information converting system in the ninth embodiment.

Referring now to FIGS. 40, 42, and 43, a ninth embodiment of the invention will be described.

In the ninth embodiment, an example of managing the safety of a bridge by using the same system configuration as that of the foregoing eighth embodiment will be described.

As shown in the flowchart of FIG. 43, also in the ninth embodiment, in a manner similar to the foregoing eighth embodiment, an image of vehicles passing on the bridge is input (step S1 in FIG. 43). However, in the ninth embodiment, images of not only the vehicles on the bridge but also a vehicle approaching the bridge are captured.

Subsequently, in a manner similar to the eighth embodiment, models of vehicles 91, 92, and 93 in the image are recognized (step S2 in FIG. 43).

In the ninth embodiment, the item selecting unit 800 instructs generation of analysis information for controlling the safety of the bridge. For this purpose, the analysis information generating unit 700 calculates total weight G (=g1+G2+g3) of weights g1 and g2 of the vehicles 91 and 92 passing on the bridge 90 and weight g3 of the vehicle 90 approaching the bridge 90 (step S3 in FIG. 43).

That is, the total weight G is analysis information of the vehicles 91, 92, and 93.

As the weight of each of vehicles, it is desirable to set a value of a load carried on the vehicle is added. For example, in the case of a truck, it is preferable to add the maximum payload.

Further, by the analysis information generating unit 700, the total weight G is compared with a withstand load Gh of the bridge 90 (step S5 in FIG. 43).

When the total weight G is equal to or less than the withstand load Gh, the bridge is determined to be safe (step S6 in FIG. 43).

In other words, the analysis information generating unit 700 further generates, as determination for safety, new analysis information of the total weight of the vehicles 91, 92, and 93 and the bridge 90 by combining the total weight G as analysis information and the withstand load Gh as attribute data of the bridge 90.

On the other hand, when the total weight G exceeds the withstand load Gh, the bridge is determined to be dangerous (step S7 in FIG. 43).

In other words, the analysis information generating unit 700 further generates, as determination of danger, new analysis information of the total weight of the vehicles 91, 92, and 93 and the bridge 90 by combining the total weight G as analysis information and the withstand load Gh as attribute data of the bridge 90.

When the bridge is determined to be dangerous, a control signal for switching display of a signal 94 to the red signal light is immediately output from the output unit 600.

In such a manner, the safety control of the bridge can be automatically performed.

In the ninth embodiment, the vehicle weight is information which is not directly obtained from a monitor image. Consequently, even when a human being simply watches the monitor camera, safety or danger cannot be determined unlike the embodiment. In contrast, in the embodiment, a vehicle in an image is recognized as a vehicle as a part having attribute data, so that the safety control can be automatically performed by using the weight data of each vehicle, which is not included in the input image. Therefore, in the ninth embodiment, more advanced safety control as compared with the case where the bridge is simply watched by a human being can be realized.

Although the example of applying the invention under specific conditions has been described in each of the foregoing embodiments, the invention can be variously modified. For instance, in the foregoing embodiment, the example of using a video image of an object as input information has been described. However, in the invention, the input information is not limited to an image. For example, information obtained by adding sound information of an object or information such as temperature of the object to an image may be used as input information.

As input information, a result of measurement of various physical quantities such as mass, electricity, and magnetism of the object may also be used. An operation pattern or the like of the object may also be used.

The input image is not limited to an image of visible rays. For example, as an input image, an infrared image, an exposure image formed by radiation such as X-rays or neutron rays, or an electron-ray image may be used. For instance, a reflected-wave image of ultrasonic wave, radio wave or the like or further a diffracted image may be used.

In the invention, by registering a pronounced sentence or word as a part and obtaining sound information in place of the image information, sound recognition can be also performed. In the sound recognition, input sound information is an electric signal of sound captured by a microphone. Consequently, as sound information for comparison, a frequency spectrum as a function of time, a sound level (intensity) and, further, FM and AM components obtained by analysis may be generated in consideration of characteristics of a language. On the other hand, as sound part information for comparison, in the case of a language, frequency spectra of a word and a sentence, sound level, FM components, and AM components may be given. By the part specifying unit, the correspondence between the sound information for comparison and the sound part information for comparison is checked.

In each of the foregoing embodiments, the example of performing information conversion in order to realize one or a plurality of specific purposes has been described. However, the information converting system of the invention can also be used as a general system whose use is not specified. For example, the function of an electronic encyclopedia for receiving information of an image of an object and outputting various attribute data of parts corresponding to the object can also be realized by a configuration of a database, an input unit, and a part specifying unit.

INDUSTRIAL APPLICABILITY

The invention is suitable for use in various fields in which an image recognizing technique of a monitoring system such as a security system can be used. The invention is also suitable for use as an image processing technique in factory automation (FA). Further, the use of the invention as the basic technique of the information processing technique such as artificial intelligence into various fields can be expected.

The invention is also suitable for use in various fields of image information transmitted such as relay broadcasting.

What is claimed is:

1. An information converting system comprising:
a database in which attribute data including three-dimensional shape data and an identification code of each of parts modeled on various objects are registered;
a comparison part generating unit for generating one piece or plural pieces of part information for comparison from said attribute data for each of said parts;
an input unit for obtaining an input image including an object image;
a comparison image generating unit for generating image information for comparison in which information pieces of said objects are not individually clipped, by performing an imaging process on said input image;
a part specifying unit for specifying a part corresponding to said object image by using the part information for comparison and the image information for comparison each having the same kind of data; and
an output unit for outputting the identification code and at least a part of the attribute data of the specified part as a result of recognition of said object image, and
said part specifying unit comprising:
a retrieving unit for retrieving a corresponding portion, which corresponds to at least a part of said part information for comparison, from said image information for comparison sequentially with respect to one or plural parts of part information for comparison of one or plural parts;
a recognizing unit for recognizing said corresponding portion in said image information for comparison as an object image; and
a specifying unit for specifying a part having said part information for comparison as a part corresponding to said object image.

2. The information converting system according to claim 1, wherein said comparison part generating unit decomposes as said part information for comparison, the attribute data of said part into basic elements of an outline to generate basic elements or a composite element obtained by combining a plurality of basic elements,
said comparison image generating unit extracts the basic elements of an outline and generates a set of basic elements or composite elements as said image information for comparison, and
said retrieving unit retrieves a part corresponding to the basic element or composite element of said part from said image information for comparison.

3. The information converting system according to claim 2, wherein said comparison part generating unit generates basic elements or a composite element of a characteristic portion of the attribute data of a part as said part information for comparison,
said retrieving unit retrieves a part corresponding to the basic element or composite element of said characteristic portion from said image information for comparison, and
said recognizing unit detects, after the portion corresponding to the basic element or composite element of said characteristic portion is retrieved, correspondence between said corresponding portion and a basic element or composite element out of the characteristic portion in the same part, and recognizes the corresponding portion as an object image.

4. The information converting system according to claim 2, wherein said comparison part generating unit generates, as said part information for comparison, an element extracting filter taking the form of a two-dimensional matrix or a three-dimensional matrix in which a high point is given to a pixel coinciding with the shape of said basic element or composite element and a low point is given to a pixel apart from the shape of said element, and
said retrieving unit retrieves, as said corresponding portion, a portion in which the total point of pixels coinciding with the basic element or composite element in said image information for comparison is the highest.

5. The information converting system according to claim 2, wherein said comparison part generating unit gives information for specifying only a coupling relation of said basic elements to said composite element, and
said part specifying unit retrieves said corresponding portion on a condition that at least a part of said coupling relation coincides with said corresponding portion.

6. The information converting system according to claim 1, wherein the attribute data of each part registered in said database includes self-specifying information for instructing a method of specifying the part,
said comparison part generating unit generates part information for comparison for designating said self-specifying information and outputs said part information for comparison to
said part specifying unit in accordance with priority designated by said self-specifying information, and
said part specifying unit specifies a part on the basis of said self specifying information.

7. The information converting system according to claim 1, wherein as attribute data of a set of parts, identification codes and a combination condition of a plurality of parts constructing the part set are registered in said database, and
when specified parts satisfy said combination condition, said specifying unit further specifies a part set obtained by combining specified parts.

8. The information converting system according to claim 1, wherein said database has, as attribute data of a four-dimensional part modeled on a series of operations of an object, a set of three-dimensional shape data in a time-series order of the object.

9. The information converting system according to claim 1, wherein said database has, as attribute data of general parts modeled commonly on an object group, attribute data common to parts modeled on the objects of the object group.

10. The information converting system according to claim 9, wherein said general parts and parts commonly having the attribute data of the general parts are associated with each other in said database,
said comparison part generating unit generates part information for comparison with respect to said general parts, and when said general part is specified by said specifying unit, said comparison part generating unit generates part information with respect to a part associated with the general part.

11. The information converting system according to claim 1, wherein said database captures data obtained from a recognized object image as attribute data of a specified part or replaces the data obtained from a recognized object image with a part of attribute data.

12. The information converting system according to claim 1, wherein a plurality of parts are grouped for each set situation in said database, and
when said input image corresponds to any of set situations, said comparison part generating unit generates said part information for comparison for a part in the group of the corresponding set situation.

13. The information converting system according to claim 1, wherein said retrieving unit limits a retrieval range in said image information for comparison in accordance with a scene of an input image.

14. The information converting system according to claim 1,
wherein a plurality of said input units obtain input images of the same object from known directions which are different from each other,
said comparison image generating unit generates image information for comparison including two-dimensional shape data from each of the input images obtained by the input units,
said comparison part generating unit generates part information for comparison having two-dimensional shape data obtained by projecting three-dimensional shape data of a part into the known directions, and
said part specifying unit specifies a part of each image information for comparison and confirms that the same part is specified about each of the image information for comparison.

15. The information converting system according to claim 1,
wherein said input unit obtains an input image including an object image photographed from a single direction,
said comparison image generating unit generates image information for comparison including two-dimensional shape data from said input image, and
said comparison part generating unit generates part information for comparison having two-dimensional shape data obtained by projecting the three-dimensional shape data of said part into an arbitrary direction.

16. The information converting system according to claim 1,
wherein said input unit obtains input images having parallax of the same object photographed from directions which are different from each other,
said comparison image generating unit generates image information for comparison including three-dimensional shape data from each of the input images, and
said comparison part generating unit generates part information for comparison having three-dimensional shape data of a part.

17. The information converting system according to claim 1,
wherein said part specifying unit has a settling unit for determining a three-dimensional shape of a specified part and three-dimensional coordinates indicative of an arrangement relation.

18. The information converting system according to claim 17, wherein when the same part is specified with respect to a plurality of different object images by said part specifying unit, said settling unit adds identifiers which are different from each other to identification codes of the specified parts.

19. The information converting system according to claim 17, wherein when said input image is a moving image constructed by a plurality of frames, said part specifying unit specifies a part with respect to one of the frames and repeatedly performs only said settling process with respect to the part once specified for the other frames.

20. The information converting system according to claim 17, wherein said output unit reconstructs a plurality of parts subjected to the settling process in said part specifying unit and three-dimensional space arrangement of the parts as an image seen from a viewpoint in an arbitrary position and displays the resultant.

21. The information converting system according to claim 1, wherein said input unit obtains an overlapped portion of three-dimensional spaces in image capturing ranges of input images on the basis of an object image in each of input images of an object whose three-dimensional shape and position are known, photographed from directions which are different from each other, aligns the overlapped portions so as to coincide with each other on a three-dimensional coordinate system, thereby coupling the images, and obtains a viewpoint position and an angle of view of each of the input units.

22. The information converting system according to claim 1, further comprising:
a transmitting unit for transmitting an identification code output from said output unit to a communication line;
a receiving unit for receiving said identification code;
a reception-side database in which said identification code and attribute data are associated with each other and registered; and
a reconstructing unit for searching attribute data of a part corresponding to said identification code from said reception-side database and outputting the attribute data corresponding to said identification code.

23. The information converting system according to claim 22, wherein three-dimensional shape data of parts of the same identification code in said database on a transmission side and in said reception-side database are different from each other.

24. The information converting system according to claim 1, further comprising an analysis information generating unit for combining attribute data of a plurality of parts specified by said part specifying unit to thereby generate analysis information regarding a group of the parts.

* * * * *